US006130949A

United States Patent [19]

Aoki et al.

[11] Patent Number: 6,130,949

[45] Date of Patent: Oct. 10, 2000

[54] METHOD AND APPARATUS FOR SEPARATION OF SOURCE, PROGRAM RECORDED MEDIUM THEREFOR, METHOD AND APPARATUS FOR DETECTION OF SOUND SOURCE ZONE, AND PROGRAM RECORDED MEDIUM THEREFOR

[75] Inventors: Mariko Aoki, Yokohama; Shigeaki Aoki, Yokosuka; Hiroyuki Matsui, Yokohama; Yutaka Nishino, Miura; Manabu Okamoto, Yokohama, all of Japan

[73] Assignee: Nippon Telegraph and Telephone Corporation, Tokyo, Japan

[21] Appl. No.: 08/931,515

[22] Filed: Sep. 16, 1997

[30] Foreign Application Priority Data

| | | | |
|---|---|---|---|
| Sep. 18, 1996 | [JP] | Japan | 8-246726 |
| Mar. 13, 1997 | [JP] | Japan | 9-076668 |
| Mar. 13, 1997 | [JP] | Japan | 9-076672 |
| Mar. 13, 1997 | [JP] | Japan | 9-076682 |
| Mar. 13, 1997 | [JP] | Japan | 9-076693 |
| Mar. 13, 1997 | [JP] | Japan | 9-076695 |

[51] Int. Cl.[7] .......... H04B 15/00

[52] U.S. Cl. .......... 381/94.3; 381/94.7

[58] Field of Search .......... 381/94.3, 94.2, 381/94.7, 94.1, 92, 66, 26

[56] References Cited

U.S. PATENT DOCUMENTS

| | | | |
|---|---|---|---|
| 3,989,897 | 11/1976 | Carver | 381/94.3 |
| 4,008,439 | 2/1977 | Schroeder | 381/94.3 |
| 4,358,738 | 11/1982 | Kahn | 381/94.3 |
| 4,932,063 | 6/1990 | Nakamura | 381/94.3 |

FOREIGN PATENT DOCUMENTS

| | | |
|---|---|---|
| 0509654A2 | 10/1992 | European Pat. Off. . |
| 0795851A2 | 9/1997 | European Pat. Off. . |
| 2275388 | 8/1994 | United Kingdom . |
| 2276298 | 9/1994 | United Kingdom . |
| 94/22278 | 9/1994 | WIPO . |

*Primary Examiner*—Ping Lee
*Attorney, Agent, or Firm*—Pollock, Vande Sande & Amernick

[57] ABSTRACT

A time difference $\Delta\tau$ between the arrival of acoustic signals from sound sources to microphones 1, 2 is detected from output channel signals L, R from microphones 1, 2. By Fourier transform, the signals L, R are divided into respective frequency bands L(f1)–L(fn), R(f1)–R(fn). Differences $\Delta\tau i$ (i=1, 2, . . . n) in the time-of-arrival of L(f1)–L(fn) and R(f1)–R(fn) to the microphones 1, 2 as well as a signal level difference $\Delta Li$ are detected. L(f1)–L(fn), R(f1)–R(fn) are divided into a low range of $fi<1/(2\ \Delta\tau)$, a middle range of $1/(2\ \Delta\tau)<fi<1/\Delta\tau$, and a high range of $fi>1/\Delta\tau$. Utilizing $\Delta\tau i$ for the low range, $\Delta Li$ and $\Delta\tau i$ for the middle range and $\Delta Li$ for the high range, a determination is made from which sound source L(fi), R(fi) are oncoming to deliver outputs separately for each sound source. The outputs are subject to an inverse Fourier transform for synthesis separately for each sound source.

100 Claims, 29 Drawing Sheets

FOR $\frac{1}{2\Delta\tau} < fi \leqq \frac{1}{\Delta\tau}$

| MIXED SIGNAL | SEPARATED SIGNAL |
|---|---|
| MALE VOICE+ FEMALE VOICE | MALE VOICE(S1) |
| | FEMALE VOICE(S2) |
| FEMALE VOICE1+ FEMALE VOICE2 (BY SAME SPEAKER, BUT SPEAKING DIFFERENT CONTENT) | FEMALE VOICE1(S3) |
| | FEMALE VOICE2(S4) |
| COCK CLUCKING+ FEMALE VOICE | COCK CLUCKING(S5) |
| | FEMALE VOICE(S6) |

ORIGINAL SIGNAL (S1)

ORIGINAL SIGNAL (S2)

MIXED SIGNAL

POST-PROCESSING SIGNAL (S1)

POST-PROCESSING SIGNAL (S2)

METHOD AND APPARATUS FOR SEPARATION OF SOURCE, PROGRAM RECORDED MEDIUM THEREFOR, METHOD AND APPARATUS FOR DETECTION OF SOUND SOURCE ZONE, AND PROGRAM RECORDED MEDIUM THEREFOR

BACKGROUND OF THE INVENTION

The invention relates to a method of separating/extracting a signal of at least one sound source from a complex signal comprising a mixture of a plurality of acoustic signals produced by a plurality of sound sources such as voice signal sources and various environmental noise sources, an apparatus for separating a sound source which is used in implementing the method, and a recorded medium having a program recorded therein which is used to carry out the method in a computer.

An apparatus for separating a sound source of the kind described is used in a variety of applications including a sound collector used in a television conference system, a sound collector used for transmission of a voice signal uttered in a noisy environment, or a sound collector in a system which distinguishes between the types of sound sources, for example:

A conventional technology for separating a sound source comprises estimating fundamental frequencies of various signals in the frequency domain, extracting harmonics structures, and collecting components from a signal source for synthesis.

However, the technology suffers from (1) the problem that signals which permit such a separation are limited to those having harmonic structures which resemble the harmonic structures of vowel sounds of voices or musical tones; (2) the difficulty of separating sound sources from each other in real time because the estimation of the fundamental frequencies generally requires an increased length of time for processing; and (3) the insufficient accuracy of separation which results from erroneous estimations of harmonic structures which cause frequency components from other sound sources to be mixed with the extracted signal and cause such components to be perceived as noise.

A conventional sound collector in a communication system also suffers from the howling effect that a voice reproduced by a loudspeaker on the remote end is mixed with a voice on the collector side. A howling suppression in the art includes a technique of suppressing unnecessary components from the estimation of the harmonic structures of the signal to be collected and a technique of defining a microphone array having a directivity which is directed to a sound source from which a collection is to be made.

The former technique is effective only when the signal has a high pitch response while signals to be suppressed have a flat frequency response as a consequence of utilizing the harmonic structures. Thus, the howling suppression effect is reduced in a communication system in which both the sound source from which a collection is desired and the remote end source deliver a voice. The latter technique of using the microphone array requires an increased number of microphones to achieve a satisfactory detectivity, and accordingly, it is difficult to use a compact arrangement. In addition, if the directivity is enhanced, a movement of the sound source results in an extreme degradation in the performance, with concomitant reduction in howling suppression effect.

As a technique of detecting a zone in which a sound source uttering a voice or speaking source is located in a space in which a plurality of sound sources are disposed, a technique is known in the art which uses a plurality of microphones and detects the location of the sound source from differences in the time required for an acoustic signal from the source to reach individual microphones. This technique utilizes a peak value of cross-correlation between output voice signals from the microphones to determine a difference in time required for the acoustic signal to reach each microphone, thus detecting the location of the sound source.

Unfortunately, this detection technique requires an increased length of time for calculation of cross-correlation functions which must be performed by additions and multiplications of a data length which is twice the data length read already.

The use of a histogram is effective in detecting a peak among the cross-correlations. However, a histogram formed on a time axis causes a time delay. To provide a histogram without causing a time delay, it is contemplated to divide the signal into bands, and to form a histogram over all the bands. However, it is necessary to employ a signal having a bandwidth greater than a given value to form a cross-correlation function, and accordingly, the division of the signal is limited to several bands at most. Hence, the histogram must be formed on the time axis using a signal having a certain length, but it is difficult with this technique to detect the location of the sound source in real time.

An estimation of direction of a sound source by a processing technique in which outputs from a pair of microphones are each divided into a plurality of bands is disclosed in Japanese Laid-Open Patent Application Number 87, 903/93. The disclosed technique requires a calculation of a cross-correlation between signals in corresponding divided bands, and hence suffers from an increased length of processing time.

It is an object of the invention to provide a method and an apparatus which separates/extracts an acoustic signal from a sound source that does not have a harmonic structure, and thus enables a separation of a sound source without dependence on the variety of the sound source and enables such a separation in real time, and a program recorded medium therefor.

It is another object of the invention to provide a method and an apparatus for the separation of a sound source with a high accuracy and with a reduced level of noise, and a program recorded medium therefor.

It is a further object of the invention to provide a method and an apparatus for separation of a sound source which permits the howling to be suppressed to a sufficiently low level for any signal, and a program recorded medium therefor.

It is still another object of the invention to provide a method and an apparatus for detection of a sound source zone in real time, and a program recorded medium therefor.

SUMMARY OF THE INVENTION

In accordance with the invention, a method of separating a sound source comprises the steps of providing a plurality of microphones which are located as separated from each other, each microphone providing an output channel signal which is divided into a plurality of frequency bands in a frequency division process such that essentially and principally a signal component from a single sound source resides in each band;

detecting, for each common band of respective output channel signals, a difference in a parameter such as a level (power) and/or time of arrival (phase) of an acoustic signal reaching each microphone which undergoes a change attributable to the locations of the plurality of microphones as a band-dependent inter-channel parameter value difference;

on the basic of the band-dependent inter-channel parameter value differences for each frequency band, determining which one of the respective band-divided output channel signals in each frequency band comes from which one of the sound sources;

on the basis of a determination rendered in the sound source signal determination process, selecting in a sound source signal selection process at least one of the signals coming from a common sound source from the band-divided output signals;

and synthesizing in a sound source synthesis process a plurality of band signals selected as signals from a common sound source in the sound source signals selection process into a sound source signal.

In an embodiment of the invention, the band-dependent levels of the respective output channel signals which are divided in the band division process are detected. The band-dependent levels for a common band are compared between channels, and based on the results of such a comparison, a sound source (or sources) which is not uttering a voice is detected. A detection signal corresponding to the sound source which is not uttering a voice is used to suppress a sound source signal corresponding to the sound source which is not uttering a voice from among the sound sources signal which are produced in the sound source synthesis process.

In another embodiment of the invention, differences in the time required for the respective output channel signals which are divided in the band division process to reach respective microphones are detected for each common band. The band-dependent differences in time thus detected for each common band are compared between the channels, and on the basis of the results of such a comparison, a sound source (or sources) which is not uttering a voice is detected. A detection signal corresponding to the sound source which is not uttering a voice is used to suppress a sound source signal corresponding to the sound source which is not uttering a voice from among the sound source signals which are produced in the sound source synthesis process.

In a further embodiment of the invention, at least one of the sound sources is a speaker, and at least one of the other sound sources is electroacoustical transducer means which transduces a received signal oncoming from the remote end into an acoustic signal. The sound source signal selection process interrupts components in the band-divided channel signals which belong to the acoustic signal from the electroacoustical transducer means, and selects components of the voice signal from the speaker. The sound source signal produced in the sound source synthesis process is transmitted to the remote end.

In accordance with the invention, a method of detecting a sound source zone comprises providing a plurality of microphones which are located as separated from each other, each microphone providing an output channel signal which is divided into a plurality of frequency bands such that essentially and principally a signal component from a single sound source resides in each band, detecting, for each common band of respective output channel signals, a difference in a parameter such as a level (power) and/or time of arrival (phase) of the acoustic signal reaching each microphone which undergoes a change attributable to the locations of the plurality of microphone, comparing the parameter values thus detected for each band between the channels, and on the basis of the result of such comparison, determining a zone in which the sound source of the acoustic signal reaching the microphone is located.

DESCRIPTION OF PREFERRED EMBODIMENTS

Figure 1:
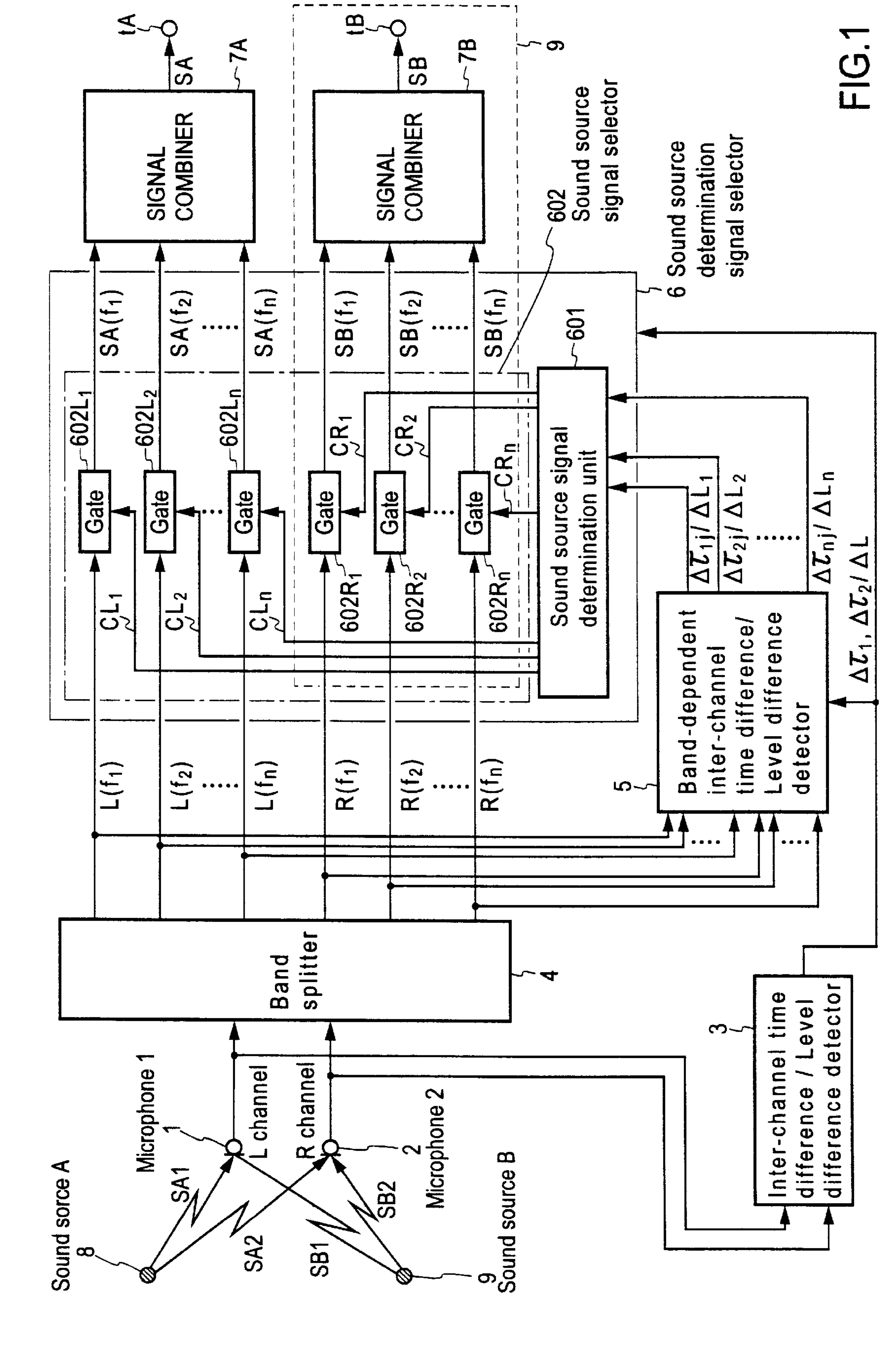
FIG. 1 is a functional block diagram of an apparatus for separation of a sound source according to an embodiment of the invention.

FIG. 1 shows an embodiment of the invention. A pair of microphones 1 and 2 are disposed at a spacing from each other, which may be on the order of 20 cm, for example, for collecting acoustic signals from the sound sources A, B and converting them into electrical signals. An output from the microphone 1 is referred to as an L channel signal, and an output from the microphone 2 is referred to as an R channel signal. Both the L channel and the R channel signal are fed to an inter-channel time difference/level difference detector 3 and a bandsplitter 4. In the bandsplitter 4, the respective signal is divided into a plurality of frequency band signals and thence fed to a band-dependent inter-channel time difference/level difference detector 5 and a sound source determination signal selector 6. Depending on each detection output from the detectors 3 and 5, the selector 6 selects a certain channel signal as A component or B component for each band. The selected A component signal and B component signal for each band are combined in signal combiners 7A, 7B to be delivered separately as a sound source A signal and a sound source B signal.

When the sound source A is located closer to the microphone 1 than to the microphone 2, a signal SA1 from the source A reaches the microphone 1 earlier and at higher level than a signal SA2 from the sound source A reaches the microphone 2. Similarly, when the sound source B is located closer to the microphone 2 than to the microphone 1, a signal SB2 from the sound source B reaches the microphone 2 earlier, and at a higher level than a signal SB1 from the sound source B reaches the microphone 1. In this manner, in accordance with the invention, a variation in the acoustic signal reaching both microphones 1, 2 which is attributable to the locations of the sound sources relative to the microphones 1, 2, or a difference in the time of arrival and a level difference between both signals, is utilized.

Figure 2:
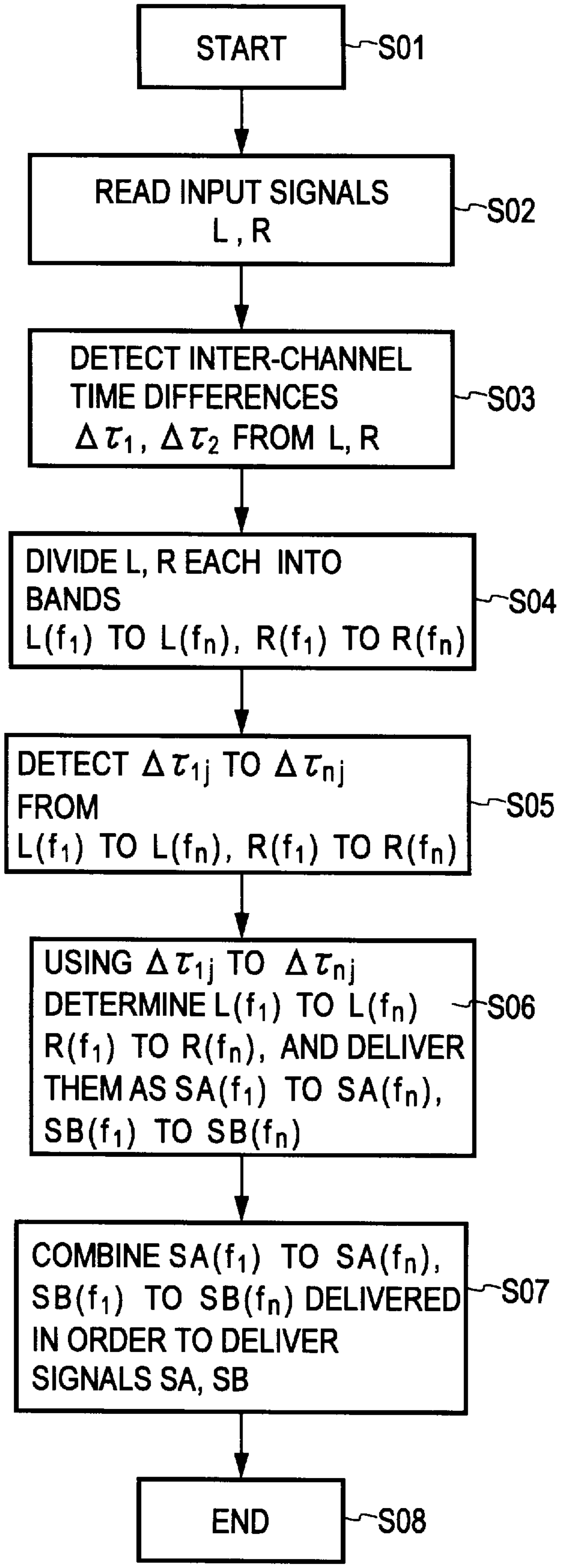
FIG. 2 is a flow diagram illustrating a processing procedure used in a method of separating a sound source according to an embodiment of the invention.
Figure 3:
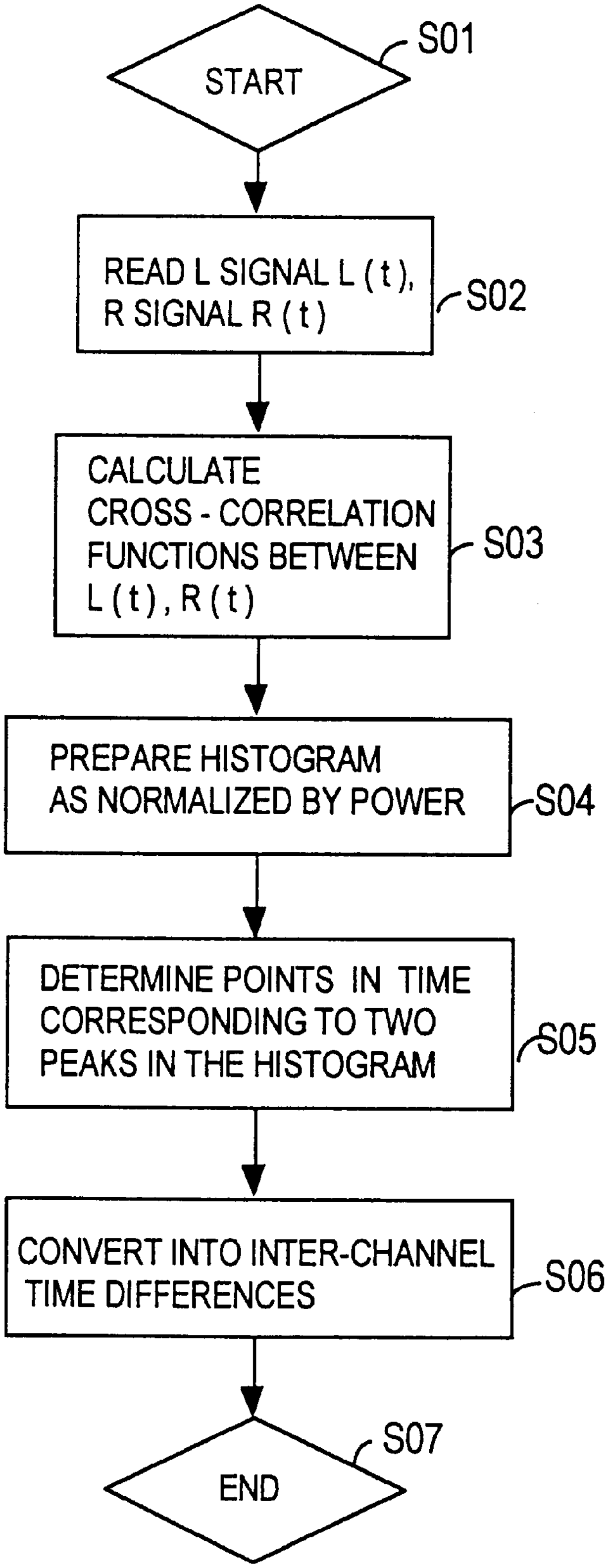
FIG. 3 is a flow diagram of an exemplary processing procedure for determining inter-channel time differences $\Delta\tau_1$, $\Delta\tau_2$ shown in FIG. 2.

The operation of the apparatus as shown in FIG. 1 will be described with reference to FIG. 2. As shown, signals from the two sound sources A, B are received by the microphones 1, 2 (S01). The inter-channel time difference/level difference detector 3 detects either an inter-channel time difference or a level difference from the L and R channel signals. As a parameter which is used in the detection of the time difference, the use of a cross-correlation function between the L and the R channel signal will be described below. Referring to FIG. 3, initially samples L(t), R(t) of the L and the R signal are read (S02), and a cross-correlation function between these samples is calculated (S03). The calculation takes place by determining a cross-correlation at the same sampling point for the both channel signals, and then cross-correlations between the both channel signals when one of the channel signals is displaced by 1, 2 or more sampling points relative to the other channel signal. A number of such cross-correlations are obtained which are then normalized according to the poweyr to from a histogram (S04). Time point differences $\Delta\alpha_1$ and $\Delta\alpha_2$ where the maximum and the second maximum in the cumulative frequency occur in the histogram are then determined (S05). These time point differences $\Delta\alpha_1$, $\Delta\alpha_2$ are then converted according to the equation given below into inter-channel time differences $\Delta\tau_1$, $\Delta\tau_2$ for delivery (S06).

$$\Delta\tau_1=1000\times\Delta\alpha_1/F \tag{1}$$

$$\Delta\tau_2=1000\times\Delta\alpha_1/F \tag{2}$$

where F represents a sampling frequency and a multiplication factor of 1000 is used to provide an increased magnitude for the convenience of calculation. The time differences $\Delta\tau_1$, $\Delta\tau_2$ represent inter-channel time differences in the L and R channel signal from the sound sources A, B.

Figure 4A:
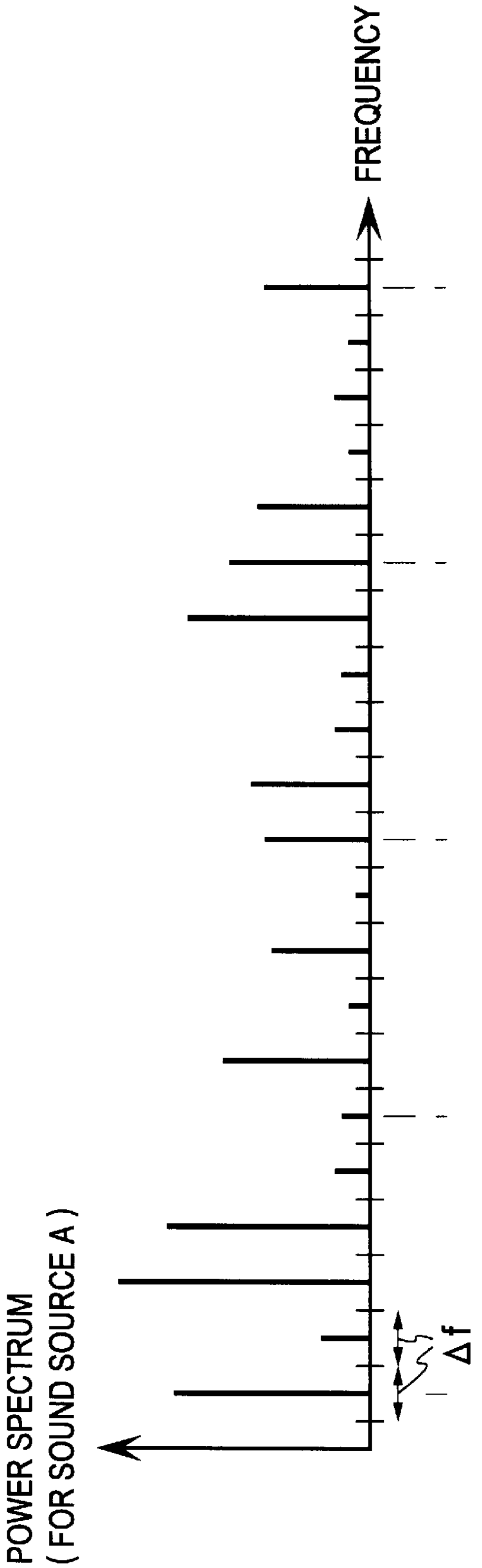
FIGS. 4A and B are diagrams showing examples of the spectrums for two sound source signals.
Figure 4B:
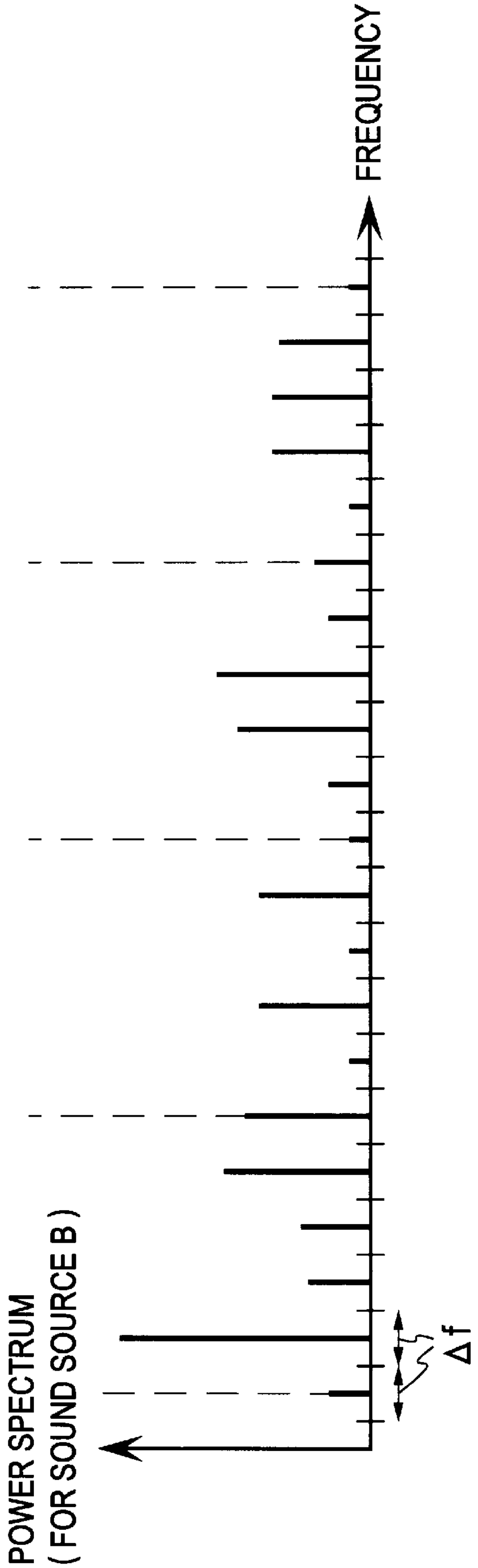

Returning to FIGS. 1 and 2, the bandsplitter 4 divides the L and the R signal into frequency band signals L(f1), L(f2), . . . , L(fn), and frequency band signals R(f1), R(f2), . . . ,R(fn) (S04). This division may take place, for example, by using a discrete Fourier transform of each channel signal to convert it to a frequency domain signal, which is then divided into individual frequency bands. The bandsplitting takes place with a bandwidth, which may be 20 Hz, for example, for a voice signal, considering a difference in the frequency response of the signals from the sound sources A, B so that principally a signal component from only one sound source resides in each band. A power spectrum for the sound source A is obtained as illustrated in FIG. 4A, for example, while a power spectrum for the sound source B is obtained as illustrated in FIG. 4B. The bandsplitting takes place with a bandwidth $\Delta f$ of an order which permits the respective spectrums to be separated from each other. It will be seen then that as illustrated by broken lines connecting between corresponding spectrums, the spectrum for one of the sound sources is dominant, and the spectrum from the other sound source can be neglected. As will be understood from FIGS. 4A and 4B, the bandsplitting may also take place with a bandwidth of 2 Δf. In other words, each band may not contain only one spectrum. It is also to be noted that the discrete Fourier transform takes place every 20–40 ms, for example.

The band-dependent inter-channel time difference/level difference detector 5 detects a band-dependent inter-channel time difference or level difference between the channels of each corresponding band signal such as L(f1) and R(f1), . . . L(fn) and R(fn), for example, (S05). The band-dependent inter-channel time difference is detected uniquely by utilizing the inter-channel time difference $\Delta\tau_1$, $\Delta\tau_2$ which are detected by the inter-channel time difference detector 3. This detection takes place utilizing the equations given below.

$$\Delta\tau_1-\{(\Delta\phi i/(2\pi fi)+(ki1/fi)\}=\epsilon i1 \quad (3)$$

$$\Delta\tau_2-\{(\Delta\phi i/(2\pi fi)+(ki2/fi)\}=\epsilon i2 \quad (4)$$

where i=1, 2, . . . , n, and Δϕi represents a phase difference between the signal L(fi) and the signal R(fi). Integers ki 1, ki 2 are determined so that ϵi1, ϵi2 assume their minimum values. The minimum values of ϵi1 and ϵi2 are compared against each other, and the smaller one of them is chosen as an inter-channel time difference Δτj (j=1, 2), which represents an inter-channel time difference Δτij for the band i. This represents an inter-channel time difference for one of the sound source signals in that band.

The sound source determination signal selector 6 utilizes the band-dependent inter-channel time differences Δτ1j–Δτnj which are detected by the band-dependent inter-channel time difference/level difference detector 5 to render a determination in a sound source signal determination unit 601 which one of corresponding band signals L(f1)–L(fn) and R(f1)–R(fn) is to be selected (S06). By way of example, an instance in which $\Delta\tau_1$ which is calculated by the inter-channel time difference/level difference detector 3 represents an inter-channel time difference for the signal from the sound source A which is located close to the microphone of the L side while $\Delta\tau_2$ represents an inter-channel time difference for the signal from the sound source B which is located close to the microphone for the R side will be described.

In this instance, for the band i for which the time difference Δτij calculated by the band-dependent inter-channel time difference/level difference detector 5 is equal to $\tau_1$, the sound source signal determination unit 601 opens a gate 602 Li, whereby an input signal L(fi) of the L side is directly delivered as SA(fi) while for an input signal R(fi) for the band i of the R side, the sound source signal determination unit 601 closes a gate 602 R, whereby SB(fi) is delivered as 0. Conversely, for the band i for which the time difference Δτij is equal to $\Delta\tau_2$, the signal L(fi) for the L side is delivered as SA(fi)=0, and the input signal R(fi) for the R side is directly delivered as SB(fi). Thus, as shown in FIG. 1, the band signals L(f1)–L(fn) are fed to a signal combiner 7A through gates 602L1–602Ln, respectively, while the band signal R(f1)–R(fn) are fed to signal combiner 7B through gates 602R1–602Rn, respectively. Δτ1j–Δτnj are input to the sound source signal determination unit 601 within the sound source determination signal selector 6, and for the band i for which Δτij is determined to be equal to $\Delta\tau_1$, gate control signals Cli=1 and Cli=0 are produced, thus controlling the corresponding gates 602Li and 602Ri to be opened and closed, respectively. For the band i for which Δτij is determined to be equal to $\Delta\tau_2$, the gate control signals Cli=0 and CRi=1 are produced, controlling the corresponding gates 602Li and 602Ri to be closed and opened, respectively. It should be noted that the above description is given to describe the functional arrangement, but in practice, a digital signal processor, for example, is used to achieve the described operation.

The signal combiner 7A combines signals SA(fi)–SA(fn), which are subjected to an inverse Fourier transform in the above example of bandsplitting to be delivered to an output terminal $t_A$ as a signal SA. Similarly, the signal combiner 7B combines signals SB(fi)–SB(fn), which are delivered to an output terminal $t_B$ as a signal SB.

It will be apparent from the foregoing description that, in the apparatus of the invention, a determination is rendered as to from which sound source each band component which is finely divided from the respective channel signal accrues, and the components thus determined are all delivered. Thus, unless frequency components of signals from the sound sources A, B overlap each other, the processing operation takes place without dropping any specific frequency band, and accordingly, it is possible to separate the signals from the sound sources A, B from each other while maintaining a high voice quality as compared with a conventional process in which only harmonic structures are extracted.

In the foregoing description, the sound source signal determination unit 601 determined a condition for determination by merely utilizing an inter-channel time difference and a band-dependent inter-channel time difference which are detected by the inter-channel time difference/level difference detector 3 and the band-dependent inter-channel time difference/level difference detector 5.

Figure 5:
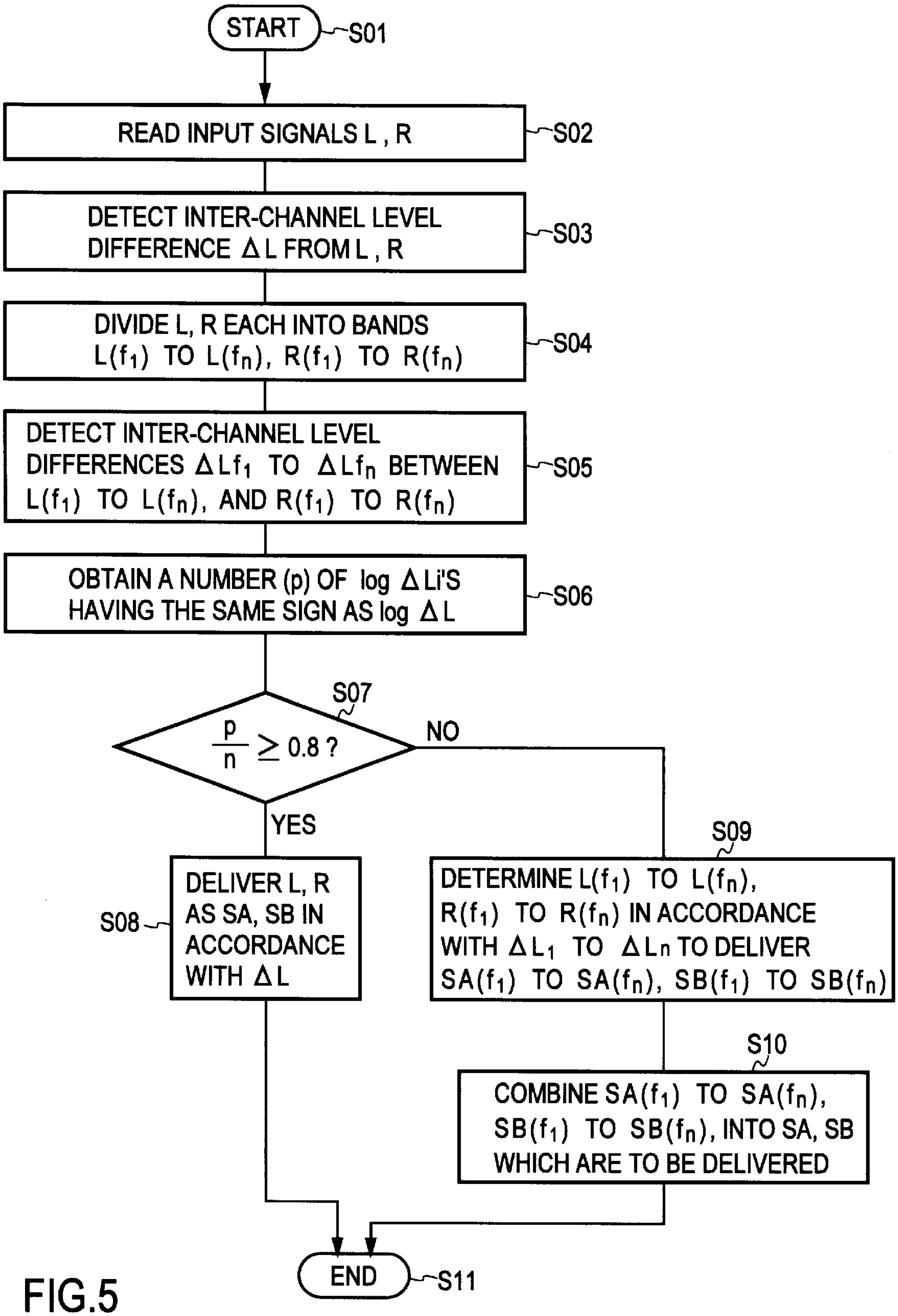
FIG. 5 is a flow diagram illustrating a processing procedure in a method of separating a sound source according to an embodiment of the invention in which the separation takes place by utilizing inter-channel level differences.

Another embodiment in which the condition for determination is determined by using a inter-channel level difference will now be described. Such an embodiment is illustrated in FIG. 5. As shown, the L and the R channel signal are received by the microphones 1, 2, respectively (S02), and inter-channel level difference ΔL between the L and the R channel signal is detected by the inter-channel time difference/level difference detector 3 (FIG. 1) (S03). In a similar manner as occurs at the step S04 shown in FIG. 2, the L and the R channel signal are each divided into n band-dependent channel signals L (f1)–L(fn) and R(f1)–R(fn) (S04), and band-dependent inter-channel level differences ΔL1, ΔL2, . . . , ΔLn between corresponding bands in the band-dependent channel signals L(f1)–L(fn) and R(f1)–R (fn) or between L(f1) and R(f1), between L(f2) and R(f2), . . . and between L(fn) and R(fn) are detected (S05).

A human voice can be considered to remain in its steady state condition during an interval on the order 20–40 ms. Accordingly, the sound source signal determination unit 601 (FIG. 1) calculates, every interval of 20–40 ms, the percentage of bands relative to all the bands in which the sign of the logarithm of the inter-channel level difference ΔL and the sign of the logarithm of the band-dependent inter-channel level difference ΔLi is equal (either + or −). If the percentage is above a given value, for example, equal to or greater than 80% (S06, S07), the determination takes place only according to the inter-channel level difference ΔL for a subsequent interval of 20–40 ms(S08). If the percentage is less than 80%, the determination takes place according the band-dependent inter-channel level difference ΔLi for every band during a subsequent interval of 20–40 ms (S09). The determination takes place in a manner such that when the determination takes place according to the inter-channel level difference ΔL for all the bands and when ΔL is positive, the L channel signal L(t) is directly delivered as the signal SA while the R channel signal R(t) is delivered as a signal SB=0. Conversely, if ΔL is equal to or less than 0, the L channel signal L(t) is delivered as the signal SA=0 while the R channel signal R(t) is directly delivered as the signal SB. However, it should be understood that this applies when a value which is obtained by subtracting the R side from the L side is used as the inter-channel level difference. When the determination takes place for each band using the band-dependent inter-channel level difference ΔLi, the L side divided signal L(fi) are directly delivered as the signal SA(fi) while the R side divided signals R(fi) are delivered as signal SB(fi) equal to 0 when the band-dependent inter-channel level difference ΔLi for each band fi is positive. When the level difference ΔLi is equal to or less than 0, the L side divided signals L(fi) are delivered as signal SA(fi) equal to 0 while the R side divided signals R(fi) are delivered as signal SB(fi). In this manner, the sound source signal determination unit 601 provide gate control signals CL1–CLn, CR1–CRn, which control gates 602 L1–602 Ln, 602 R1–602 Rn, respectively. As mentioned previously, this description applies when a value obtained by subtracting the R side from the L side is used for the band-dependent inter-channel level difference. As in the previous embodiment, the signals SA(f1)–SA(fn) and signals SB(f1)–SB(fn) are delivered to output terminals tA, tB, respectively, as sound source signals SA, SB (S10).

In the above embodiment, only one of a difference in the time of arrival and the level difference is utilized as the condition for determination which is used in the sound source signal determination unit 601. However, when only the level difference is used, it is possible that the levels of L(fi) and R(fi) compare equally in low frequency bands, and it is then difficult to determine the level difference accurately. Also, when only the time difference is used, a phase rotation presents a difficulty in correctly calculating the time difference in high frequency bands. In view of these, it may be advantageous to use the time difference in low frequency bands and to use the level difference in high frequency bands for the determination rather than using a single parameter over the entire band.

Accordingly, a further embodiment in which the band-dependent inter-channel time difference and band-dependent inter-channel level difference are both used in the sound source signal determination unit 601 will be described with reference to FIG. 6 and subsequent figures. A functional block diagram for this arrangement remains the same as shown in FIG. 1, but a processing operation which takes place in the inter-channel time difference/level difference detector 3, the band-dependent inter-channel time difference/level difference detector 5 and the sound source signal determination unit 601 becomes different as mentioned below. The inter-channel time difference/level difference detector 3 delivers a single time difference Δτ such as a mean value of absolute magnitudes of the detected time differences Δτ1, Δτ2 or only one of Δτ1, Δτ2 if they are relatively close to each other. It is to be noted that while the inter-channel time differences Δτ1, Δτ2, Δτ are calculated before the channel signals L(t), R(t) are divided into bands on the frequency axis, it is also possible to calculate such time differences after the bandsplitting.

Referring to FIG. 5, the L channel signal L(t) and the R channel signal R(t) are read every frame (which may be 20–40 ms, for example) (S02), and the bandsplitter 4 divides the L and R channel signals into a plurality of frequency bands, respectively. In the present example, a Humming window is applied to the L channel signal L(t) and the R channel signal R(t) (S03), and then they are subject to a Fourier transform to obtain divided signals L(f1)–L(fn), R(f1)–R(fn) (S04).

The band-dependent inter-channel time difference/level difference detector 5 then examines if the frequency fi of the divided signal is a band (hereafter referred to as a low band which corresponds to 1/(2Δτ) (where Δτ represents a channel time difference) or less (S05). If this is the case, a band-dependent inter-channel phase difference Δϕi is delivered (S08). It is then examined if the frequency f of the divided signal is higher than 1/(2Δτ) and less than 1/Δτ (hereafter referred to as a middle band) (S06). If the frequency lies in the middle band, the band-dependent inter-channel phase difference Δϕi and level difference ΔL i are delivered (S09). Finally, it is examined if the frequency f of the divided signal lies in a band corresponding to 1/Δτ or higher (hereafter referred to as a high band) (S07), and for the high band, the band-dependent inter-channel level difference ΔL i is delivered (S10).

The sound source signal determination unit 601 uses the band-dependent inter-channel phase difference and the level difference which are detected by the band-dependent inter-channel time difference/level difference detector 5 to determine which one of L(f1)–L(fn) and R(f1)–R(fn) is to be delivered. It is to be noted that a value which is obtained by subtracting the R side value from the L side value is used for the phase difference Δϕi and the level difference ΔL in the present example.

Figure 7:
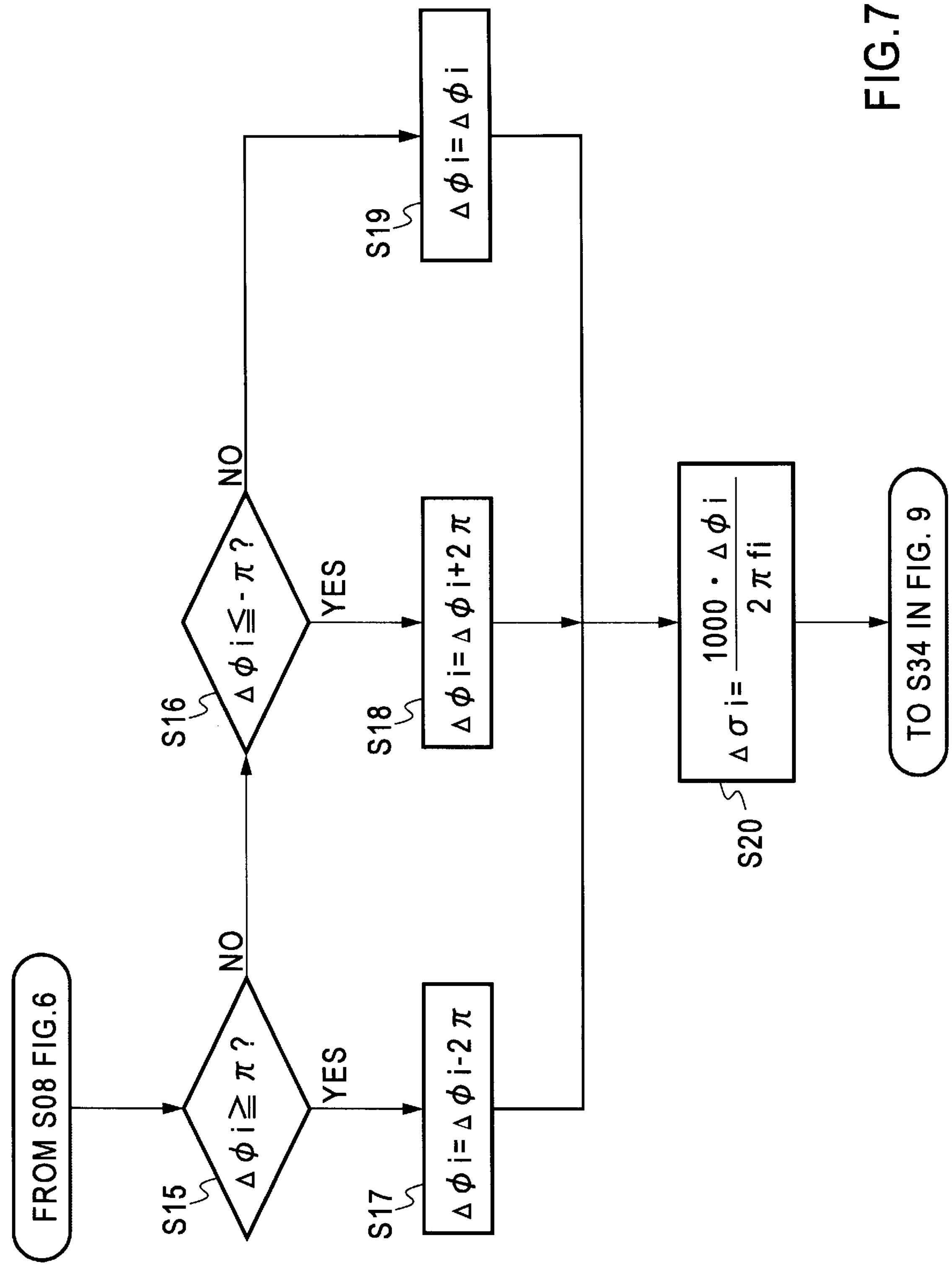
FIG. 7 is a flow diagram which continues to step S08 shown in FIG. 6.

Referring to FIG. 7, for signals L(fi), R(fi) which are determined as lying in the low band, an examination is initially made to see if the phase difference Δϕi is equal to or greater than π (S15). If the phase difference is equal to or greater than π, 2π is subtracted from Δϕi to update Δϕi (S17). If it is found at step S15 that Δϕi is less than π, an examination is made to see if it is equal to or less than −π (S16). If it is equal to or less than −π, 2π is added to Δϕi to update Δϕi (S18). If it is found at step S16 that the phase difference is not equal to or less than −π, Δϕi is used without change (S19). The band-dependent inter-channel phase difference Δϕi which is determined at steps S17, S18 and S19 is converted into a time difference Δσi according to the equation given below (S20).

$$\Delta\sigma i = 1000 \times \Delta\phi i / 2\pi fi \tag{5}$$

Figure 8:
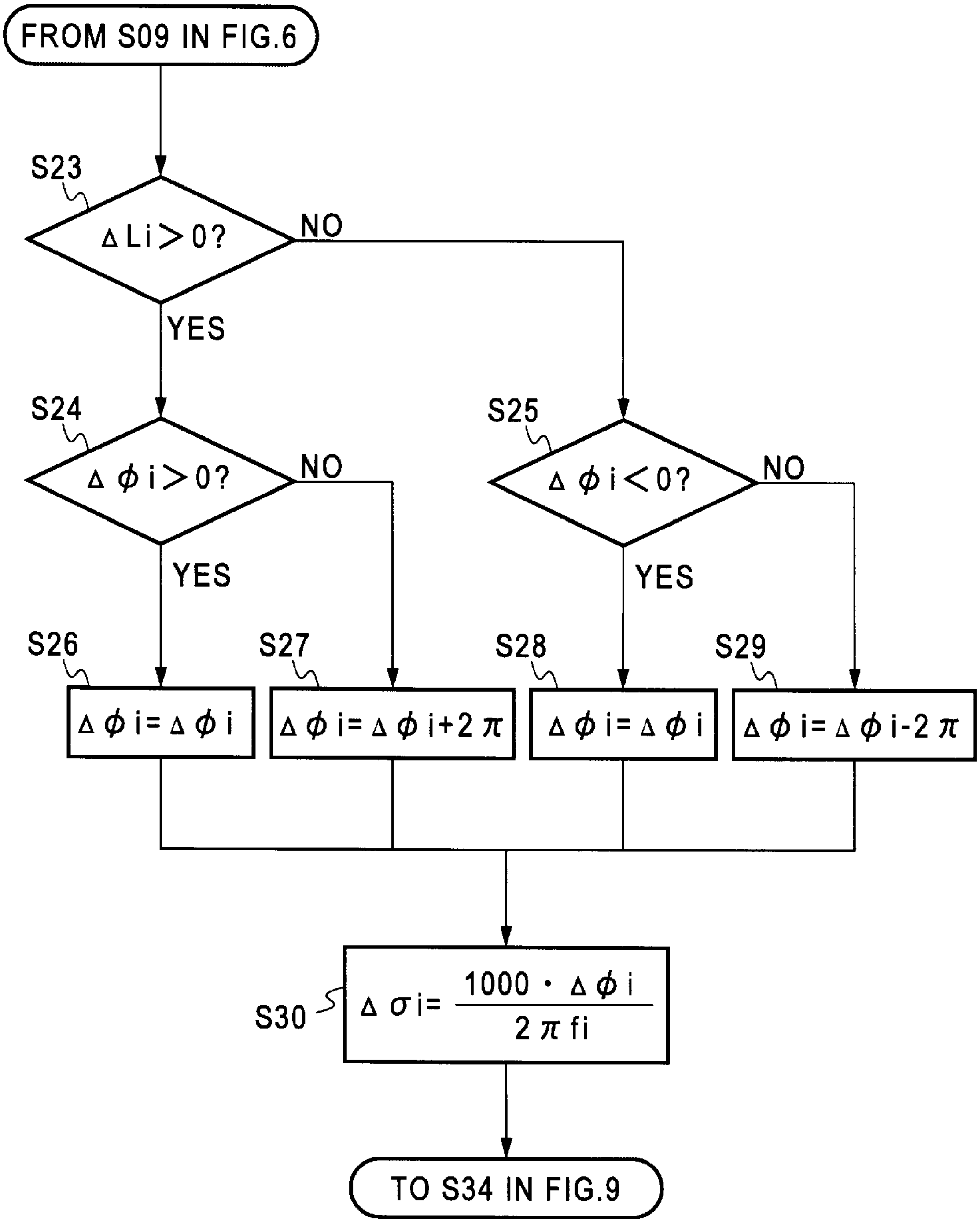
FIG. 8 is a flow diagram which continues to step S09 shown in FIG. 6.

When the divided signals L(fi), R(fi) are determined as lying in the middle band, the phase difference Δϕi is determined uniquely by utilizing the band-dependent inter-channel level difference ΔL(fi) as indicated in FIG. 8. Specifically, an examination is made to see if ΔL(fi) is positive (S23), and if it is positive, an examination is again made to see if the band-dependent inter-channel phase difference Δϕi is positive (S24). If the phase difference is positive, this Δϕi is directly delivered (S26). If it is found at step S24 that the phase difference is not positive, 2π is added to Δϕi to update it (S27). If it is found at step S23 that ΔL(fi) is not positive, an examination is made to see if the band-dependent inter-channel phase difference Δϕi is negative (S25), and if it is negative, this Δϕi is directly delivered (S28). If it is found at step S25 that the phase difference is not negative, 2π is subtracted from Δϕi to update it for delivery (S29). Δϕi which is determined at one of the steps S26 to S29 is used in the equation given below to determine a band-dependent inter-channel time difference Δσi (S30).

$$\Delta\sigma i = 1000 \times \Delta\phi i / 2\pi fi \tag{6}$$

In the manner mentioned above, the band-dependent inter-channel time difference Δσi in the low and the middle band as well as the band-dependent inter-channel level difference ΔL(fi) in the high band are obtained, and sound source signal is determined in accordance with these variables in a manner mentioned below.

Figure 9:
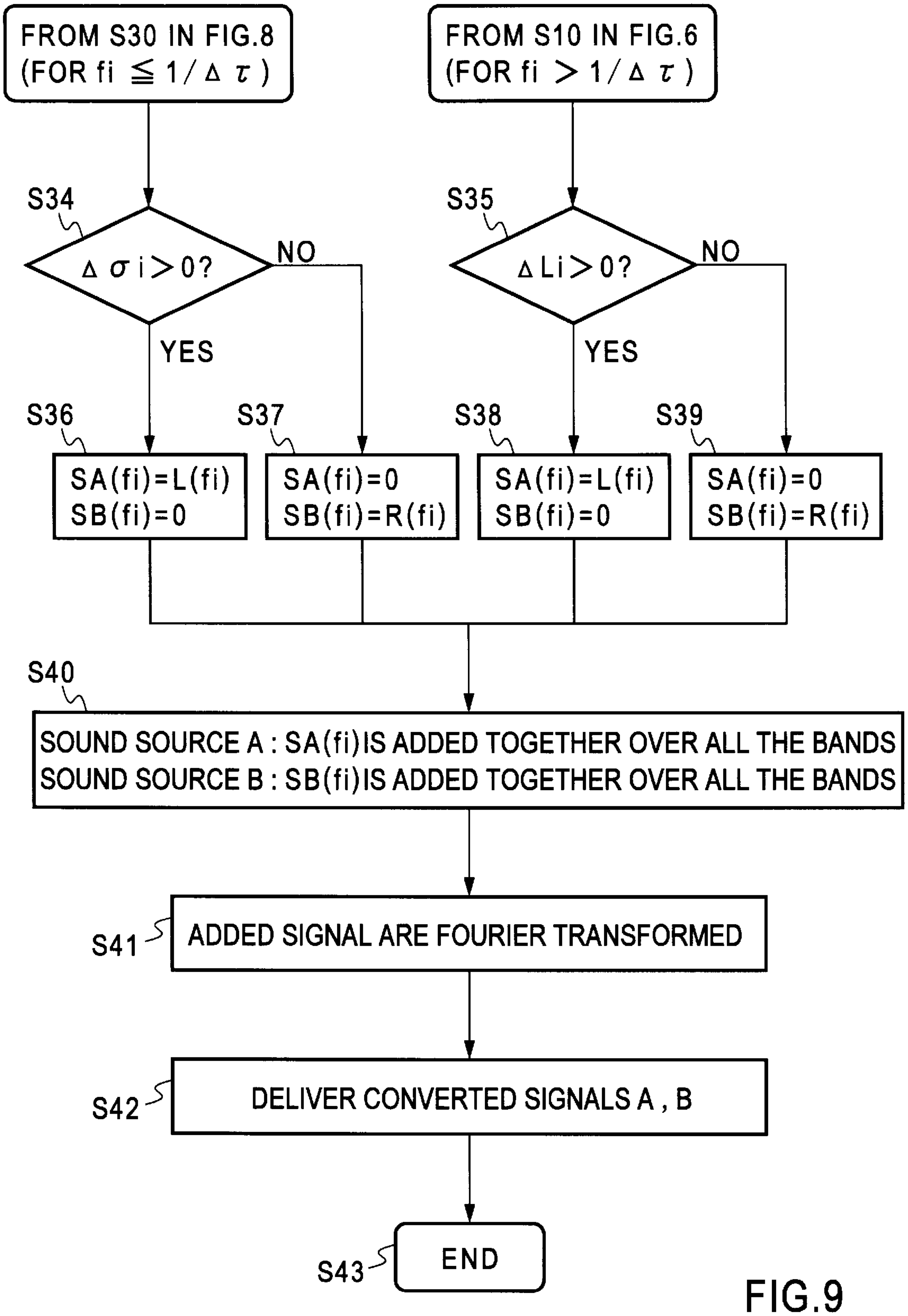
FIG. 9 is a flow diagram which continues to step S10 shown in FIG. 6 and which also continues to steps S20 and S30 shown in FIG. 7 and 8, respectively.

Referring to FIG. 9, by utilizing the phase difference Δφi in the low and the middle bands and utilizing the level difference ΔLi in the high band, the respective frequency components of both channels are determined as signals of either applicable sound source, in a manner shown in FIG. 9. Specifically, for the low and the middle bands, an examination is made to see if the band-dependent inter-channel time difference Δφi which is determined in manners illustrated in FIGS. 7 and 8 is positive (S34), and if it is positive, the L side channel signal L(fi) of the band i is delivered as the signal SA(fi) while the R side band channel signal R(fi) is delivered as the signal SB(fi) of 0 (S36). Conversely, if it is found at step S34 that band-dependent inter-channel time difference Δφi is not positive, SA(fi) is delivered as 0 while the R side channel signal R(fi) is delivered as SB(fi) (S37).

Figure 6:
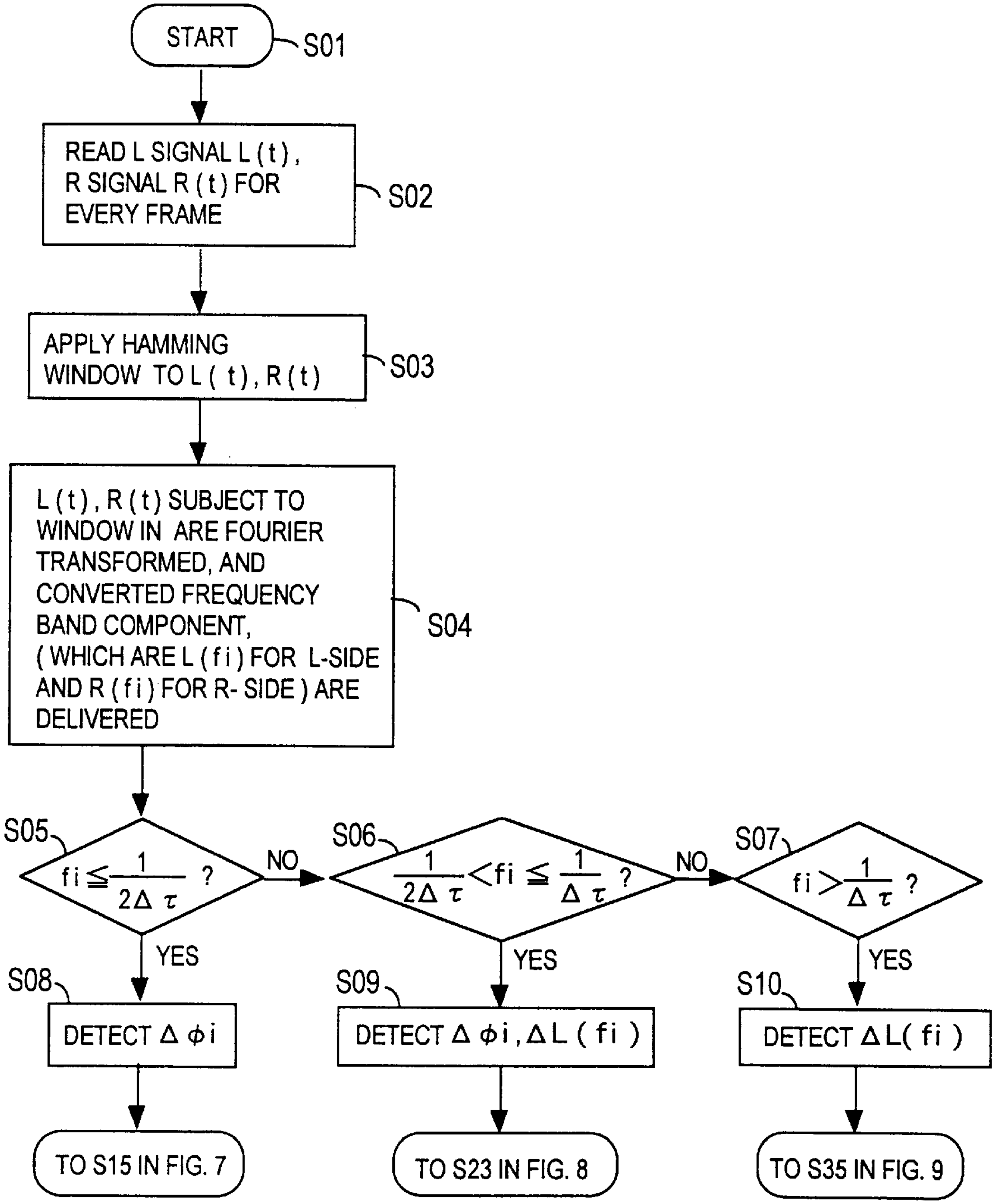
FIG. 6 is a flow diagram showing a part of a processing procedure according to the method of separating a sound source according to the embodiment of the invention in which both inter-channel level differences and inter-channel time-of-arrival differences are utilized.

For the high band, an examination is made to see if the band-dependent inter-channel level difference ΔL(fi) which is detected at step S10 in FIG. 6 is positive (S35), and if it is positive, the L side channel signal L(fi) is delivered as signal SA(fi) while 0 is delivered as SB(fi) (S38). If it is found at step S35 that the level difference ΔLi is not positive, 0 is delivered as signal SA(fi) while the R side channel signal R(fi) is delivered as SB(fi) (S39).

In the manner mentioned above, the L side or R side signal is delivered from the respective bands, and the signal combiners 7A, 7B add the frequency components thus determined over the entire band (S40) and the added sum is subjected to the inverse Fourier transform (S41), thus delivering the transformed signals SA, SB (S42).

In the present embodiment, by utilizing a parameter which is preferred for the separation of the sound source for every frequency band in the manner mentioned above, it is possible to achieve the separation of a sound source with a higher separation performance than when a single parameter is used over the entire band.

The invention is also applicable to three or more sound sources. By way of example, the separation of sound source when the number of sound sources is equal to three and the number of microphones is equal to two by utilizing the difference in the time of arrival to the microphones will be described. In this instance, when the inter-channel time difference/level difference detector 3 calculates an inter-channel time difference for the L and the R channel signal for each sound source, the inter-channel time differences $\Delta\tau_1$, $\Delta\tau_2$, $\Delta\tau_3$ for the respective sound source signals are calculated by determining points in time when a first rank to a third rank peak in the cumulative frequency occurs in the histogram which is normalized by the power of the cross-correlations as illustrated in FIG. 3. Also, the band-dependent inter-channel time difference/level difference detector 5 determines the band-dependent inter-channel time difference for each band as to be one of $\Delta\tau_1$ to $\Delta\tau_3$. This manner of determination remains similar as used in the previous embodiments using the equations (3), (4). The operation of the sound source signal determination unit 601 will be described for an example in which $\Delta\tau_1>0$, $\Delta\tau_2 0$, $\Delta\tau_3<0$. It is assumed that $\Delta\tau_1$, $\Delta\tau_2$, $\Delta\tau_3$ represent the inter-channel time differences for the signals from the sound sources A, B, C, respectively, and it is also assumed that these values are derived by subtracting the R side value from the L side value. In this instance, the sound source A is located close to the L side microphone 1 while the sound source B is located close to the R side microphone 2. Thus, it is possible to separate the signal from the sound source A on the basis of the L channel signal, to which a signal for the band where the band-dependent inter-channel time difference is equal to $\Delta\tau_1$ is added, and to separate the signal for the sound source B on the basis of the L channel signal, to which the signal for the band in which the band-dependent inter-channel time difference is equal to $\Delta\tau_2$ is added. The signal from the sound source C is separated on the basis of the R channel signal, to which the signal for the band in which the band-dependent inter-channel time difference is equal to $\Delta\tau_3$ is added.

Figure 10:
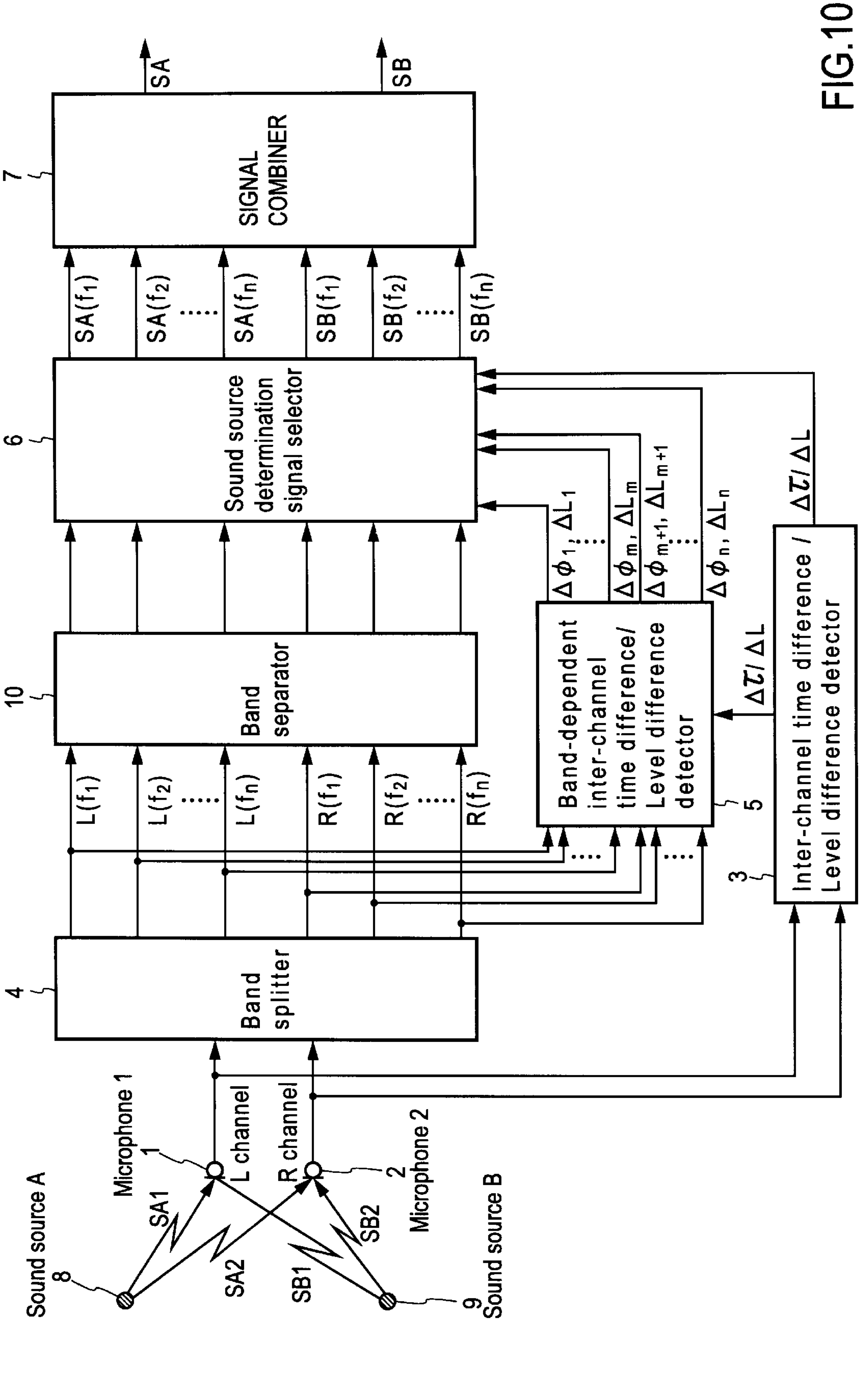
FIG. 10 is a functional block diagram of an embodiment in which sound source signals of different frequency bands are separated from each other.

In the above description, sound source signals are separated, and the separated sound source signals SA, SB have been separately delivered. However, if one of the sound sources, A, is a voice uttered by a speaker while the other sound source B represents a noise, the invention can be applied to separate and extract the signal from the sound source A from the mixture with the noise while suppressing the noise. In such an instance, the signal combiner 7A may be left while the source signal combiner 7B, gates 602R1–602Rn shown within a dotted line frame 9 may be omitted in the arrangement of FIG. 1.

Where the frequency band of one of the sound sources, A, is broader than the frequency band of the other sound source B and the respective frequency bands are previously known, a band separator 10 as shown in FIG. 10 may be used in the arrangement of FIG. 1 to separate a frequency band where there is no overlap between both sound source signals. To give an example, it is assumed that the signal A (t) of the sound source A has a frequency band of f1–fn while the signal B(t) from the sound source B has a frequency band of f1–fm (where fn>fm). In this instance, a signal in the non-overlapping band fm+1–fn can be separated from the outputs of the microphones 1, 2. The sound source signal determination unit 601 does not render a determination as to the signal in the band fm+1–fn, and optionally a processing operation by the band-dependent inter-channel time difference/level difference detector 5 may also be omitted. The sound source signal determination unit 601 controls the sound source signal selector 602 in a manner such that the R side divided band channel signals R(fm+1)–R(fn), which are selected as channel signal SB(t) from the sound source B, are delivered as SB(fm+1)–SB(fn) while 0 is delivered as SA(fm+1)–SA(fn). Thus, gates 602Lm+1–602Ln are normally closed while gates 602Rm+1–602Rn are normally open.

In the foregoing description, a determination has been rendered to which microphone a particular band signal is close depending on the positive or negative polarity of the respective band-dependent inter-channel time difference Δσi or the positive or negative polarity of the respective band-dependent inter-channel level difference ΔLi, thus using 0 as a threshold. This applies when the sound sources A and B are symmetrically located on the opposite sides of a bisector of a line joining the microphone 1. Where this relationship does not apply, a threshold can be determined in a manner mentioned below.

A band-dependent inter-channel level difference and band-dependent inter-channel time difference when a signal from the sound source A reaches the microphones 1 and 2 are denoted by $\Delta L_A$ and $\Delta\tau_A$ while a band-dependent inter-channel level difference and band-dependent inter-channel time difference when a signal from the sound source B reaches the microphones 1 and 2 are denoted by $\Delta L_B$ and $\Delta\tau_B$, respectively. At this time, a threshold ΔLth for the band-dependent inter-channel level difference may be chosen as $$\Delta Lth=(\Delta L_A+\Delta L_I)/2$$

and a threshold value $\Delta\tau_{th}$ for the band-dependent inter-channel time difference may be chosen as $\Delta\tau th=(\Delta\tau A+\Delta\tau B)/2$ In the embodiment mentioned previously, $\Delta LB=-\Delta LA$, $\Delta\tau B=-\Delta\tau A$. Hence, $\Delta Lth=0$ and $\Delta\tau th=0$. The microphones 1, 2 are located so that the two sound sources are located on opposite sides of the microphones 1, 2 in order that a good separation between the sound sources can be achieved. However, under certain circumstances, the distance and direction with respect to the microphones 1, 2 cannot be accurately known and in such instance, the thresholds ΔLth, Δτth may be chosen to be variable so that these thresholds are adjustable to enable a good separation.

It is possible with the described embodiments that an error may occur in the band-dependent inter-channel time difference or band-dependent inter-channel level difference under the influence of reverberations or diffractions occurring in the room, preventing a separation of the respective sound source signals from being achieved with a good accuracy. Another embodiment which accommodates for such a problem will now be described. In an example shown in FIG. 11, microphones M1, M2, M3 are disposed at the apices of an equilateral triangle measuring 20 cm on a side, for example. The space is divided in accordance with the directivity of the microphones M1 to M3, and each divided sub-space is referred to as a sound source zone. Where all of the microphones M1 to M3 are non-directional and exhibit similar response, the space is divided into six zones Z1–Z6, as illustrated in FIG. 12, for example. Specifically, six zones Z1–Z6 are formed about a center point Cp at an equi-angular interval by rectilinear lines, each passing the respective microphones M1, M2, M3 and the center point Cp. The sound source A is located within the zone Z3 while the sound source B is located within the zone Z4. In this manner, the individual sound source zones are determined on the basis of the disposition and the responses of the microphones M1–M3 so that one sound source belongs to one sound source zone.

Figure 11:
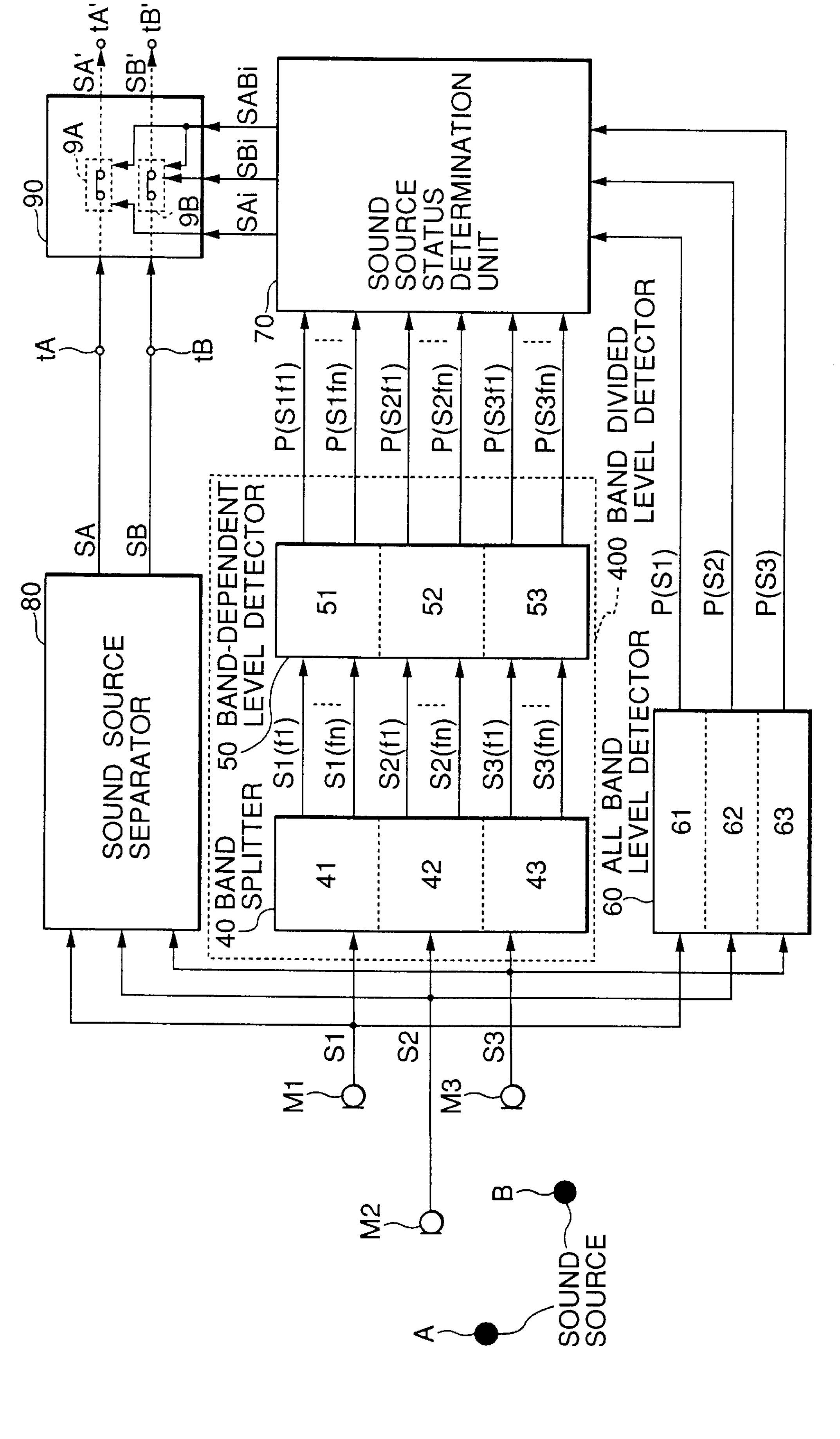
FIG. 11 is a functional block diagram of an apparatus for separation of a sound source according to another embodiment of the invention in which an arrangement is added to suppress an unnecessary sound source signal utilizing a level difference.
Figure 12:
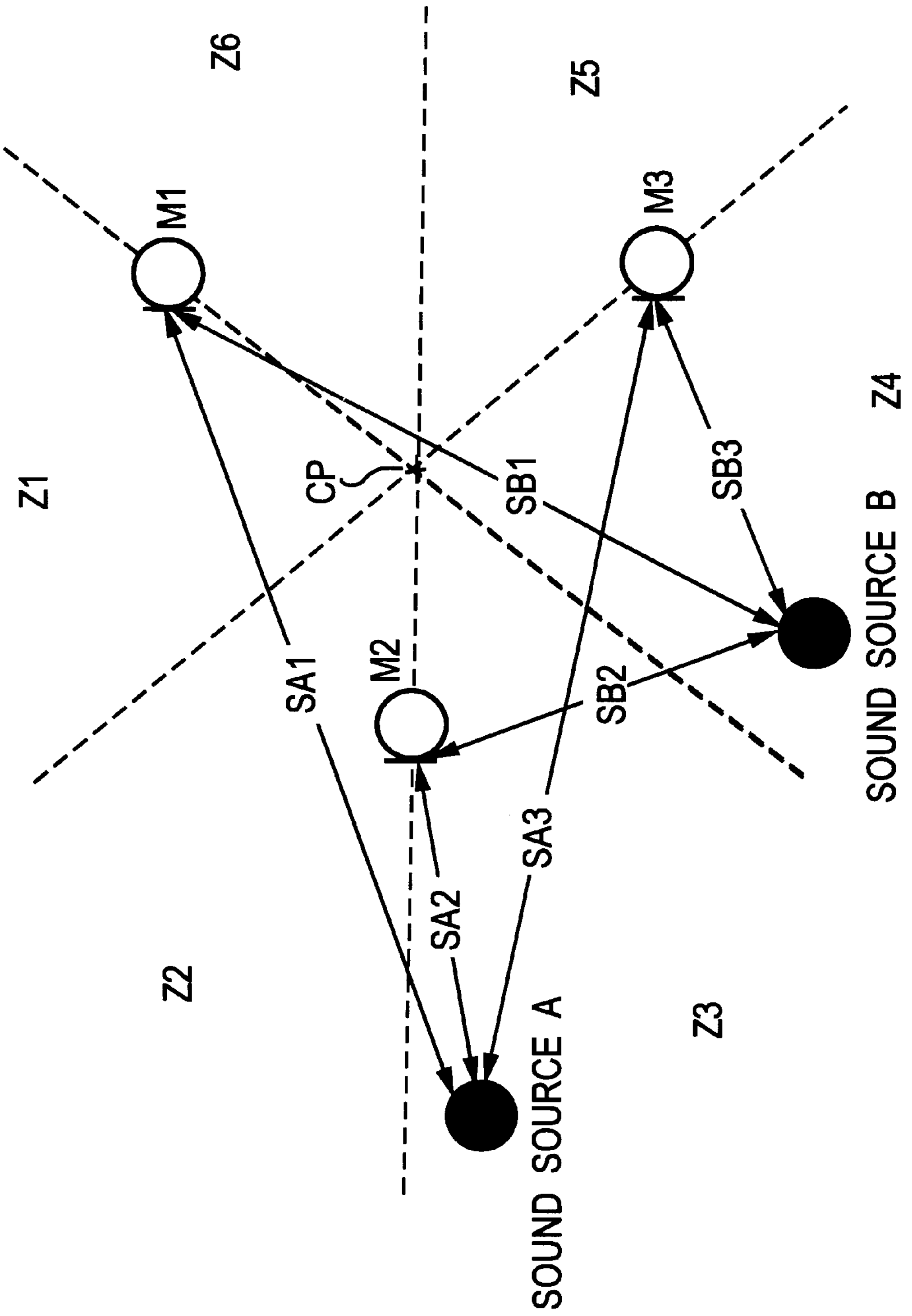
FIG. 12 is a schematic illustration of the layout of three microphones, their coverage zones and two sound sources.

Referring to FIG. 11, a bandsplitter 41 divides an acoustic signal S1 of a first channel which is received by the microphone M1 into n frequency band signals S1(f1)–S1 (fn). A bandsplitter 42 divides an acoustic signal S2 of a second channel which is received by the microphone M2 into n frequency band signals S2 (f1)–S2 (fn), and a bandsplitter 43 divides an acoustic signal S3 of a third channel which is received by the microphone M3 into n frequency band signals S3(f1)–S3(fn). The bands f1–fn are common to the bandsplitters 41–43 and a discrete Fourier transform may be utilized in providing such bandsplitting.

A sound source separator 80 separates a sound source signal using the techniques mentioned above with reference to FIGS. 1 to 10. It should be noted, however, that since there are three microphones in the arrangement of FIG. 11, a similar processing as mentioned above is applied to each combination of two of the three channel signals. Accordingly, the bandsplitters 41–43 may also serve as bandsplitters within the sound source separator 80.

A band-dependent level (power) detector 51 detects level (power) signals P(S1f1)–P(S1fn) for the respective band signals S1(f1)–S1(fn) which are obtained by the bandsplitter 41. Similarly, band-dependent level detectors 52, 53 detect the level signals P(S2f1)–P(S2fn), P(S3f1)–P(S3fn) for the band signals S2(f1)–S2(fn), S3(f1)–S3(fn) which are obtained in the bandsplitters 42, 43, respectively. The band-dependent level detection can also be achieved by using the Fourier transforms. Specifically, each channel signal is resolved into a spectrum by the discrete Fourier transform, and the power of the spectrum may be determined. Accordingly, a power spectrum is obtained for each channel signal, and the power spectrum may be band splitted. The channel signals from the respective microphones M1–M3 may be band splitted in a band-dependent level detector 400, which delivers the level (power).

On the other hand, an all band level detector 61 detects the level (power) P(S1) of all the frequency components contained in an acoustic signal S1 of a first channel which is received by the microphone M1. Similarly, all band level detectors 62, 63 detect levels P(S2), P(S3) of all frequency components of acoustic signals S2, S3 of second and third channels 2, 3 which are received by the microphones M2, M3, respectively.

A sound source status determination unit 70 determines, by a computer operation, any sound source zone which is not uttering any acoustic sound. Initially, the band-dependent levels P(S1f1)–P(S1fn), P(S2f1)–P(S2fn) and P(S3f1)–P (S3fn) which are obtained by the band-dependent level detector 50 are compared against each other for the same band signals. In this manner, a channel which exhibits a maximum level is specified for each band f1 to fn.

By choosing a number n of the divided bands which is above a given value, it is possible to choose an arrangement in which a single band only contains an acoustic signal from a single sound source as mentioned previously, and accordingly, the levels P(S1fi), P(S2fi), P(S3fi) for the same band fi can be regarded as representing acoustic levels from the same sound source. Consequently, whenever there is a difference between the P(S1fi), P(S2fi), P(S3fi) for the same band between the first to the third channel, it will be seen that the level for the band which comes from a microphone channel located closest to the sound source is at maximum.

As a result of the preceding processings, a channel which exhibits the maximum level is allotted to each of the bands f1–fn. A total number of bands $\chi1$, $\chi2$, $\chi3$ for which each of the first to the third channel exhibited the maximum level among n bands is calculated. It will be seen that the microphone of the channel which has a greater total number is located close to the sound source. If the total number is on the order of 90n/100 or greater, for example, it may be determined that the sound source is close to the microphone of that channel. However, if a maximum total number of highest level bands is equal to 53n/100, and a second maximum total number is equal to 49n/100, it is not certain if the sound source is located close to a corresponding microphone. Accordingly, a determination is rendered such that the sound source is located closest to the microphone of a channel which corresponds to the total number when the total number is at maximum and exceeds a preset reference value ThP, which may be on the order of n/3, for example.

The levels P(S1)–P(S3) of the respective channels which are detected by the all band level detector 60 is also input to the sound source determination unit 70, and when all the levels are equal to or less than a preset value ThR, it is determined that there is no sound source in any zone.

On the basis of a result of determination rendered by the sound source status determination unit 70, a control signal is generated to effect a suppression upon acoustic signals A, B which are separated by the sound source separator 80 in a signal suppression unit 90. Specifically, a control signal SAi is used to suppress (attenuate or eliminate) an acoustic signal SA; a control signal SBi is used to suppress an acoustic signal SB; and a control signal SABi is used to suppress both acoustic signals SA, SB. By way of example, the signal suppression unit 90 may include normally closed switches 9A, 9B, through which output terminals tA, tB of the sound source separator 80 are connected to output terminals tA', tB'. The switch 9A is opened by the control signal SAi, the switch 9B is opened by the control signal SBi, and both switches 9A, 9B are opened by the control signal SABi, obviously, the frame signal which is separated in the sound source separator 80 must be the same as the frame signal from which the control signal used for suppression in the signal suppression unit 90 is obtained. The generation of suppression (control signals SAi, SBi, SABi will be described more specifically.

When the sound sources A, B are located as shown in FIG. 12, microphones M1–M3 are disposed as illustrated to determine zones Z1–Z6 so that the sound sources A and B are disposed within separate zones Z3 and Z4. It will be seen that at this time, the distances SA1 SA2, SA3 from the sound source A to the microphones M1–M3 are related such that SA2<SA3<SA1. Similarly, distances SB1, SB2, SB3 from the sound source B to the respective microphones M1–M3 are related such that SB3<SB2<SB1.

When all of the detection signals P(S1)–P(S3) from the all band level detector 60 are less than the reference value ThR, the sound sources A, B are regarded as not uttering a voice or speaking, and accordingly, the control signal SABi is used to suppress both acoustic signals SA, SB. At this time, the output acoustic signals SA, SB are silent signals (see blocks 101 and 102 in FIG. 13).

When only the sound source A is uttering a voice, its acoustic signal reaches the microphone M2 at a maximum sound pressure level (power) for the frequency component of all the bands, and accordingly, the total number of bands $\chi 2$ for the channel corresponding to the microphone M2 is at maximum.

When only the sound source B is uttering a voice, its acoustic signal reaches the microphone M3 at a maximum sound pressure level for frequency components of all the bands, and accordingly the total number of bands $\chi 3$ for the channel corresponding to the microphone M3 is at maximum.

When both sound sources A, B are uttering a voice, the number of bands in which the acoustic signal reaches the maximum sound pressure level will be comparable between the microphones M2 and M3.

Accordingly, when the total number of bands in which the acoustic signal reaches the microphone at the maximum sound pressure level exceeds the reference value ThP mentioned above, a determination is rendered that there exists a sound source in the zone which is covered by this microphone, thus enabling a sound source zone in which an utterance of a voice is occurring to be detected.

Figure 13:
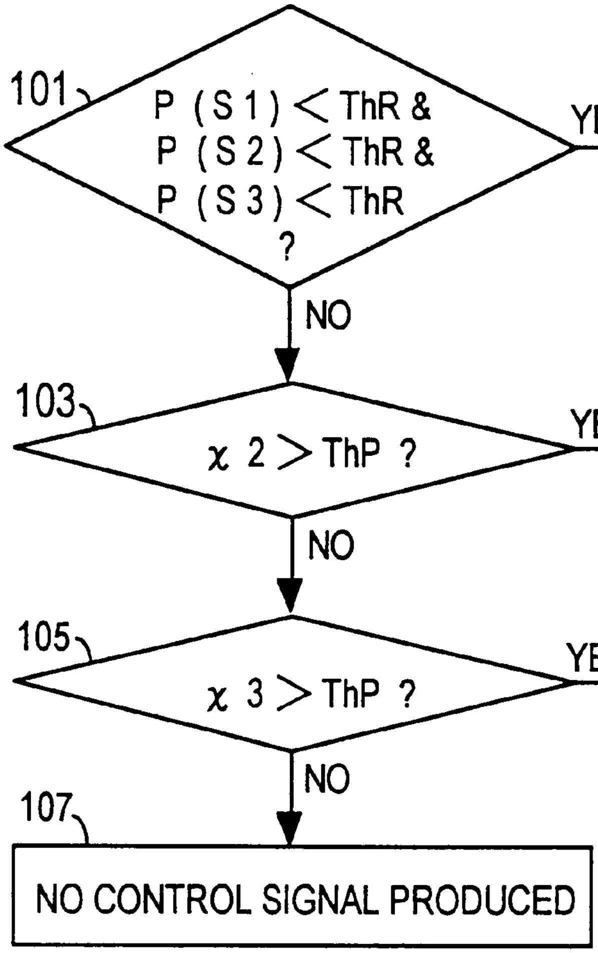
FIG. 13 is a flow diagram illustrating an exemplary procedure of detecting a sound source zone and generating a suppression control signal when only one sound source is uttering a voice.

In the above example, if only the sound source A is uttering a voice, only $\chi 2$ will exceed the reference value ThP, thus providing a detection that the uttering sound source exists only in the zone Z3 covered by the microphone M2. Accordingly, the control signal SBi is used to suppress the voice signal SB while allowing only the acoustic signal SA to be delivered (see blocks 103 and 104 in FIG. 13).

Where only the sound source B is uttering a voice, $\chi 3$ will exceed the reference value ThP, providing a detection that the uttering sound source exists in the zone Z4 covered by the microphone M3, and accordingly, the control signal SAi is used to suppress the acoustic signal SA while allowing the acoustic signal SB to be delivered alone (see blocks 105 and 106 in FIG. 13).

Finally, when both the sound sources A, B are uttering a voice, and when both $\chi 2$ and $\chi 3$ exceed the reference value ThP, a preference may be given to the sound source A, for example, treating this case as the utterance occurring only from the sound source A. The processing procedure shown in FIG. 13 is arranged in this manner. If both $\chi 2$ and $\chi 3$ fail to reach the reference value ThP, it may be determined that both sound sources A, B are uttering a voice as long as the levels P(S1)–P(S3) exceed the reference value ThR. In this instance, none of the control signals SAi, SBi, SABi is delivered, and the suppression of the sound source signals SA, SB in the signal suppression unit 90 does not take place (see block 107 in FIG. 13).

In this manner, the sound source signals SA, SB which are separated in the sound source separator 80 are fed to the sound source status determination unit 70 which may determine that a sound source is not uttering a voice, and a corresponding signal is suppressed in the signal suppression unit 90, thus suppressing unnecessary sound.

Figure 14:
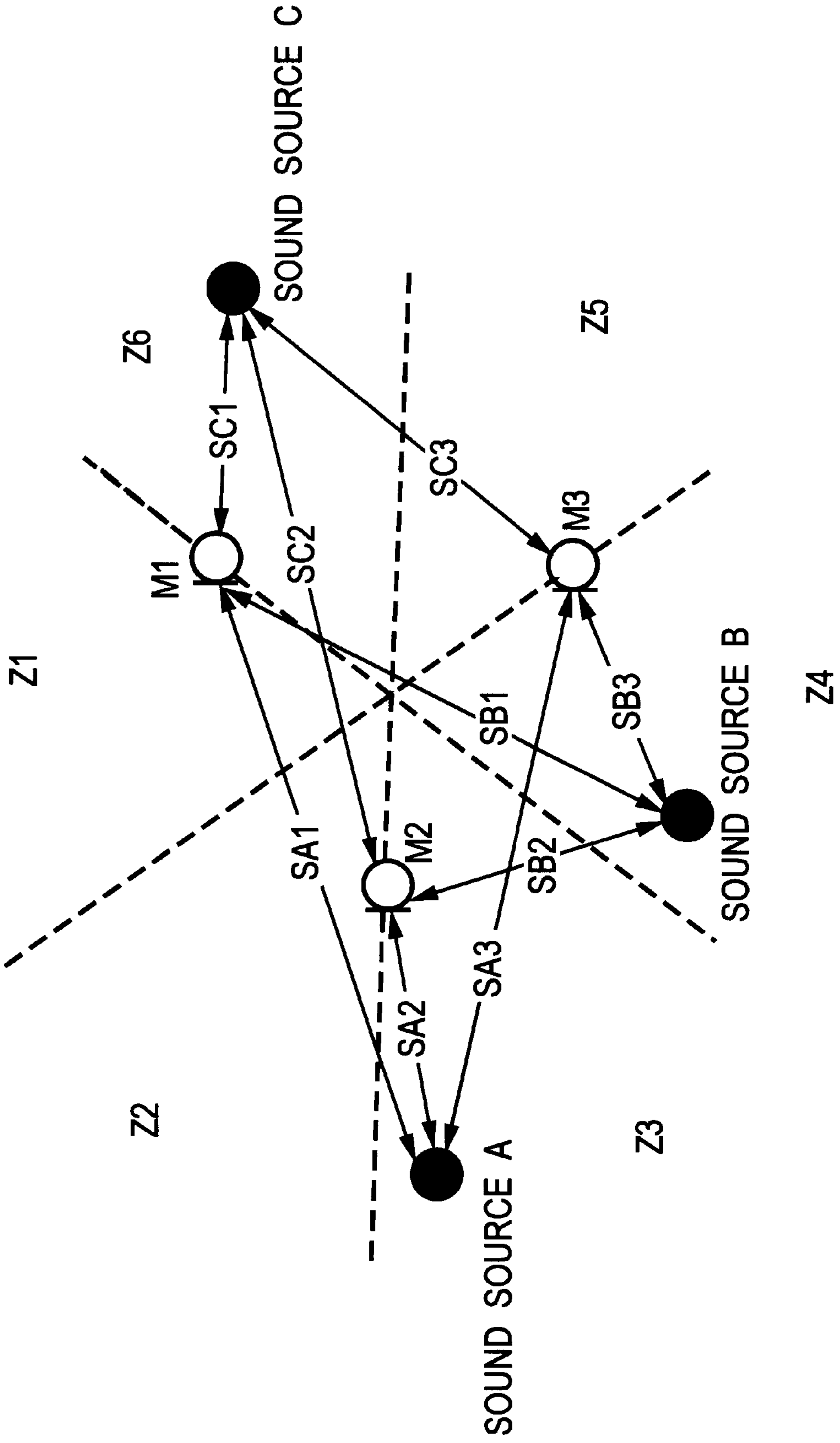
FIG. 14 is a schematic illustration of the layout of three microphones, their coverage zones and three sound sources.

A sound source C may be added to the zone Z6 in the arrangement shown in FIG. 12, as illustrated in FIG. 14. While not shown, in this instance, the sound source separator 80 delivers a signal SC corresponding to the sound source C in addition to the signals SA, SB corresponding the sound sources A, B, respectively.

The sound source status determination unit 70 delivers a control signal SCi which suppresses the signal SC to the signal suppression unit 90, in addition to the control signal SAi which suppresses the signal SA and the control signal SBi which suppresses the signal SB. Also, in addition to the control signal SABi which suppresses both the signal SA and the signal SB, a control signal SBCi which suppresses the signals SB, SC, a control signal SCAi which suppresses the signals SC, SA, and a control signal SABCi which suppresses all of the signals SA, SB, SC are delivered. The sound source status determination unit 70 operates in a manner illustrated in FIG. 15.

Figure 15:
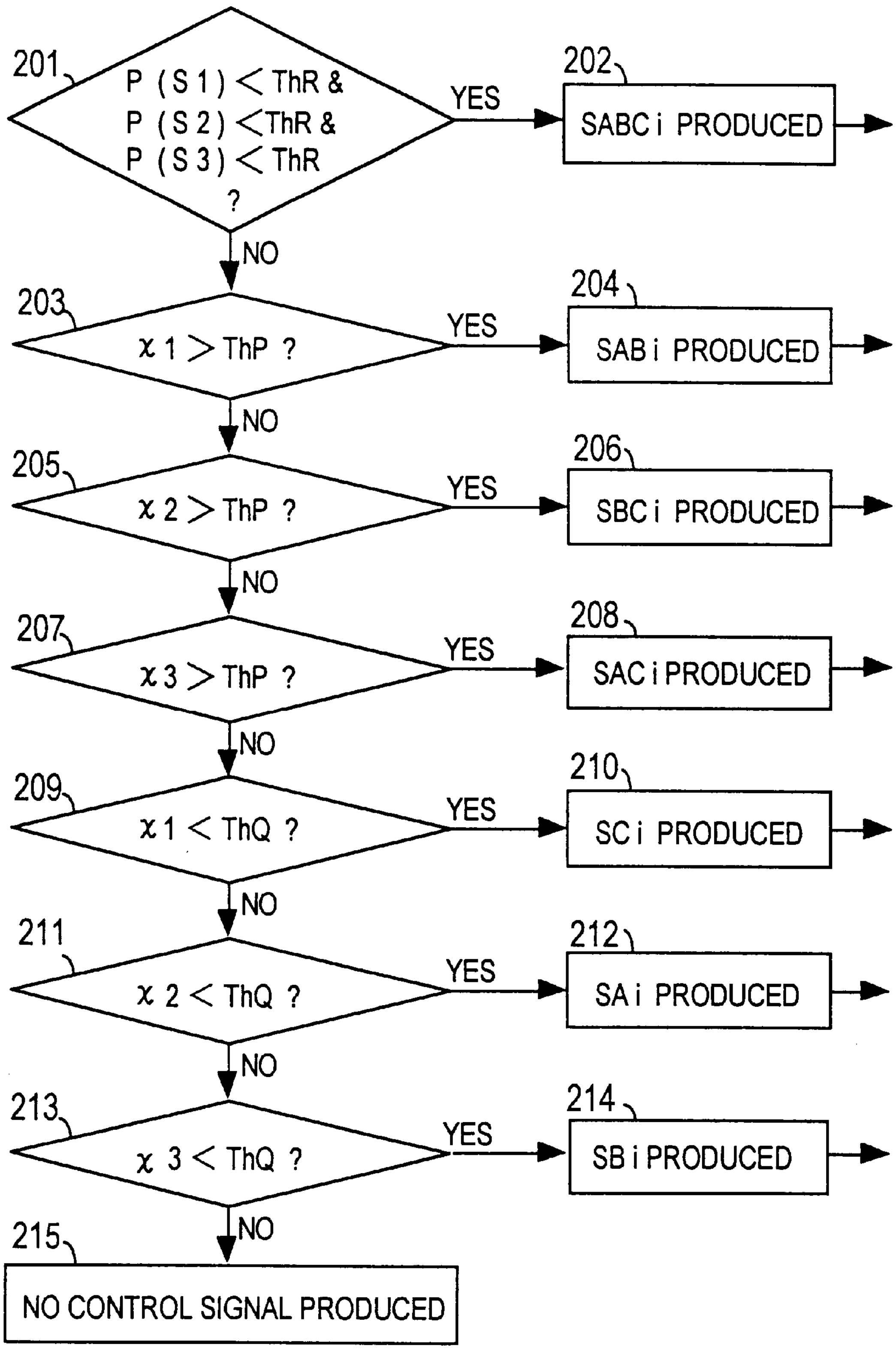
FIG. 15 is a flow diagram illustrating a procedure of detecting a zone for a sound source which is uttering a voice and generating a suppression control signal where there are three sound sources.

Initially, if none of the levels P(S1)–P(S3) exceed the reference ThR, a determination is rendered that none of the sound sources A to C are uttering a voice, and accordingly the sound source status determination unit 70 delivers the control signal SABCi, suppressing all of the signals SA, SB, SC (see blocks 201 and 202 in FIG. 15).

Then, if the sound source A, B or C is uttering a voice alone, one of the levels P(S1)–P(S3) exceeds the reference value ThR, and the level of the channel corresponding to the microphone which is located closest to the uttering sound source will be at maximum, in a similar manner as when there are two sound sources mentioned above, and accordingly, one of the channel band number $\chi 1$, $\chi 2$, $\chi 3$ will exceed the reference value ThP. If only the sound source C is uttering a voice, $\chi 1$ will exceed ThP, whereby the control signal SABi is delivered to suppress the signals SA, SB (see blocks 203 and 204 in FIG. 15). If only the sound source A is uttering a voice, the control signal SBCi is delivered to suppress the signals SB, SC. Finally, if only the sound source B is uttering a voice the control signal SACi is delivered to suppress the signals SA, SC (see blocks 205 to 208 in FIG. 15).

When any two of the three sound sources A to C are uttering a voice, the total number of bands in which the channel corresponding to the microphone located in a zone corresponding to the non-uttering sound source exhibits a maximum level will be reduced as compared with the other microphones. For example, when only the sound source C is not uttering a voice, the total number of bands $\chi 1$ in which the channel corresponding to the microphone M1 exhibits the maximum level will be reduced as compared with the total number of bands $\chi 2$, $\chi 3$ corresponding to other microphones M2, M3.

In consideration of this, a reference value ThQ (<ThP) may be established, and if $\chi 1$ is equal to or less than the reference value ThQ, a determination is rendered that of the zones Z5, Z6 each of which is bisected by the microphone M1 and M3, respectively, a sound source is not producing a signal in the zone Z6 which is located close to the microphone M1. In addition, of the zones Z1, Z2 which are bisected by the microphone M1 and M2, respectively, a determination is rendered that in zone Z1 located close to the microphone M1, sound source is not producing a signal.

In this manner, a sound source located in the zones Z1, Z6 is determined as not producing a signal. Since the sound source located in such zones represents the sound source C, it is determined that the sound source C is not producing a signal or that only the sound sources A, B are producing a signal. Accordingly, the control signal SCi is generated, suppressing the signal SC. In the arrangement shown in FIG. 14, if only one of the three sound sources A to C fails to utter a voice, the total number of bands $\chi 1$, $\chi 2$, $\chi 3$ which either microphone exhibits a maximum level will normally be equal to or less than the reference value ThP. Accordingly, steps 203, 205 and 207 shown in FIG. 15 are passed, and an examination is made at step 209 if $\chi 1$ is equal to or less than the reference value ThQ. If it is found that only the sound source C does not utter a voice, it follows $\chi 1 < ThQ$, generating the control signal SCi (see 210 in FIG. 15). If it is found at step 209 that $\chi 1$ is not less than ThQ, a similar examination is made to see if $\chi 2$, $\chi 3$ is equal to or less than ThQ. If either one of them is equal to or less than ThQ, it is estimated that only the sound source A or only the sound source B fails to utter a voice, thus generating the control signal SAi or SBi (see 211 to 214 in FIG. 15).

When it is determined at step 213 that $\chi 3$ is not less than ThQ, a determination is rendered that all of the sound sources A, B, C are uttering a voice, generating no control signal (see 215 in FIG. 15).

In this instance, assuming that ThP is on the order of 2n/3 to 3n/4, the reference value ThQ will be on the order of n/2 to 2n/3, or if ThP is on the order of 2n/3, ThQ will be on the order of n/2.

In the above example, the space is divided into six zones Z1 to Z6. However, the status of the sound source can be similarly determined if the space is divided into three zones Z1–Z3 as illustrated by dotted lines in FIG. 16 which pass through the center point Cp and through the center of the respective microphones. In this instance, if only the sound source A is uttering a voice, for example, the total number of bands $\chi 2$ of the channel corresponding to the microphone M2 will be at maximum, and a determination is rendered that there is a sound source in the zone Z2 covered by the microphone M2. When only the sound source B is uttering a voice, $\chi 3$ will be at maximum, and a determination is rendered that there is a sound source in the zone Z3. If $\chi 1$ is equal to or less than the preset value ThQ, a determination is rendered that a sound source located in the zone Z1 is not uttering a voice. By the operation mentioned above, when the space is divided into three zones, the status of a sound source can be determined in similar manner as when the space is divided into six zones.

In the above description, the reference values ThR, ThP, ThQ are used in common for all of the microphones M1–M3, but they may be suitably changed for each microphone. In addition, while in the above description the number of sound sources is equal to three and the number of microphones is equal to three, a similar detection is possible if the number of microphones is equal to or greater than the number of sound sources.

Figure 16:
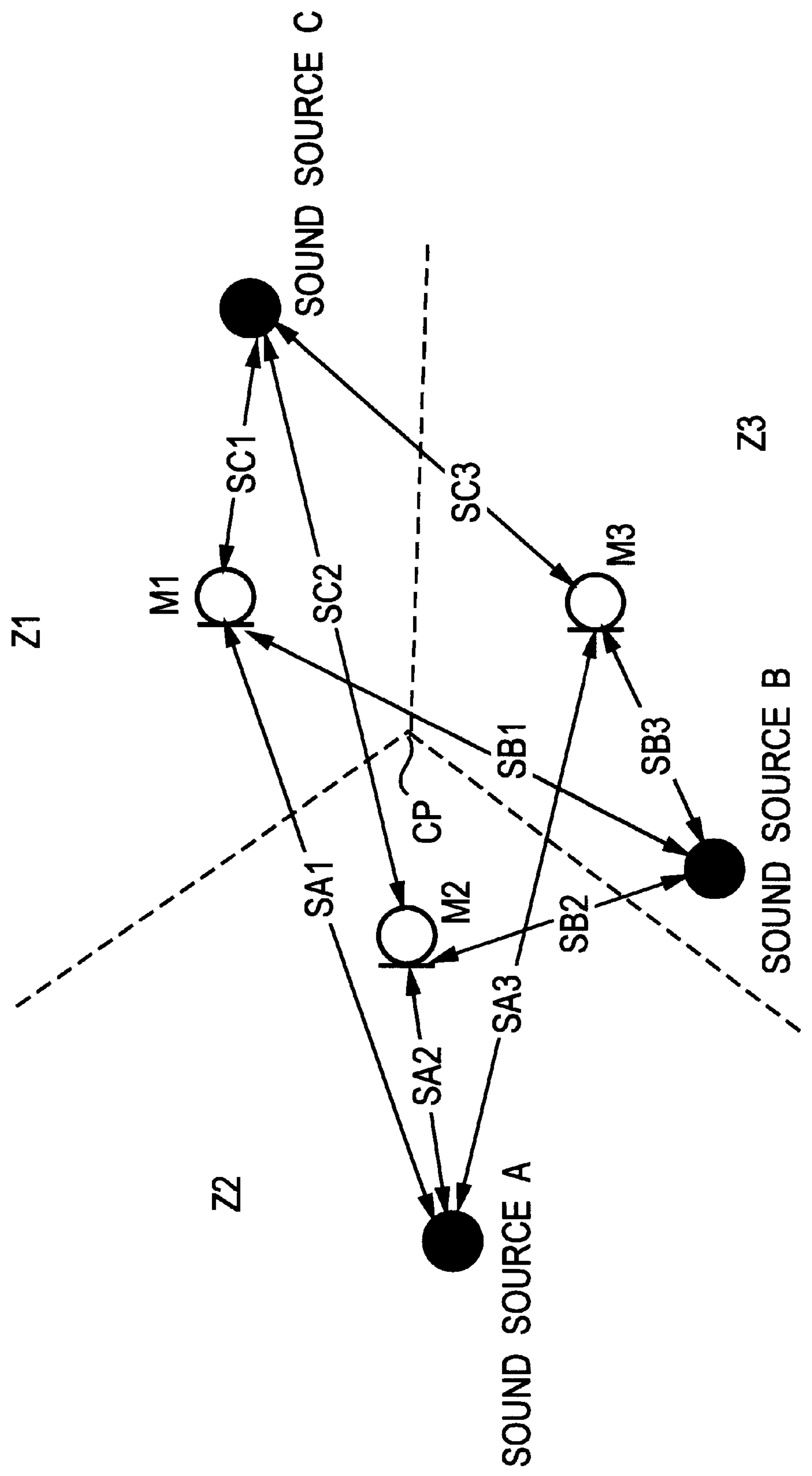
FIG. 16 is a schematic illustration of the layout in which three microphones are used to divide the space into three zones, also illustrating the layout of sound sources.

For example, when there are four sound sources, the space is divided into four zones in a similar manner as illustrated in FIG. 16 so that the four microphones may be used in a manner such that the microphone of each individual channel covers a single sound source. The determination of the status of the sound source in this instance takes place in a similar manner as illustrated by steps 201 to 208 in FIG. 15, thus determining if all of the four sound sources are silent or if one of them is uttering a voice. Otherwise, a processing operation takes place in a similar manner as illustrated by steps 209 to 214 shown in FIG. 15, determining if one of the four sound sources is silent, and in the absence of any silent sound source, a processing operation similar to that illustrated by the step 215 shown in FIG. 15 is employed, rendering a determination that all of the sound sources are uttering a voice.

Where three of the four sound sources are uttering a voice (or when one of the sound sources remains silent), no additional processing can be dispensed with, however, to discriminate one of the three sound sources which is more close to the silent condition, a fine control may take place as indicated below. Specifically, the reference value is changed from ThQ to ThS (ThP>ThS>ThQ) and each of the steps 210, 212, 214 shown in FIG. 15 may be followed by a processor as illustrated by steps 209 to 214 shown in FIG. 15, thus determining one of the three sound sources which is more close to the silent condition.

In this manner, as the number of sound sources increases, the processing operation illustrated by the steps 209 to 214 shown in FIG. 15 may be repeated to determine two or more sound sources which remain silent or which are close to a silent condition. However, as the number of repetitions increases, the reference value ThS used in the determination is made closer to ThP.

Figure 17:
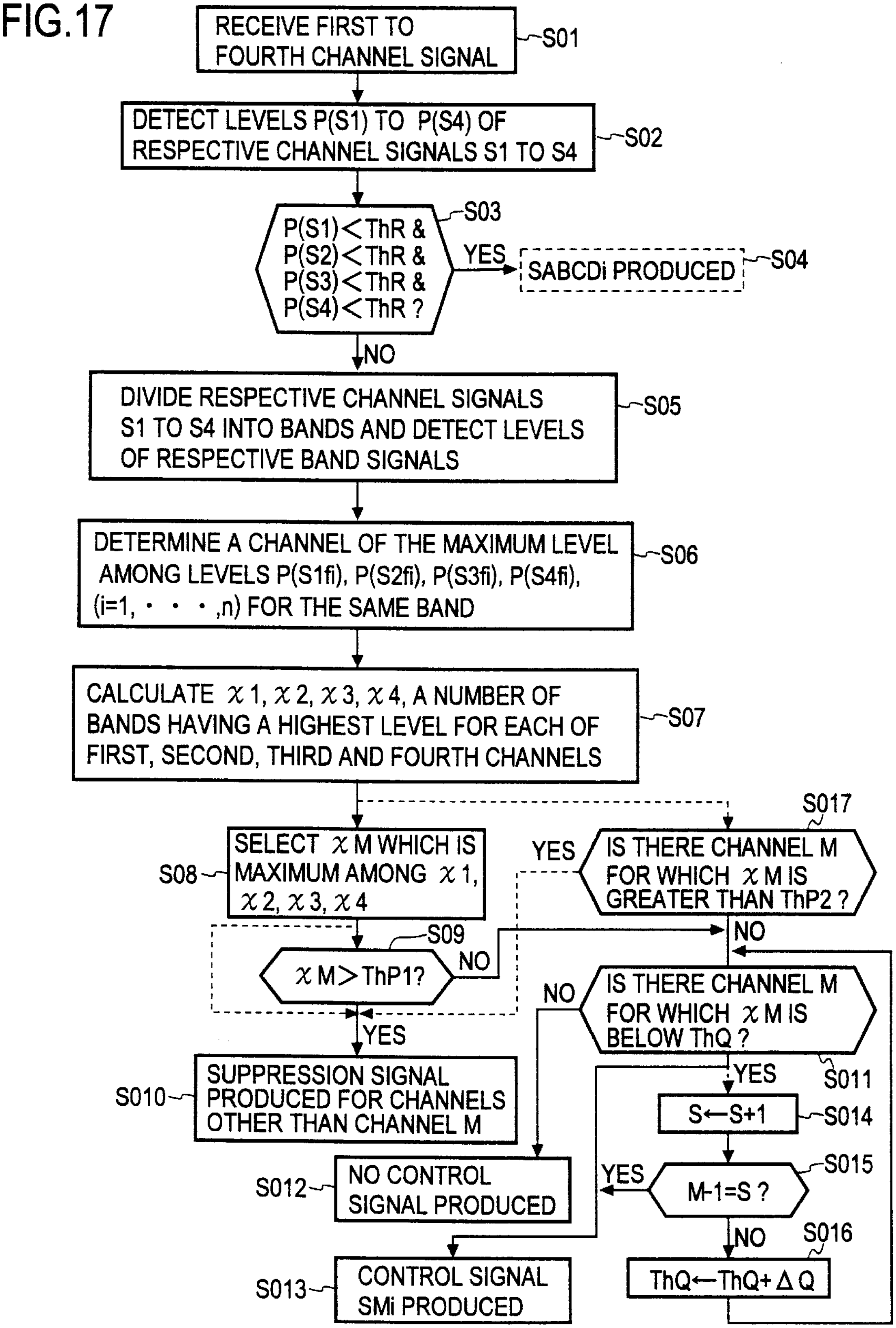
FIG. 17 is a flow diagram illustrating a processing procedure used in an apparatus for separating the sound source according to the invention for generating a control signal which is used to suppress a sound source signal for a sound source which is not uttering a voice.

The procedure of processing operation for the described arrangement will be as shown in FIG. 17 when there are four microphones and four sound sources. Initially, a first to a fourth channel signal S1–S4 are received by microphones M1–M4 (S01), the levels P(S1)–P(S4)of these channel signals S1–S4 are detected (S02), an examination is made to see if these levels P(S1)–P(S4) are equal to or less than the threshold value ThR (S03), and if they are equal to or less than the reference value, a control signal SABCDi is generated to suppress sound source signals SA, SB, SC (S1) from being delivered (S04). If it is found at step S03 that either one of the levels P(S1)–P(S4) is not less than the reference value ThR, the respective channel signals S1–S4 are divided into bands, and the levels P(S1fi), P(S2fi), P(S3fi), P(S4fi), where (i=1, . . . , n) of the respective bands are determined (S05). For each band fi, a channel fiM (where M is one of 1, 2, 3 or 4) which exhibits a maximum level is determined (S06), and the total number of bands for fi1, fi2, fi3, fi4, which are denoted as $\chi 1$, $\chi 2$, $\chi 3$, $\chi 4$, are determined among n bands (S07). A maximum one $\chi_M$ among $\chi 1$, $\chi 2$, $\chi 3$, and $\chi 4$ is determined (S08), an examination is made to see if $\chi_M$ is equal to or greater than the reference value ThP1 (which may be equal to n/3, for example) (S09), and if it is equal to or greater than ThP1, the sound source signal which is selected in correspondence to the channel M is delivered while generating a control signal SBCDi assuming that the sound source corresponding to channel M is sound source A which suppresses acoustic signals of separated channels other than channel M (S010). The operation may directly transfer from step S08 to step S010.

If it is found at step S09 that $\chi_M$ is not equal to or greater than the reference value, an examination is made to see if there is a channel M having $\chi_M$ which is equal to or less than the reference value ThQ (S011). If there is no such channel, all the sound sources are regarded as uttering a voice, and hence no control signal is generated (S012). If it is found at step S011 that there is a channel M having $\chi_M$ which is equal to or less than ThQ, a control signal SMi which suppresses the sound source which is separated as the corresponding channel M is generated (S013).

There may be the separated sound source signal or signals other than the one suppressed by the control signal SMi which remains silent or which remains close to a silent condition. In order to suppress such sound source signal or signals, S is incremented by 1 (S014) (it being understood that S is previously initialized to 0), an examination is made to see if S matches M minus 1 (where M represents the number of sound sources) (S015), and if it does not match, ThQ is increased by an increment +ΔQ and the operation returns to step S011 (S016). The step S011 is repeatedly executed while increasing ThQ by an increment of ΔQ within the constraint that it does not exceed ThP until S becomes equal to M minus 1. If it is found at step S015 that M minus 1 equals S, each control signal SMi which suppresses a separated sound source signal corresponding to each channel for which $\chi_M$ is equal to or less than ThQ is generated (S013). If necessary, the operation may transfer to step S013 before M−1=S is reached at step S015.

After calculating $\chi$1–$\chi$4 at step S07, an examination may alternatively be made at step S017 to see if there is any one which is above ThP2 (which may be equal to 2n/3, for example). If there is such a one, the operation transfers to step S010, and otherwise the operation may proceed to step S011.

In the foregoing description, a control signal or signals for the signal suppression unit 90 is generated utilizing the inter-band level differences of the channels S1–S3 corresponding to the microphones M1–M3 in order to enhance the accuracy of separating the sound source. However, it is also possible to generate a control signal by utilizing an inter-band time difference.

Figure 18:
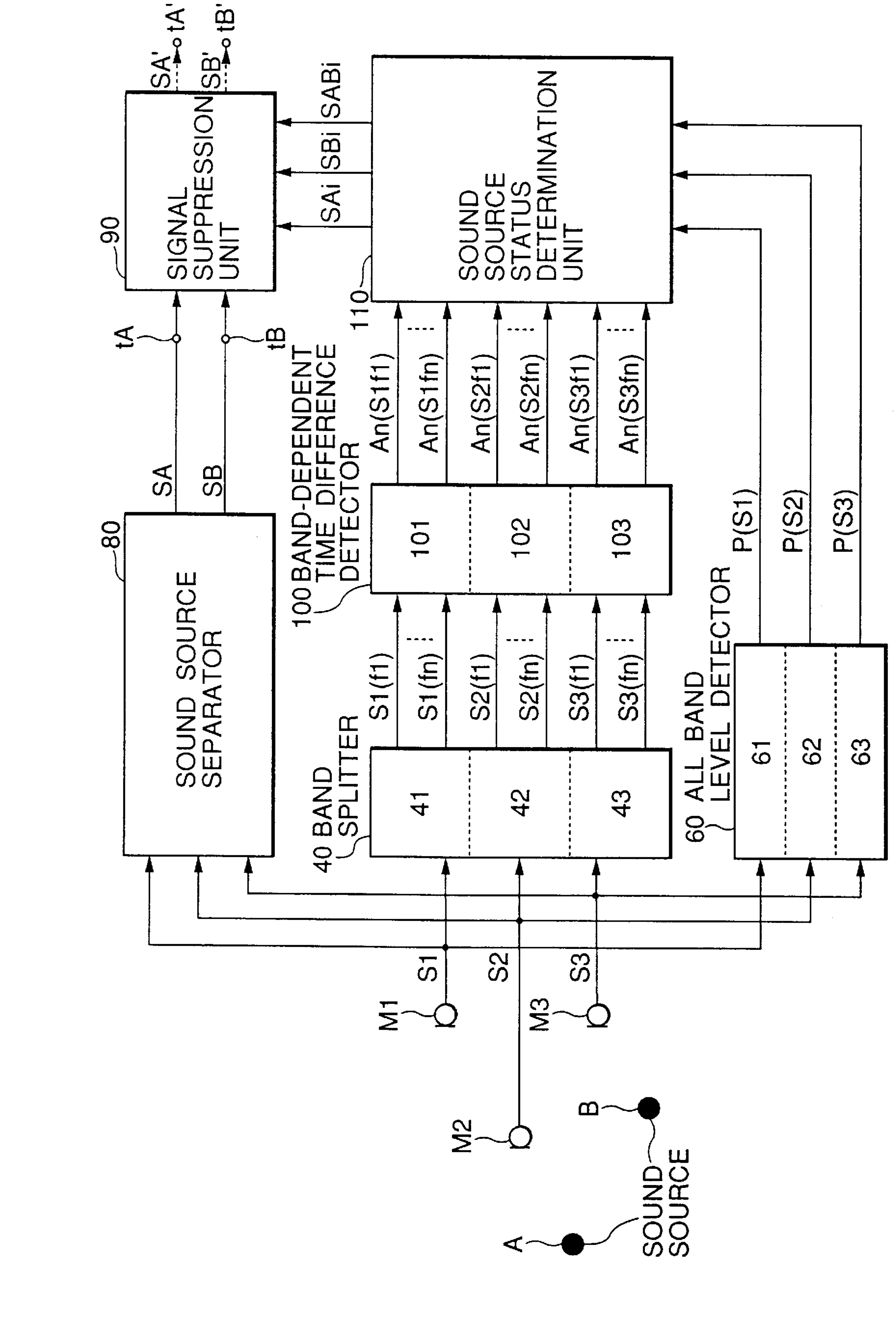
FIG. 18 is a functional block diagram of an apparatus for separating a sound source according to another embodiment of the invention in which an arrangement is added for suppressing an unnecessary sound source signal by utilizing a time-of-arrival difference.

Such an example is shown in FIG. 18 where corresponding parts to those shown in FIG. 11 are designated by like reference numerals and characters as used before. In this embodiment, a time-of-arrival difference signal An(S1f1)–An(S1fn) is detected by a band-dependent time difference detector 101 from signals S1(f1)–S1(fn) for the respective bands f1–fn which are obtained in the bandsplitter 41. Similarly, time-of-arrival difference signals An(S2f1)–An(S2fn), An(S3f1)–An(S3fn) are detected by the band-dependent time difference detectors 102, 103, respectively, from the signals S2(f1)–S2(fn), S3(f1)–S3(fn) for the respective bands which are obtained in the bandsplitters 42, 43, respectively.

The procedure for obtaining such a time-of-arrival difference signal may utilize the Fourier transform, for example, to calculate the phase (or group delay) of the signal of each band followed by a comparison of the phases of the signals S1(fi), S2(fi), S3(fi) (where i equals 1, 2, . . . , n) for the common band fi against each other to derive a signal which corresponds to a time-of-arrival difference for the same sound source signal. Here again, the bandsplitter 40 uses a subdivision which is small enough to assure that there is only one sound source signal component in one band.

To express such a time-of-arrival difference, one of the microphones M1–M3 may be chosen as a reference, for example, thus establishing a time-of-arrival difference of 0 for the reference microphone. A time-of-arrival difference for other microphones can then be expressed by a numerical value having either positive or negative polarity since such difference represents either an earlier or later arrival to the microphone in question relative to the reference microphone. If the microphone M1 is chosen as the reference microphone, it follows that time-of-arrival difference signals An(S1fi)–An(S1fn) are all equal to 0.

A sound source status determination unit 111 determines, by a computer operation, any sound source which is not uttering a voice. Initially the time-of-arrival difference signals An(S1F1)–An(S1fn), An(S2f1)–An(S2fn), An(S3f1)–An(S3fn) which are obtained by the band-dependent time difference detector 100 for the common band are compared against each other, thereby determining a channel in which the signal arrives earliest for each band f1–fn.

For each channel, the total number of bands in which the earliest arrival of the signal has been determined is calculated, and such total number is compared between the channels. As a consequence of this, it can be concluded that the microphone corresponding to the channel having a greater total number of bands is located close to the sound source. If the total number of bands which is calculated for a given channel exceeds a preset reference value ThP, a determination is rendered that there is a sound source in a zone covered by the microphone corresponding to this channel.

Levels P(S1)–P(S3) of the respective channels which are detected by the all band level detector 60 are also input to the sound source status determination unit 110. If the level of a particular channel is equal to or less than the preset reference value ThR, a determination is rendered that there is no sound source in a zone covered by the microphone corresponding to that channel.

Assume now that the microphones M1–M3 are disposed relative to sound sources A, B as illustrated in FIG. 12. It is also assumed that the total number of bands calculated for the channel corresponding to the microphone M1 is denoted by $\chi$1, and similarly the total numbers of bands calculated for channels corresponding to the microphones M2, M3 are denoted by $\chi$2, $\chi$3, respectively.

In this instance, the processing procedure illustrated in FIG. 13 may be used. Specifically, when all of the detection signals P(S1)–P(S3) obtained in the all band level detector 60 are less than the reference value ThR (101), the sound sources A, B are regarded as not uttering a voice, and hence, a control signal SABi is generated (102), thus suppressing both sound source signals SA, SB. At this time, the output signals SA-, SB-represent silent signals.

When only the sound source A is uttering a voice, its sound source signal reaches earliest at the microphone M2 for the frequency components of all the bands, and accordingly the total number of bands $\chi$2 calculated for the channel corresponding to the microphone M2 is at maximum. When only the sound source B is uttering a voice, its sound source signal reaches the microphone M3 earliest for the frequency components of all the bands, and accordingly, the total number of bands $\chi$3 calculated for the channel corresponding to the microphone M3 is at maximum.

When the sound sources A, B are both uttering a voice, the total number of bands in which the sound signal reaches earliest will be comparable between the microphones M2 and M3.

Accordingly, when the total number of bands in which the sound source signal reaches a given microphone earliest exceeds the reference ThP, a determination is rendered that there exists a sound source in a zone which is covered by the microphone, and that that sound source is uttering a voice.

In the above example, when only the sound source A is uttering a voice, only $\chi$2 exceeds the reference value ThP (see 103 in FIG. 3), providing a detection that the uttering sound source exists in the zone Z3 which is covered by the microphone M2, and accordingly, a control signal SBi is generated (104) to suppress the acoustic signal SB while allowing only the signal SA to be delivered.

When only the sound source B is uttering a voice, only $\chi 3$ exceeds the reference value ThP (105), providing a detection that the uttering sound source exists in the zone Z4 which is covered by the microphone M3, and accordingly, a control signal SAi is generated (106), suppressing the signal SA while allowing only the signal SB to be delivered.

In the present example, ThP is established on the order of n/3, for example, and if the sound sources A, B are both uttering a voice, both $\chi 2$ and $\chi 3$ may exceed the reference value ThP. In such instance, one of the sound sources, which may be the sound source A in the present example, may be given a preference to allow the separated signal corresponding to the sound source A to be delivered, as illustrated by the processing procedure shown in FIG. 13. If both $\chi 2$ and $\chi 3$ are below the reference value ThP, a determination is rendered that both sound sources A, B are uttering a voice as long as the levels P(S1)–P(S3) exceed the reference value ThR, and hence control signals SAi, SBi, SABi are not generated (107 in FIG. 3), thus preventing the suppression of the voice signals SA, SB in the signal suppression unit 90.

When the sound source C is added to the zone Z6 in the arrangement of FIG. 12 as indicated in FIG. 14, the sound source separator 80 delivers a signal SC corresponding to the sound source C, in addition to the signal SA corresponding to the sound source A and the signal SB corresponding to the sound source B, even though this is not illustrated in the drawings. In a corresponding manner, the sound source status determination unit 110 delivers a control signal SCi which suppresses the signal SC in addition to the signal SAi which suppresses the signal SA and a control signal SBi which suppresses the signal SB, and also delivers a control signal SBCi which suppresses the signals SB and SC, a control signal SCAi which suppresses the signal SC and SA, and a control signal SABCi which suppresses all of the signals SA, SB and SC in addition to a control signal SABi which suppresses the signals SA and SB. The operation of the sound source status determination unit 110 remains the same as mentioned previously in connection with FIG. 15.

When all of the levels P(S1)–P(S3) fail to exceed the reference value ThR, a determination is rendered that no sound source A–C is uttering a voice, and the sound source status determination unit 110 delivers a control signal SABCi, thus suppressing all of the signals SA, SB and SC.

When the sound source A, B or C is uttering a voice alone, the time-of-arrival for the channel corresponding to the microphone which is located closest to that sound source will be earliest, in a similar manner as occurs for the two sound sources mentioned above, and accordingly, either one of the total number of bands for the respective channel $\chi 1$, $\chi 2$, $\chi 3$ will exceed the reference value ThP. When only the sound source C is uttering a voice, the control signal SABi is delivered to suppress the signals SA, SB. When only the sound source A is uttering a voice, the control signal SBCi is delivered to suppress the signals SB, SC. Finally, when only the sound source B is uttering a voice, the control signal SACi is delivered to suppress the signals SA, SC (203–208 in FIG. 15).

When two of the three sound sources A–C are uttering a voice, the total number of bands which achieved the earliest time-of-arrival for the channel corresponding to the microphone located in a zone in which the non-uttering sound source is disposed will be reduced as compared with the corresponding total numbers for the other microphones. For example, when the sound source C alone is not uttering, the number of bands $\chi 1$ which achieved the earliest time-of-arrival to the microphone M1 will be reduced as compared with the corresponding total numbers of bands $\chi 2$, $\chi 3$ for the remaining two microphones M2, M3.

Accordingly, a preset reference value ThQ (<ThP) is established, and if $\chi 1$ is equal to or less than the reference value ThQ, a determination is rendered with respect to the zones Z5, Z6 divided from the space shared by the microphones M1 and M3 that the sound source located in the zone Z6 which is located close to the microphone M1 is not uttering a voice, and also a determination is rendered with respect to the zones Z1, Z2 divided from the space shared by the microphones M1 and M2 that the sound source in the zone Z1 which is located close to the microphone M1 is not uttering a voice.

In this manner, a determination is rendered that sound sources located within the zones Z1, Z6 are not uttering a voice. Since the sound sources located within these zones represent the sound source C, it follows from these determinations that the sound source C is not uttering a voice. As a consequence, it is determined that only the sound sources A, B are uttering a voice, thus generating the control signal SCi to suppress the signal SC (209–210 in FIG. 15). A similar determination is rendered for zones in which either sound source A alone or sound source B alone does not utter a signal (211–214 in FIG. 15).

If it is determined that all of $\chi 1$, $\chi 2$, $\chi 3$ are not less than the reference value ThQ, a determination is rendered that all of the sound sources A, B, C are uttering a voice (215 in FIG. 15).

In the above example, the space is divided into six zones Z1–Z6, but the space can be divided into three zones as illustrated in FIG. 16 where the status of sound sources can also be determined in a similar manner. In this instance, if only the sound source A is uttering a voice, for example, the total number of bands $\chi 2$ for the channel corresponding to the microphone M2 will be at maximum, and accordingly, a determination is rendered that there is a sound source in the zone Z2 covered by the microphone M2. Alternatively, when only the sound source B is uttering a voice, $\chi 3$ will be at maximum, and accordingly, a determination is rendered similarly that there is a sound source in the zone Z3. If $\chi 1$ is equal to or less than the preset value ThQ, a determination is rendered with respect to the zones divided from the space shared by the microphones M1 and M3 that the sound source located within the zone Z1 is not uttering a voice, and similarly a determination is rendered with respect to the zones divided from the space shared by the microphones M1 and M2 that a sound source located within the zone Z1 is not uttering a voice. In this manner, the status of sound sources can be determined when the space is divided into three zones in the same manner as when the space is divided into six zones.

The reference values ThP, ThQ may be established in the same way as when utilizing the band-dependent levels as mentioned above.

While the same reference values ThR, ThP, ThQ are used for all of the microphones M1–M3, these reference values may be suitably changed for each microphone. While the foregoing description has dealt with the provision of three microphones for three sound sources, the detection of a sound source zone is similarly possible provided the number of microphones is equal to or greater than the number of sound sources. A processing procedure used at this end is similar as when utilizing the band-dependent levels mentioned above. Accordingly, when there are four sound sources, for example, three of which are uttering a voice (or one is silent), the processing may end at this point, but in order to select one of the remaining three sound sources which is close to a silent condition, the reference value may be changed from ThQ to ThS (ThP>ThS>ThQ), and each of the steps 210, 212, 214 shown in FIG. 15 may be followed by a processor section which is constructed in the similar manner as constructed by the steps 209–214 shown in FIG. 15, thus determining one of the three sound sources which remains silent.

In the procedure shown in FIG. 17, the time difference may be utilized in place of the level, and in such instance, the processing procedure shown in FIG. 17 is applicable to the suppression of unnecessary signals utilizing the time-of-arrival differences shown in FIG. 18.

Figure 19:
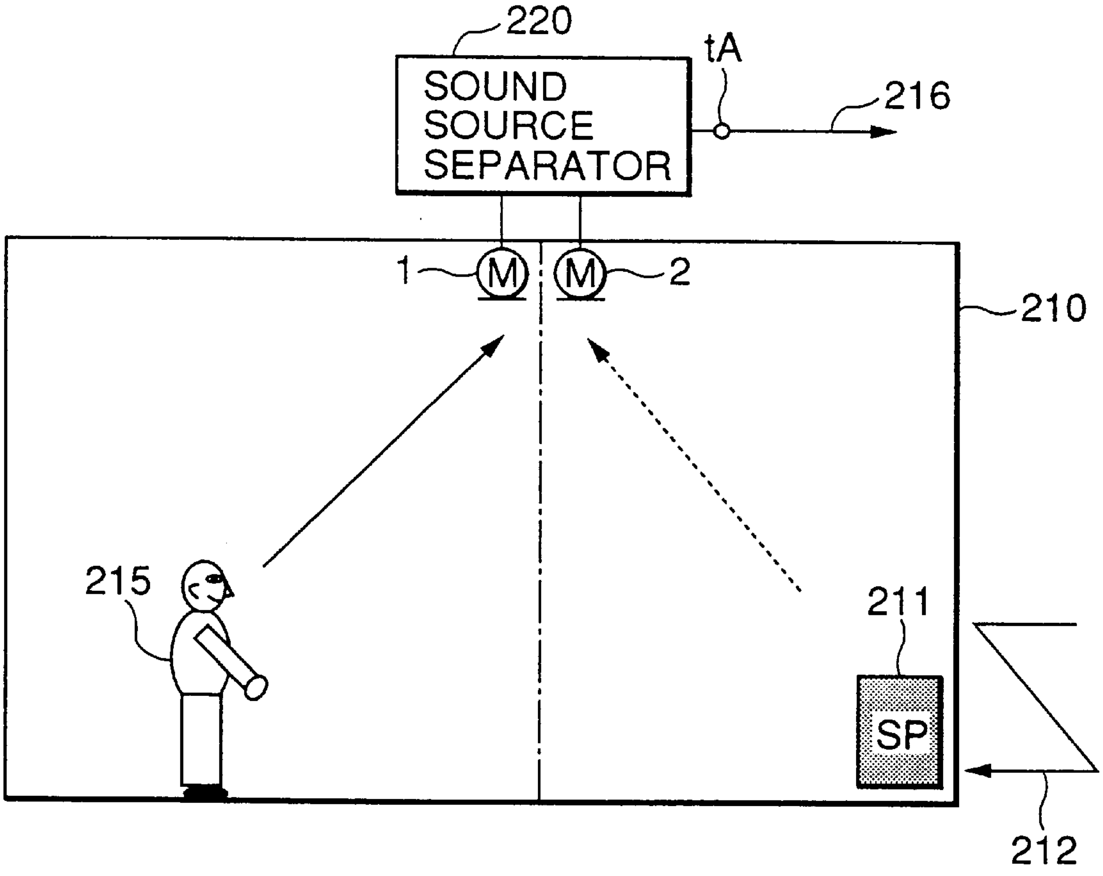
FIG. 19 is a schematic illustration of an exemplary relationship between a speaker, a loudspeaker and a microphone in an apparatus for separating a sound source according to the invention which is applied to the suppression of runaround sound.

The method of separating a sound source according to the invention as applied to a sound collector which is designed to suppress runaround sound will be described. Referring to FIG. 19, disposed within a room 210 is a loudspeaker 211 which reproduces a voice signal from a mate speaker which is conveyed through a transmission line 212, thus radiating it as an acoustic signal into the room 210. On the other hand, a speaker 215 standing within the room 210 utters a voice, the signal from which is received by a microphone 1 and is then transmitted as an electrical signal to the mate speaker through a transmission line 216. In this instance, the voice signal which is radiated from the loudspeaker 211 is captured by the microphone 1 and is then transmitted to the mate speaker, causing a howling.

To accommodate for this, in the present embodiment, another microphone 2 is juxtaposed with the microphone 1 substantially in a parallel relationship with the direction of array of the loudspeaker 211 and the speaker 215, and the microphone 2 is disposed on the side nearer the loudspeaker 211. These microphones 1, 2 are connected to a sound source separator 220. The combination of the microphones 1, 2 and the sound source separator 220 constitutes a sound source separation apparatus as shown in FIG. 1. Specifically, the arrangement shown in FIG. 1 except for the microphones 1, 2 represent a sound separator 220, which is defined more precisely as the arrangement shown in FIG. 1 from which the dotted line frame 9 is eliminated, with the remaining output terminal tA being connected to the transmission line 216. An overall arrangement is shown in FIG. 20, to which reference is made, it being understood that FIG. 20 includes certain improvements.

In the resulting arrangement, the speaker 215 functions as the sound source A shown in FIG. 1 while the loudspeaker 211 serves as the sound source B shown in FIG. 1. As mentioned previously in connection with FIG. 1, the voice signal from the loudspeaker 211 which corresponds to the sound source B is cut off from the output terminal tA while the voice signal from the speaker 215 which corresponds to the sound source A is delivered alone thereto. In this manner, the likelihood that the voice signal from the loudspeaker 211 is transmitted to the mate speaker is eliminated, thus eliminating the likelihood of a howling occurring.

Figure 20:
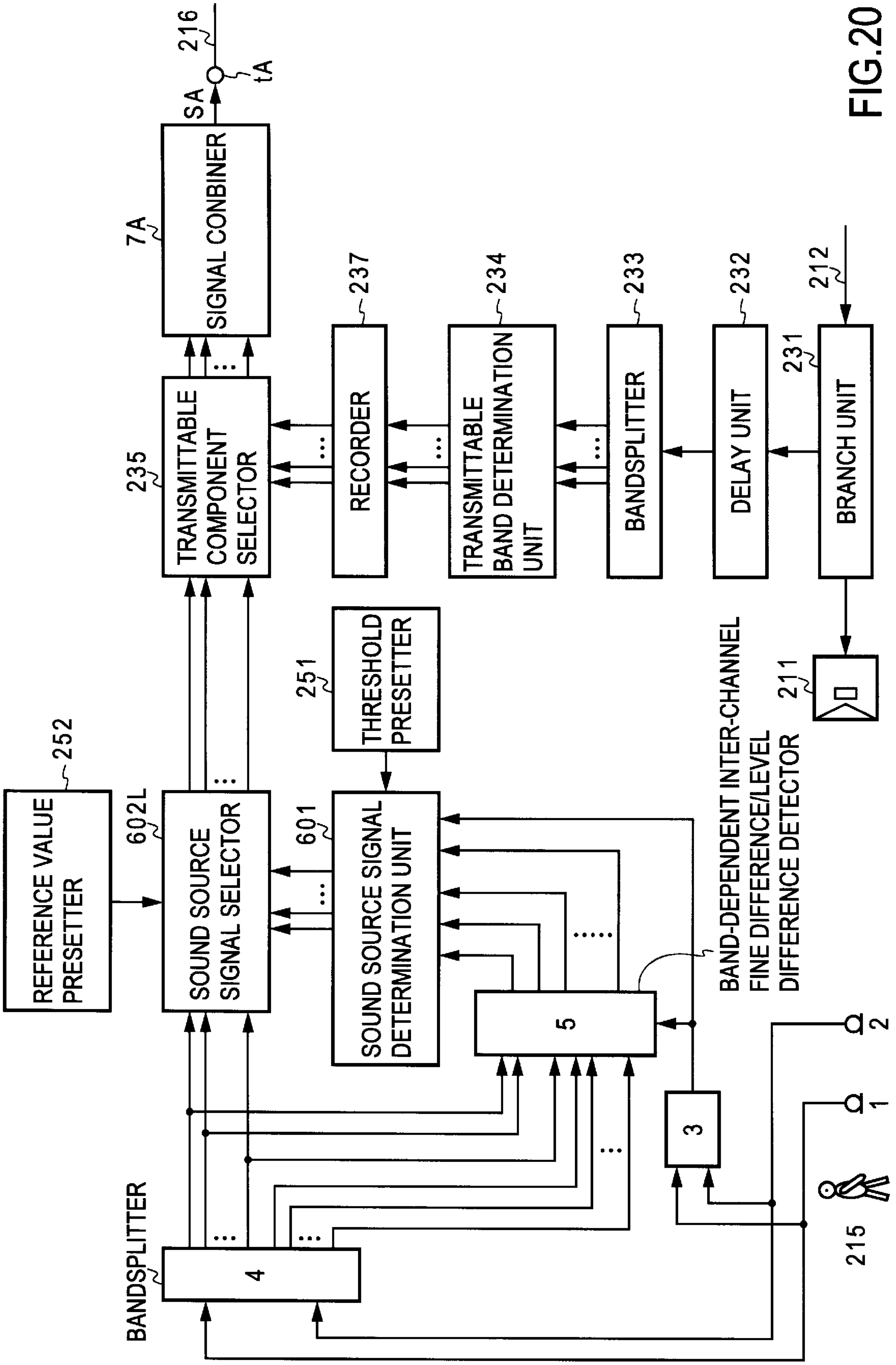
FIG. 20 is a functional block diagram of an apparatus for separating a sound source according to a further embodiment of the invention which is applied to the suppression of runaround sound.

FIG. 20 shows an improvement of this howling suppression technique. Specifically, a branch unit 231 is connected to the transmission line 212 extending from the mate speaker and connected to the loudspeaker 211, and the branched voice signal from the mate speaker is divided into a plurality of frequency bands in a bandsplitter 233 after it is passed through a delay unit 232 as required. This division may take place into the same number of bands as occurring in the bandsplitter 4 by utilizing a similar technique. Components in the respective bands or band signals from the mate speaker which are divided in this manner are analyzed in transmittable band determination unit 234, which determines whether or not a frequency band for these components lies in a transmittable frequency band. Thus, a band which is free from frequency components of a voice signal from the mate speaker or in which such frequency components are at a sufficiently low level is determined to be a transmittable band.

A transmittable component selector 235 is inserted between the sound source signal selector 602L and the combiner 7A. The sound source signal selector 602L determines and selects a voice signal from the speaker 215 from the output signal S1 from the microphone 1, which voice signal is fed to the transmittable component selector 235 where only a component which is determined by the transmittable band determination unit 234 as lying in a transmittable band is selected to the signal combiner 7A. Accordingly, frequency components which are radiated from the loudspeaker 211 and which may cause a howling cannot be delivered to the transmission line 216, thus more reliably suppressing the occurrence of the howling.

The delay unit 232 determines an amount of delay in consideration of the propagation time of the acoustic signal between the loudspeaker 211 and the microphones 1, 2. The delay action achieved by the delay unit 232 may be inserted anywhere between the branch unit 231 and the transmittable component selector 235. If it is inserted after the transmittable band determination unit 234, as indicated by a frame 237, a recorder capable of reading and storing data may be employed to read data at a time interval which corresponds to the required amount of delay to feed it to the transmittable component selector 235. The provision of such delay means may be omitted under certain circumstances.

Figure 21:
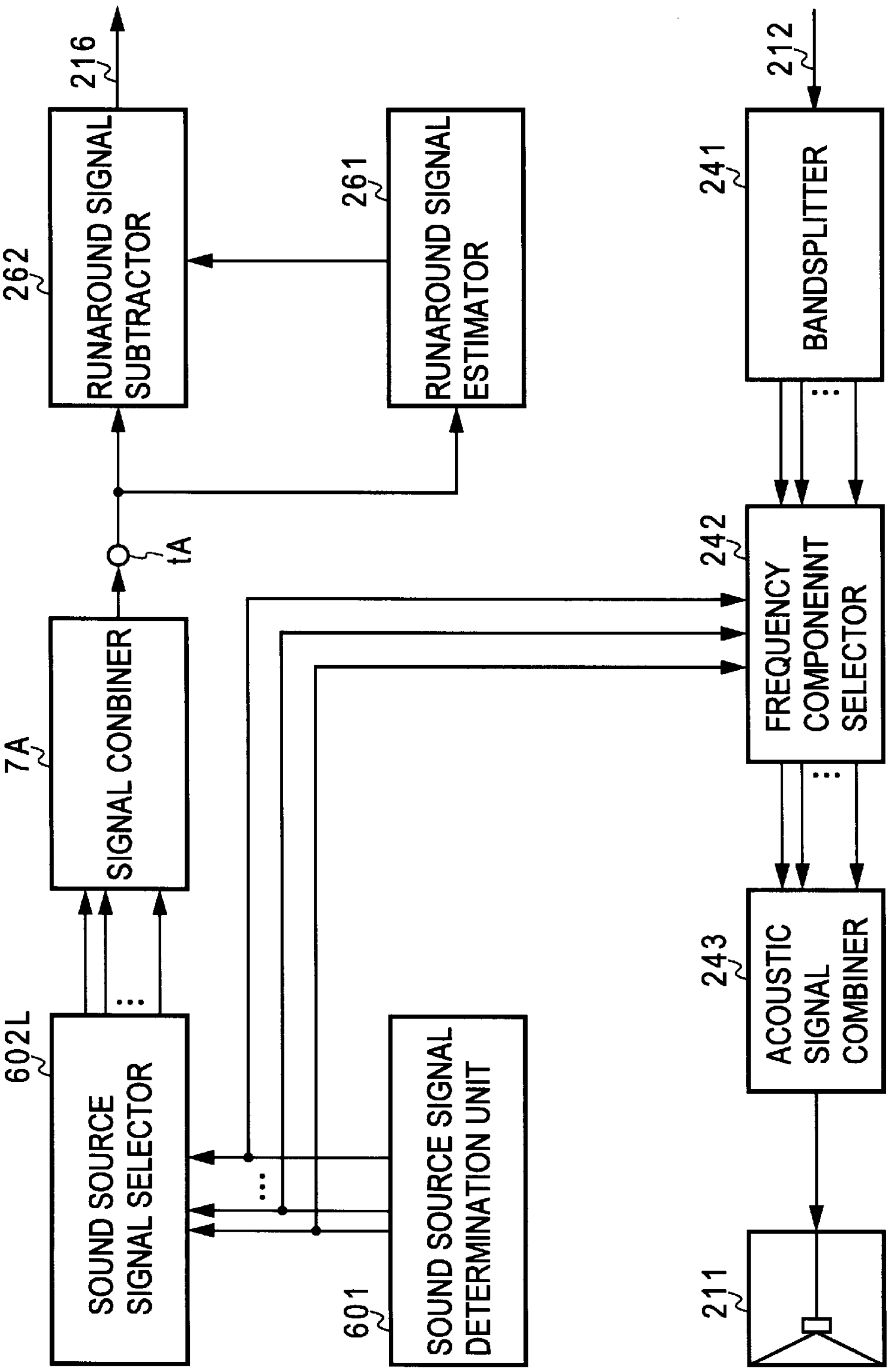
FIG. 21 is a functional block diagram of part of an apparatus for separating a sound source according to still another embodiment of the invention which is applied to the suppression of runaround sound.

In the embodiment shown in FIG. 20, components which may cause a howling are interrupted on the transmitting side (output side), but may be interrupted at the receiving side (input side). Part of such embodiment is illustrated in FIG. 21. Specifically, a received signal from the transmission line 212 is divided into a plurality of frequency bands in a bandsplitter 241 which performs a division into the same number of bands as occurring in the bandsplitter 4 (FIG. 1) by using a similar technique. The band splitted received signal is input to a frequency component selector 242, which also receives control signals from the sound source signal determination unit 601 which are used in the sound source signal selector 602L in selecting voice components from the speaker 215 as obtained from the microphone 1. Band components which are not selected by the sound source signal selector 602L, and hence which are not delivered to the transmission line 216, are selected from the band splitted received signal in the frequency component selector 242 to be fed to an acoustic signal combiner 243, which combines them into an acoustic signal to feed the loudspeaker 211. The acoustic signal combiner 243 functions in the same manner as the signal combiner 7A. With this arrangement, frequency components which are delivered to the transmission line 216 are excluded from the acoustic signal which is radiated from the loudspeaker 211, thus suppressing the occurrence of howling.

As mentioned previously in connection with the embodiment shown in FIG. 1, the threshold values $\Delta Lth$, $\Delta\tau th$ which are used in determining to which sound source signal the band components belong in accordance with a band-dependent inter-channel time difference or band-dependent inter-channel level difference have preferred values which depend on the relative positions of the sound source and the microphones. Accordingly, it is preferred that a threshold presetter 251 be provided as shown in FIG. 20 so that the thresholds $\Delta Lth$, $\Delta\tau th$ or the criterion used in the sound source signal determination unit 601 can be changed depending on the situation.

To enhance the noise resistance, a reference value presetter 252 is provided in which a muting standard is established for muting frequency components of levels below a given value. The reference value presetter 252 is connected to the sound source signal selector 602L, which therefore regards the frequency components in the signal collected by the microphone 1 which is selected in accordance with the level difference threshold and the phase difference (time difference) threshold and having levels below a given value as noise components such as a dark noise, a noise caused by an air conditioner or the like, and eliminates these noise components, thus improving the noise resistance.

To prevent the howling from occurring, a howling preventive standard is added to the reference value presetter 252 for suppressing frequency components of levels exceeding a given value below the given value, and this standard is also fed to the sound source signal selector 602L. As a consequence, in the sound source signal selector 602L, those of the frequency components in the signal collected by the microphone 1 which is selected in accordance with the level difference threshold and the phase difference threshold, and additionally in accordance with the muting standard, which have levels exceeding a given value are corrected to stay below a level which is defined by the given value. This correction takes place by clipping the frequency components at the given level when the frequency components momentarily and sporadically exceed the given level, and by a compression of the dynamic range where the given level is relatively frequently exceeded. In this manner, an increase in the acoustic coupling which causes the occurrence of the howling can be suppressed, thus effectively preventing the howling.

An arrangement for suppressing reverberant sound can be added as shown in FIG. 21. Specifically, a runaround signal estimator 261 which estimates a delayed runaround signal and an estimated runaround signal subtractor 262 which is used to subtract the estimated, delayed runaround signal are connected to the output terminal tA. By utilizing the transfer responses of the direct sound and the reverberant sound, the runaround signal estimator 261 estimates and extracts a delayed runaround signal. This estimation may employ a complex cepstrum process which takes into consideration the minimum phase characteristic of the transfer response, for example. If required, the transfer responses of the direct sound and the runaround sound may be determined by the impulse response technique. The delayed runaround signal which is estimated by the estimator 261 is subtracted in the runaround signal subtractor 262 from the separated sound source signal from the output terminal tA (voice signal from the speaker 215) before it is delivered to the transmission line 216. For a detail of the suppression of the runaround signal by means of the runaround signal estimator 261 and the runaround signal subtractor 262, refer to "A.V. Oppenhein and R. W. Schafer 'DIGITAL SIGNAL PROCESSING'PRENTICE-HALL, INC. Press".

Where the speaker 215 moves around only within a given range, a level difference/or a time-of-arrival difference between frequency components in the voice collected by the microphone 1 which is disposed alongside the speaker 215 and frequency components of the voice collected by the microphone 2 which is disposed alongside the loudspeaker 211 are limited in a given range. Accordingly, a criterion range may be defined in the threshold presetter 251 so that signals which lie in the given range of level differences or in a given range of phase difference are processed while leaving the signals lying outside these ranges unprocessed. In this manner, the voice uttered by the speaker 215 can be selected from the signal collected by the microphone 1 with a higher accuracy.

When considered from a different point of view, since the loudspeaker 211 is stationary, a definite level difference and/or phase difference between frequency components of the voice from the loudspeaker 211 which is collected by the microphone 1 disposed alongside the speaker 215 and frequency components for the voice from the loudspeaker 211 which is collected by the microphone 2 disposed alongside it are also limited in a given range. It will be appreciated that such ranges of level difference and phase difference are used as the standard for exclusion in the sound source signal selector 602L. Accordingly, the criterion for the selection to be made in the sound source signal selector 602L may be established in the threshold presetter 251.

When three or more microphones are used in the suppression of the howling, the function of selecting required frequency components can be defined to a higher accuracy. In addition, while the invention has been described as applied to runaround sound suppressing sound collector of a loudspeaker acoustic system, it should be understood that the invention is also applicable to a telephone transmitter/receiver system as well.

In addition, frequency components which are to be selected in the sound source signal selector 602L are not limited to specific frequency components (voice from the speaker 215) contained in the frequency components of the voice signal which is collected by the microphone 1. Depending on the situation, where an outlet port of an air conditioner system is located toward the speaker 215, for example, it is possible to select those of the frequency components collected by the microphone 2 which are determined as representing the voice of the speaker 215. Alternatively, in an environment having a high noise level, those of the frequency components collected by the microphone 1, 2 which are determined as representing the voice of the speaker 215 may be selected.

The identification of a zone covered by a particular microphone to determine if a sound source located therein is uttering a voice has been described previously with reference to FIG. 12. Thus, it has been described above that it is possible to detect in which one of the zones covered by the microphones M1–M3 a sound source is located. Thus, when the sound source A is uttering a voice, the total number of bands $\chi 2$ in which the channel corresponding to the microphone M2 exhibits a maximum level is greater than $\chi 1$, $\chi 3$, thus detecting that the sound source A is located within zones Z2, Z3. However, when $\chi 1$ and $\chi 3$ are compared to each other in the arrangement of FIG. 12, it follows that $\chi 1$ is less than $\chi 3$, thus determining that the sound source A is located in the zone Z3. In this manner, the zone of the uttering sound source can be determined to a higher accuracy by utilizing the comparison among $\chi 1$, $\chi 2$, $\chi 3$. Such a comparative detection is applicable to either the use of the band-dependent inter-channel level difference or the band-dependent inter-channel time-of-arrival difference.

Figure 22:
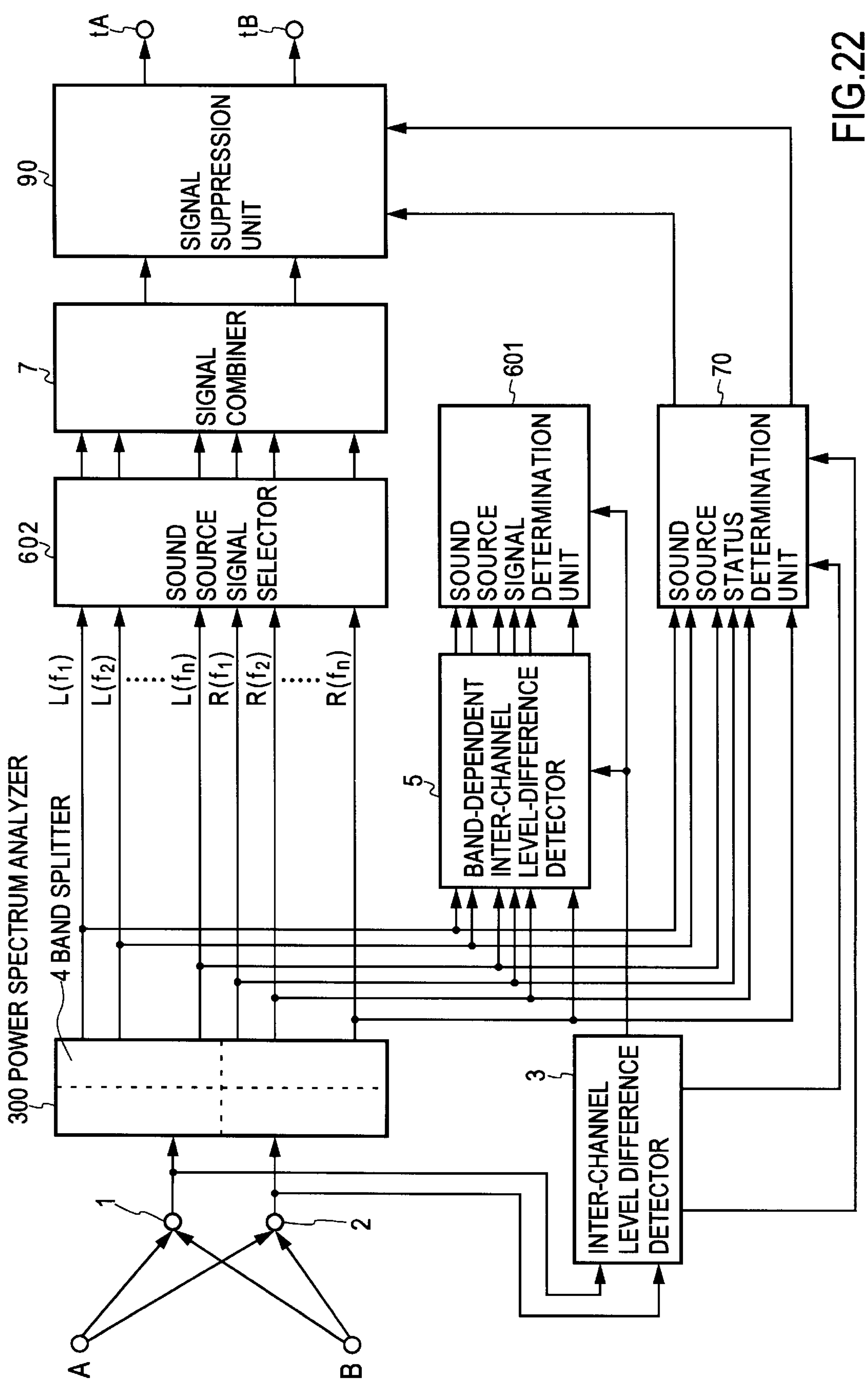
FIG. 22 is a functional block diagram of an apparatus for separating a sound source according to an embodiment of the invention in which a division into bands takes place after a power spectrum is determined.

In the foregoing description, output channel signals from the microphones are initially subjected to a bandsplitting, but where the band-dependent levels are used, the bandsplitting may take place after obtaining power spectrums of the respective channels. Such an example is shown in FIG. 22 where corresponding parts appearing in FIGS. 1 and 11 are designated by like reference numerals and characters as before, and only the different portion will be described. In this example, channel signals from the microphones 1, 2 are converted into power spectrums in a power spectrum analyzer 300 by means of the rapid Fourier transform, for example, and are then divided into bands in the bandsplitter 4 in a manner such that essentially and principally a single sound source signal resides in each band, thus obtaining band-dependent levels. In this instance, the band-dependent levels are supplied to the sound source signal selector 602 together with the phase components of the original spectrums so that the signal combiner 7 is capable of reproducing the sound source signal.

The band-dependent levels are also fed to the band-dependent inter-channel level difference detector 5 and the sound source status determination unit 70 where they are subject to a processing operation as mentioned above in connection with FIGS. 1 and 11. In other respects, the operation remains the same as shown in FIGS. 1 and 11.

Figure 30:
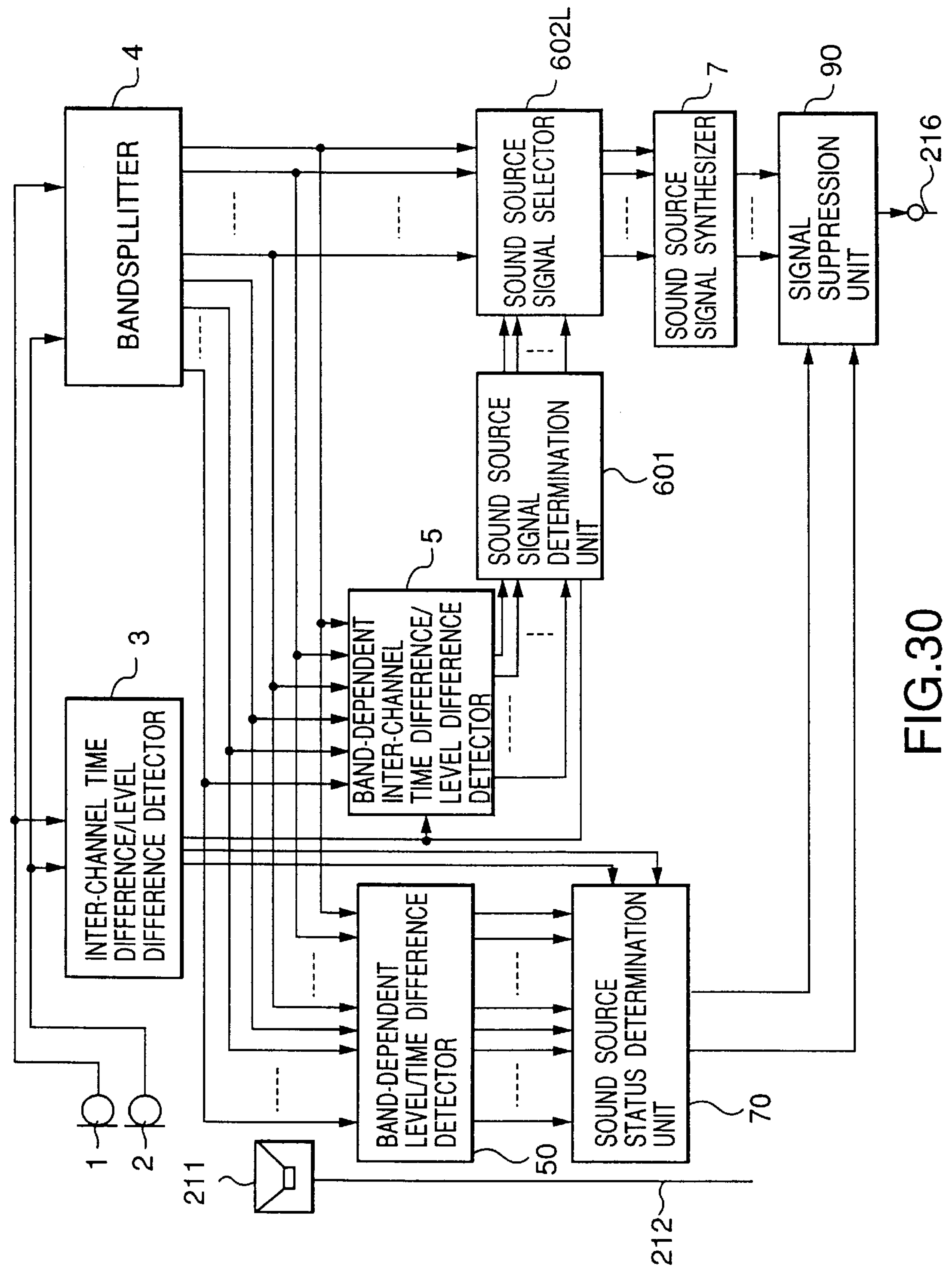
FIG. 30 is a functional block diagram of another embodiment of the invention which is applied to the suppression of runaround sound.

The method of separating a sound source according to the invention as applied to the suppression of runaround sound or howling has been described above with reference to FIGS. 19 to 21. In this howling prevention method/apparatus, the technique of suppressing or muting a sound source sound from a sound source that is not uttering a voice can also be utilized to achieve a sound source signal of better quality. A functional block diagram of such an embodiment is shown in FIG. 30 where corresponding parts to those shown in FIGS. 1, 11 and FIG. 20 are designated by like reference numerals and characters as used before. Specifically, respective channel signals from microphones 1, 2 are divided each into a plurality of bands in a bandsplitter 4 to feed a sound source signal selector 602L, a band-dependent inter-channel time difference/level difference detector 5 and a band-dependent level/time difference detector 50. Outputs from the microphones 1, 2 are also fed to an inter-channel time difference/level difference detector 3, an inter-channel time difference or level difference from which is fed to the band-dependent inter-channel time difference/level difference detector 5 and to a sound source signal determination unit 601. Output levels from the microphones 1, 2 are fed to a sound source status determination unit 70.

Outputs from the band-dependent inter-channel time difference/level difference detector 5 are fed to the sound source signal determination unit 601 where a determination is rendered as to from which sound source each band component accrues. On the basis of such a determination, a sound source signal selector 602L selects an acoustic signal component from a specific sound source, which is only the voice component from a single speaker in the present example, to feed a signal combiner 7. On the other hand, the band-dependent level/time difference detector 50 detects a level or time-of-arrival difference for each band, and such detection outputs are used in the sound source status determination unit 70 in detecting a sound source which is uttering or not uttering a voice. A sound source signal for a sound source which is not uttering a voice is suppressed in a signal suppression unit 90.

The apparatus operates most effectively when employed to deliver the voice signal from one of a plurality of speakers in a common room who are simultaneously speaking. The technique of suppressing a sound source signal for a non-uttering sound source can also be applied to the runaround sound suppression apparatus described above in connection with FIGS. 20 and 21. The arrangement shown in FIG. 22 is also applicable to the runaround sound suppression apparatus described above in connection with FIGS. 19 to 21.

In the embodiment described previously with reference to FIG. 2, for each band split signal, it may be determined from which sound source it is oncoming by utilizing only the corresponding band-dependent inter-channel time difference without using the inter-channel time difference. Also in the embodiment described previously with reference to FIG. 5, each band split signal may be determined from which sound source it is oncoming by utilizing the band-dependent inter-channel level difference without using the inter-channel level difference. The detection of the inter-channel level difference in the embodiment described above with reference to FIG. 5 may utilize the levels which prevail before conversion into the logarithmic levels.

It is to be understood that the manner of division into frequency bands need not be uniform among the bandsplitter 4 in FIG. 1, the bandsplitters 40 in FIGS. 11 and 18, the bandsplitter 233 in FIG. 20 and the bandsplitter 241 in FIG. 21. The number of frequency bands into which each signal is divided may vary among these bandsplitters, depending on the required accuracy. For the sake of subsequent processing, the bandsplitter 233 in FIG. 20 may divide an input signal into a plurality of frequency bands after the power spectrum of the input signal is initially obtained.

It has been described above in connection with the generation of a silent signal suppression control signal with reference to FIGS. 11 and 18 that the zone of an uttering sound source can be detected, and that such a detection may be utilized to generate a suppression control signal.

Figure 23:
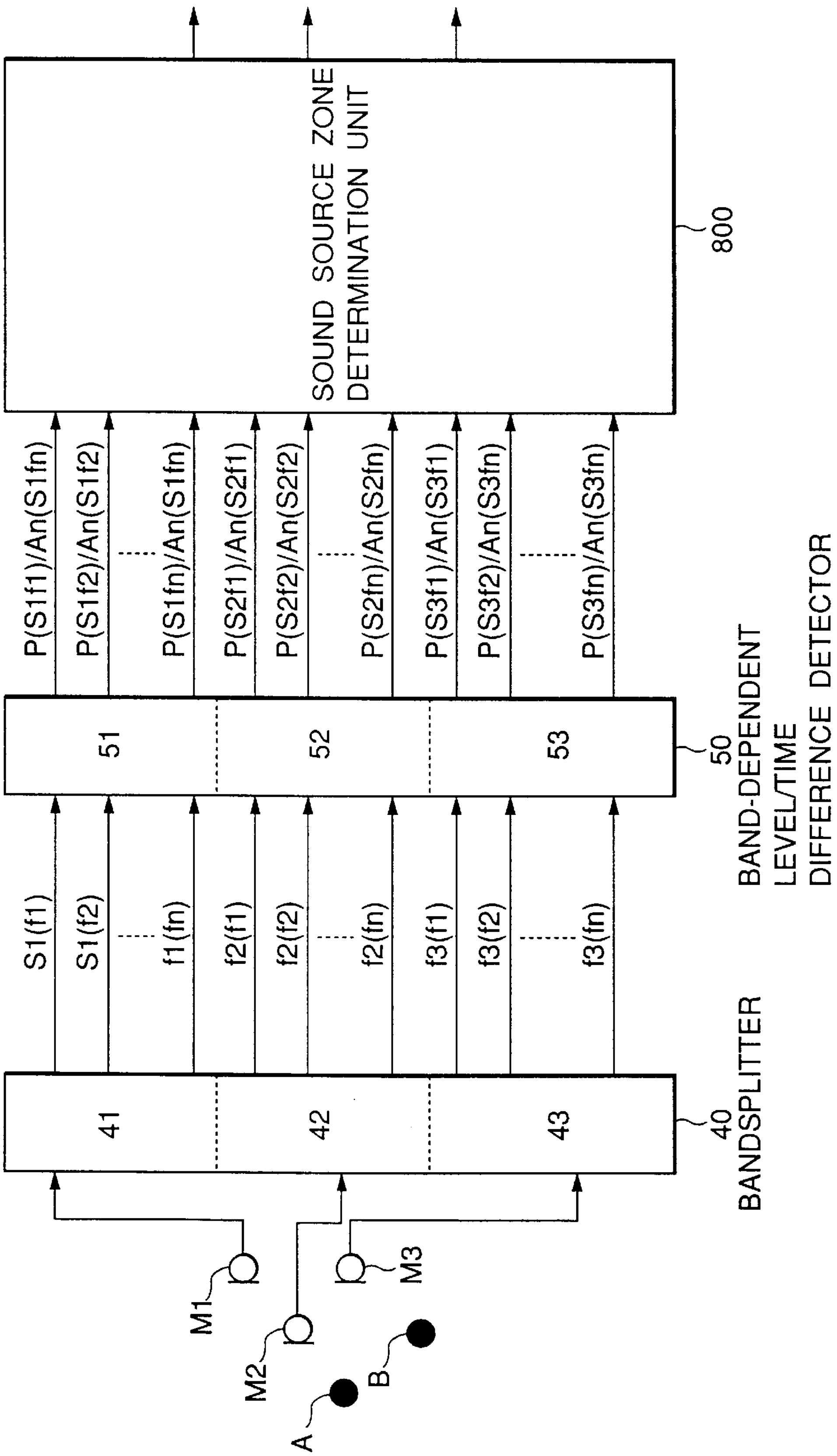
FIG. 23 is a functional block diagram of an apparatus for zone detection according to an embodiment of the invention.

A functional block diagram of an apparatus for detecting a sound source zone according to the invention is shown in FIG. 23 where numerals 40, 50 represent corresponding ones shown by the same numerals in FIGS. 11 and 18. Channel signals from the microphones M1–M3 are each divided into a plurality of bands in bandsplitters 41, 42, 43, and band-dependent level/time difference detectors 51, 52, 53 detect the time-dependent level or time-of-arrival difference for each channel from the band signals in a manner mentioned above in connection with FIGS. 11 and 18. These band-dependent level or band-dependent time-of-arrival differences are fed to a sound source zone determination unit 800 which determines in which one of the zones covered by the respective microphones a sound source is located, delivering a result of such a determination.

Figure 24:
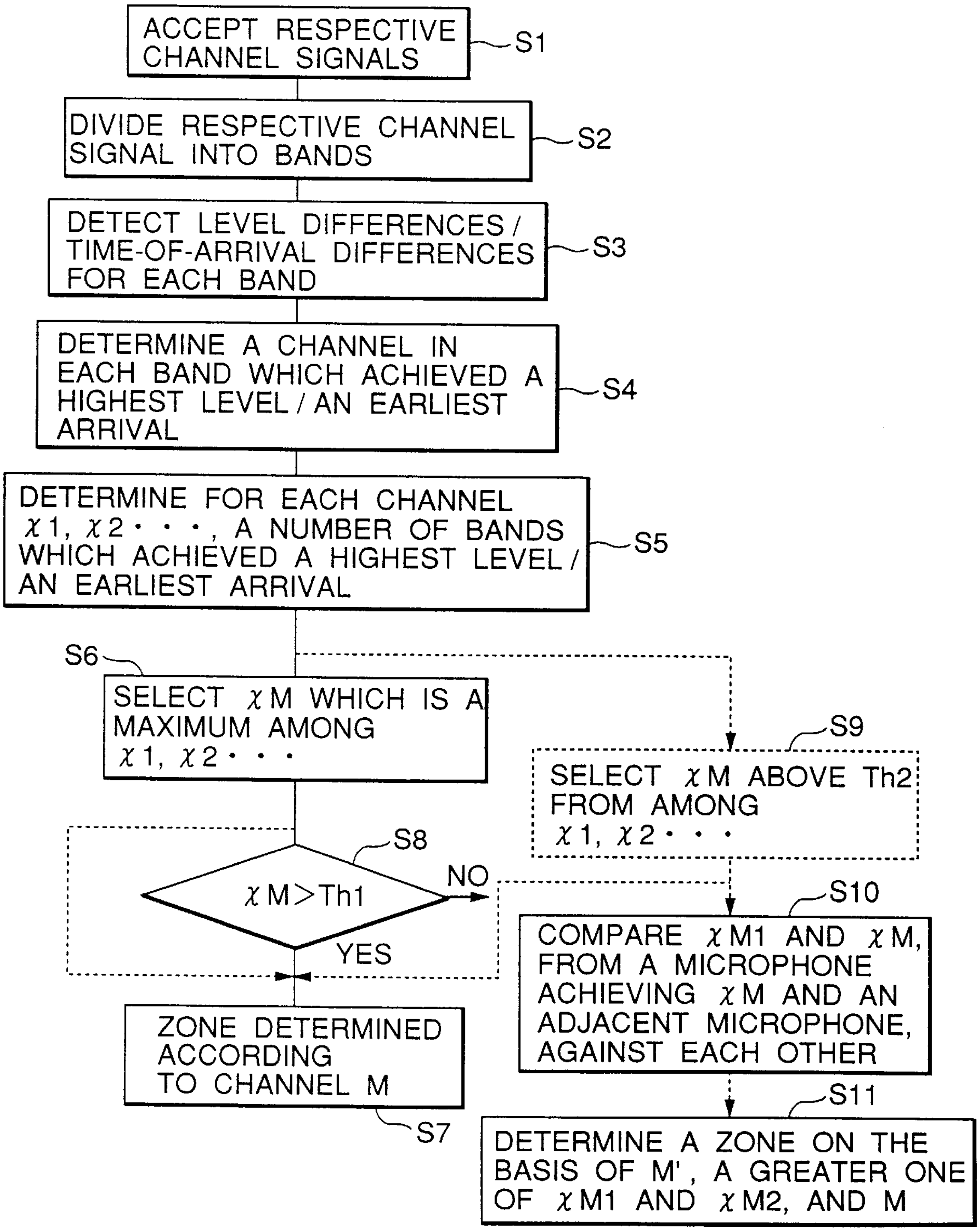
FIG. 24 is a flow diagram illustrating a processing procedure used in the zone detecting method according to the embodiment of the invention.

A processing procedure used in the method of detecting a sound source zone will be understood from the flow diagram shown in FIG. 17 and from the above description, but is summarized in FIG. 24, which will be described briefly. Initially, channel signals from the microphones M1–M3 are received (S1), each channel signal is divided into a plurality of bands (S2), and a level or a time-of-arrival difference of each divided band signal is determined (S3). Subsequently, a channel having a maximum level or an earliest arrival for the same band is determined (S4). A number of bands for each channel which achieved a maximum level or an earliest arrival, $\chi 1$, $\chi 2$, $\chi 3$, . . . is determined (S5). A maximum one $\chi_M$ among these numbers $\chi 1$, $\chi 2$, $\chi 3$, . . . is selected (S6), and a determination is rendered that a sound source is located in a zone covered by a microphone of a channel M which corresponds to $\chi_M$ (S7).

During the selection of $\chi_M$, an examination may be made to see if $\chi_M$ is greater than a reference value, which may be equal to n/3 (where n represents the number of divided bands) (S8) before proceeding to step S7. Subsequent to the step S5, an examination is made (S9) to search for any one of $\chi 1$, $\chi 2$, $\chi 3$, . . . which exceeds a reference value, which may be 2n/3, for example. If YES, a determination is rendered that there is a sound source in a zone covered by a microphone of the channel M which corresponds to $\chi_M$ (S7). To determine the zone with a higher accuracy, when it is found at step S9 that there is a $\chi_M$ which exceeds the reference value, $\chi_{M1}$, $\chi_{M2}$ for channels M1, M2 which are associated with the microphones located adjacent to the microphone for channel M are compared against each other. The sound source zone is determined on the basis of the microphone corresponding to M' for the greater $\chi_{M'}$ (M' being either 1 or 2) and the microphone corresponding to M. Thus, if $\chi_{M1}$ is greater, a determination is rendered that a sound source is located in the zone covered by the microphone for the channel M and located toward the microphone corresponding to M1 (S11).

With the method of detecting a sound source zone according to the invention, each microphone output signal is divided into smaller bands, and the level or time-of-arrival difference is compared for each band to determine a zone, thus enabling the detection of a sound source zone in real time while avoiding the need to prepare a histogram.

Figures 25, 26:
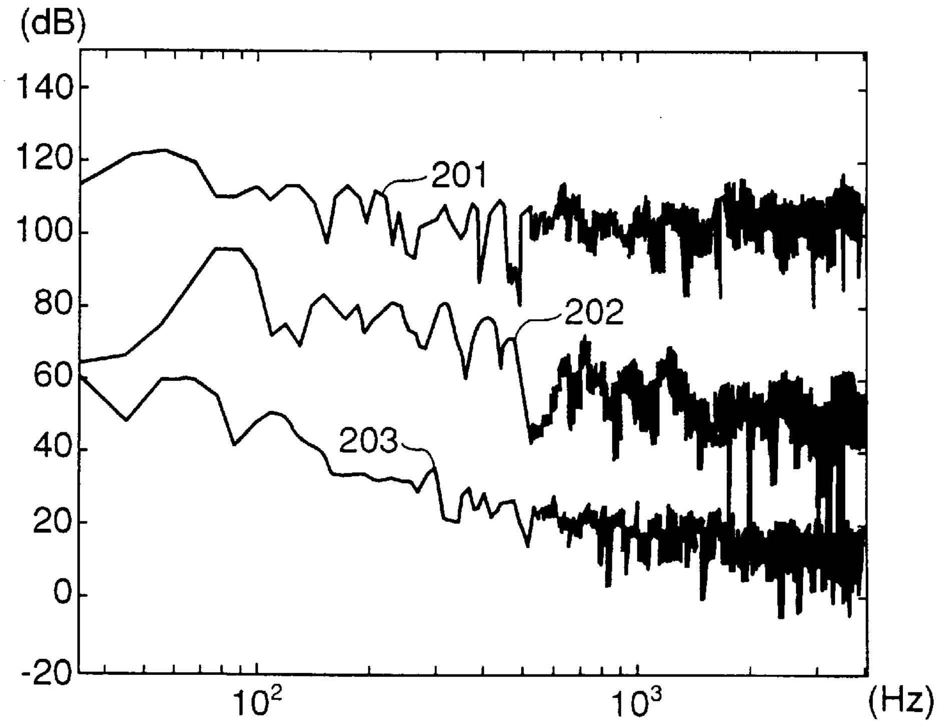
FIG. 25 is a chart showing the varieties of sound sources used in an experiment for the invention.
FIG. 26 is a diagram illustrating voice spectrums before and after processing according to the method of embodiments shown in FIGS. 6 to 9.
Figure 27A:
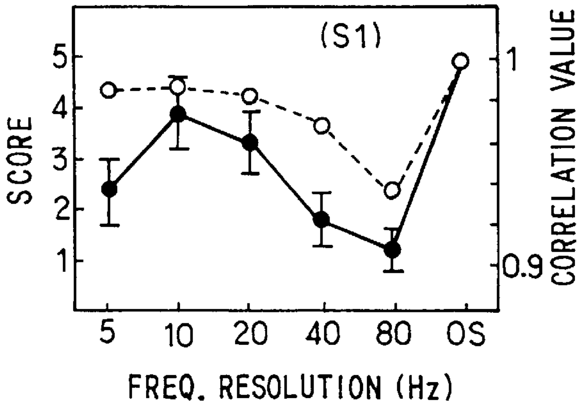
FIG. 27 are diagrams showing results of a subjective evaluation experiment which uses the method of embodiments shown in FIGS. 6 to 9.
Figure 27B:
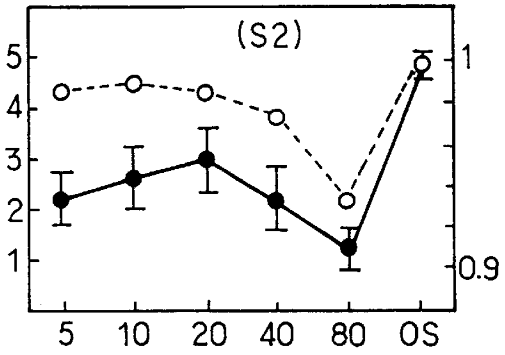
Figure 27C:
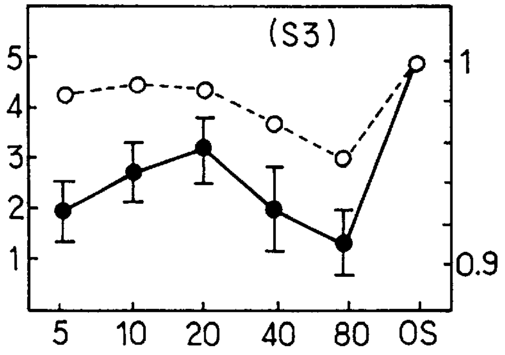
Figure 27D:
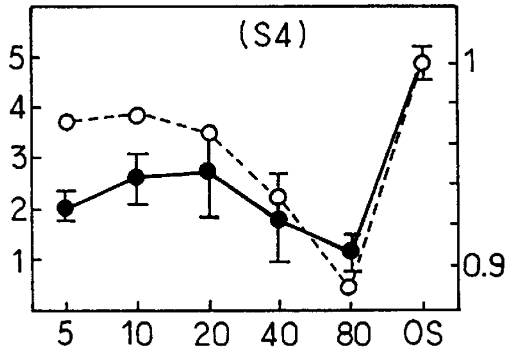
Figure 27E:
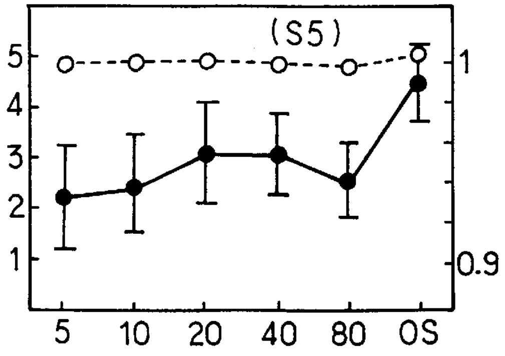
Figure 27F:
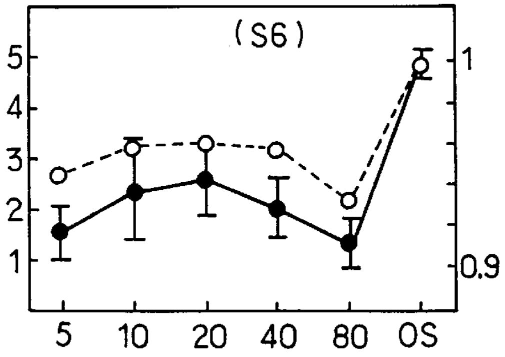
Figure 28A:
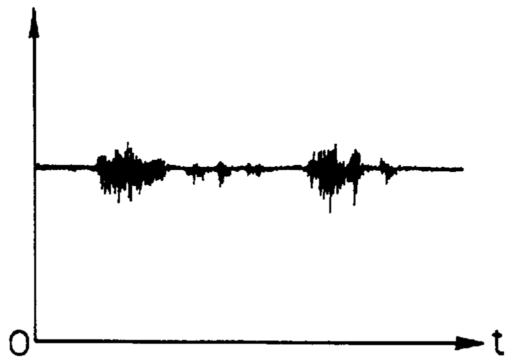
FIG. 28 shows voice waveforms after the processing according to the method of embodiments shown in FIGS. 6 to 9 together with the original voice waveform.
Figure 28B:
Figure 28C:
Figure 28D:
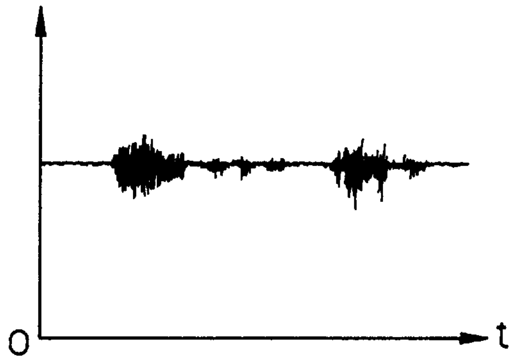
Figure 28E:
Figure 29A:
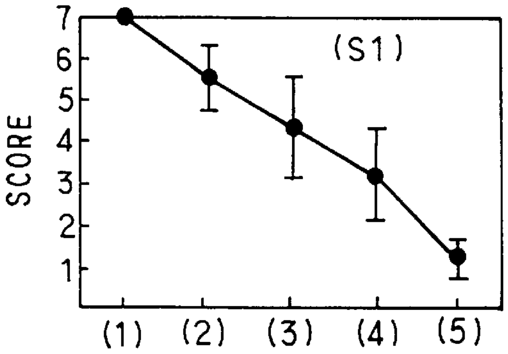
FIG. 29 shows results of experiments conducted for the method of separating a sound source as illustrated in FIGS. 6 to 9 and the apparatus for separating sound source shown in FIG. 11.
Figure 29B:
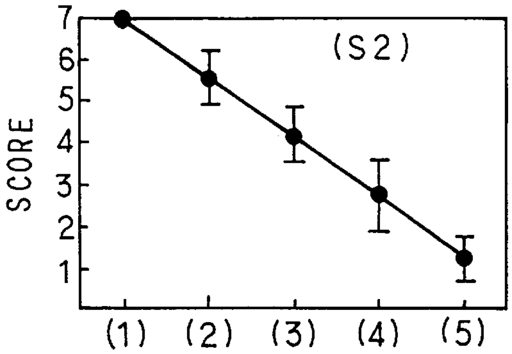
Figure 29C:
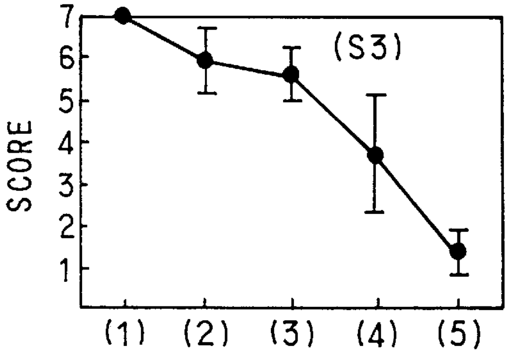
Figure 29D:
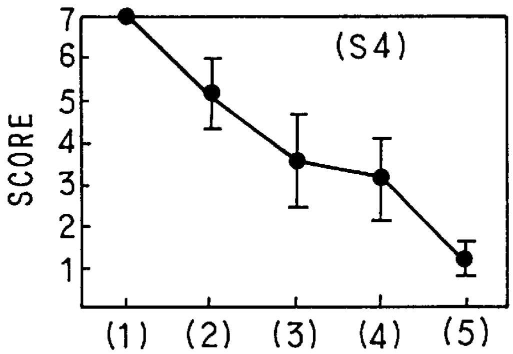
Figure 29E:
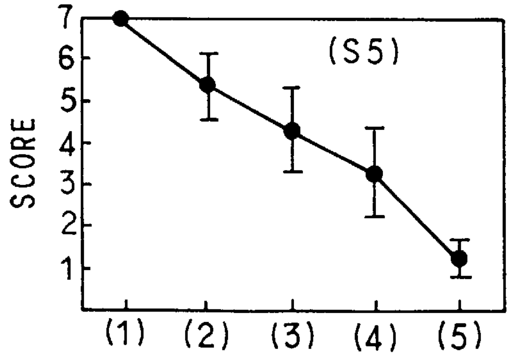

An experimental example in which the invention comprising a combination of FIGS. 6–9 is applied will be indicated below. Specifically, the invention is applied to a combination of two sound source signals from three varieties as illustrated in FIG. 25, the frequency resolution which is applied in the bandsplitter 4 is varied, and the separated signals are evaluated physically and subjectively. A mixed signal before the separation is prepared by the addition while applying only an inter-channel time difference and level difference from the computer. The applied inter-channel time difference and level difference are equal to 0.47 ms and 2 dB.

Five values of the frequency resolution including about 5 Hz, 10 Hz, 20 Hz, 40 Hz and 80 Hz are used in the bandsplitter 4. An evaluation is made for six kinds of signals including the signals separated according to the respective resolutions and the original signal. It is to be noted that the signal band is about 5 kHz.

A quantitative evaluation takes place as follows: When the separation of mixed signals takes place perfectly, the original signal and the separated signal will be equal to each other, and the correlation coefficient will be equal to 1. Accordingly, a correlation coefficient between the original signal and the processed signal is calculated for each sound to be used as a physical quantity representing the degree of separation.

Results are indicated in broken lines 9 in FIG. 27. For any combination of voices, the correlation value is significantly reduced at the frequency resolution of 80 Hz, but no remarkable difference is noted for other resolutions. For bird chirping, no significant difference is noted between the values of frequency resolution used.

A subjective evaluation was made as follows: 5 Japanese men in their twenties and thirties and having a normal audition were employed as subjects. For each sound source, separated sounds at five values of the frequency resolution and the original sound were presented at random diotically through a headphone, asking them to evaluate the tone quality at five levels. A single tone was presented for an interval of about four seconds.

Results are indicated in solid lines in FIG. 27. It is noted that for the separated sound S1, the highest evaluation was obtained for the frequency resolution of 10 Hz. There existed a significant difference ($\alpha<0.05$) between evaluations for all conditions. As to separated sounds S2–4 and 6, the evaluation was highest for the frequency resolution of 20 Hz, but there was no significant difference between 20 Hz and 10 Hz. There existed a significant difference between 20 Hz on one hand and 5 Hz, 40 Hz and 80 Hz on the other hand. From these results, it was found that there exists an optimum frequency resolution independently from the combination of separated voices. In this experiment, a frequency resolution on the order of 20 Hz or 10 Hz represents an optimum value. As to the separated sound S5 (birds chirping), the highest evaluation was given for 40 Hz, but the significant difference was noted only between 40 Hz and 5 Hz and between 20 Hz and 5 Hz. In any instance, there existed a significant difference between the separated sound and the original sound.

FIGS. 26 and 28 illustrate the effect brought forth by the present invention.

FIG. 26 shows a spectrum 201 for a mixed voice comprising a male voice and a female voice before the separation, and spectrums 202 and 203 of male voice S1 and female voice S2 after the separation according to the invention. FIG. 28 shows the waveforms of the original voices for male voice S1 and female voice S2 before the separation at A, and B, shows the mixed voice waveform at C, and shows the waveforms for male voice S1 and female voice S2 after the separation at D, and E, respectively. It is seen from FIG. 26 that unnecessary components are suppressed. In addition, it is seen from FIG. 28 that the voice after the separation is recovered to a quality which is comparable to the original voice.

The resolution for the bandsplitting is preferably in a range of 10–20 Hz for voices, and a resolution below 5 Hz or above 50 Hz is undesirable. The splitting technique is not limited to the Fourier transform, but may utilize band filters.

Another experimental example in which the signal suppression takes place in the signal suppression unit 90 by determining the status of the sound source by utilizing the level difference as illustrated in FIG. 11 will be described. A pair of microphones are used to collect sound from a pair of sound sources A, B which are disposed at a distance of 1.5 m from a dummy head and with an angular difference of 90° (namely at an angle of 45° to the right and to the left with respect to the midpoint between the pair of microphones) at the same sound pressure level and in a variable reverberant room having a reverberation time of 0.2 s (500 Hz). Combinations of mixed sounds and separated sounds used are Si–S4 shown in FIG. 22.

For the separated sounds S1–S4, the ratio of the number of frames which are determined to be silent to the number of silent frames in the original sound are calculated. As a result, it is found that more than 90% are correctly detected as indicated below.

| | Male (S1) | Female (S2) | Female voice 1 (S3) | Female voice 2 (S4) |
|---|---|---|---|---|
| Detection rate | 99% | 93% | 92% | 95% |

Sounds which are separated according to the fundamental method illustrated in FIGS. 5–9 and according to the improved method shown in FIG. 11 are presented at random diotically through a headphone, and an evaluation is made for the reduced level of noise mixture and for the reduced level of discontinuity. The separated sounds are S1–S4 mentioned above, and the subjects are five Japanese in their twenties and thirties and having normal audition. A single sound is presented for an interval of about four seconds, and trials for each sound are three times. As a consequence, the rate at which the reduced level of noise mixture is evaluated is equal to 91.7% for the improved method and is equal to 8.3% for the fundamental method, thus indicating that answers replying that the noise mixture is reduced according to the improved method are considerably higher. However, the evaluation for the detection of discontinuity is equal to 20.3% according to the improved method, and is equal to 80.0% according to the fundamental method, thus indicating that far more replies evaluated that the discontinuities are reduced according to the fundamental method. However, no significant difference is noted between the fundamental and the improved method.

To provide a relative evaluation of the separation performance, a comparison of the degree of separation for five kinds of sounds is made according to the subjective evaluation (1) Original sound (2) Fundamental method (computer): a mixed signal resulting from the addition on the computer while applying an inter-channel time difference (0.47 ms) and a level difference (2 dB) is separated according to the fundamental method;

(3) Improved method (actual environment): a mixed sound collected under the condition used in the experiment to determine a detection rate of silent intervals is separated according to the improved method;

(4) Fundamental method (actual environment): a mixed sound collected under the condition used in the experiment to determine a detection rate of silent intervals is separated according to the fundamental method;

(5) Mixed sound: a mixed sound collected under the condition used in the experiment to determine a detection rate of silent intervals.

For the first two mixed sounds indicated in the chart of FIG. 25, a total of twenty samples of "mixed sounds" obtained by processing the "original sounds" according to the techniques indicated under the sub-paragraphs (1)–(4) are presented at random diotically through a headphone, and an evaluation of the degree of separation is made at seven levels. A score of 7 is given to "most separated" while a score of 1 is given to the "least separated". The subjects, the interval during which the sounds are presented and the number of trials remain the same as those used during the evaluation of the reduced level of noise mixture.

Results are shown in FIG. 29. Specifically all sound sources (S0) is shown at A, male voice (S1) at B, female voice (S2) at C, female voice 1 (S3) at D, and female voice 2 (S4) at E, respectively. A result of analysis of all the sound sources (S0) and a result of analysis for each variety of sound source (S1)–(S4) exhibited substantially similar tendencies. For all of S0–S4, the degree of separation increases in the sequence of "(1) original sound", "(2) fundamental method (computer)", "(3) improved method (actual environment)", "(4) fundamental method (actual environment)" and "(5) mixed sound". In other words, the improved method is superior to the fundamental method in the actual environment.

What is claimed is:

1. A method for separating at least one sound source from a plurality of sound sources using a plurality of microphones disposed separately from one another, comprising steps of:

(a) dividing an output channel signal from each microphone into a plurality of frequency bands to produce band-divided output channel signals;

(b) detecting, for each frequency band, as band-dependent inter-channel parameter value differences, differences between the output channel signals in the value of a parameter of an acoustic signal arriving at the microphones from each of the sound sources, said differences being attributable to the locations of the plurality of microphones;

(c) on the basis of the band-dependent inter-channel parameter value differences for each frequency band, determining which one of the respective band-divided output channel signals in each frequency band comes from which one of the sound sources;

(d) selecting particular band-divided output channel signals determined in step (c) to have been generated from at least one of the sound sources; and (e) combining the selected band-divided output channel signals selected for said at least one of the sound sources in the step (d) into a resulting sound source signal from said at least one of the sound sources.

2. A method according to claim 1, wherein said differences in value of a parameter include differences in at least one of time and level of each acoustic signal reaching the respective microphones.

3. A method according to claim 2 wherein in said step (a) the divided frequency bands are chosen small enough to assure that each of the band-divided output channel signals essentially and principally comprises a component of an acoustic signal from only one of the sound sources.

4. A method according to claim 3 in which said at least one of time and level used in step (b) is time required for a component in said each frequency band of the acoustic signal to reach said microphones from each of the sound sources, and in which the band-dependent inter-channel parameter value differences are band-dependent inter-channel time differences which represent differences between the microphones in time required for each acoustic signal in said each frequency band to reach the respective microphones.

5. A method according to claim 4, further including a step (f) of detecting, from the output channel signals from the respective microphones, as fullband inter-channel time differences, differences between the microphones in time required for said each acoustic signal from each of the sound sources to reach the respective microphones; and wherein said step (c) determines, by collating the band-dependent inter-channel time differences in each frequency band with the fullband inter-channel time differences, which one of the respective band-divided output channel signals in said each frequency band comes from which one of the sound sources.

6. A method according to claim 5 in which step (f) comprises the steps of determining cross-correlations between the output channel signals from the respective microphones, and determining the fullband inter-channel time differences as time differences between those output channel signals which exhibit peaks in the cross-correlations.

7. A method according to claim 6, in which one of the fullband inter-channel time differences which is closest to a time corresponding to a phase difference between components in each frequency band of the band divided output channels is defined as the band-dependent inter-channel time difference in said each frequency band.

8. A method according to claim 3 in which said at least one of time and level used in step (b) is signal level of a component in said each frequency band of the acoustic signal arriving at each of the microphones from each of the sound sources, and in which the band-dependent inter-channel parameter value differences represent level differences between the band divided output channel signals in said each frequency band.

9. A method according to the claim 8 in which said step (c) further comprises the steps of:

(c-1) detecting level differences between the output channel signals from the respective microphones as fullband inter-channel level differences;

(c-2) comparing a sign of each of the fullband inter-channel level differences against signs of all of the band-dependent inter-channel level differences to count the number of similar signs;

(c-3) if the number of similar signs is equal to or greater than a given number, determining that all the band-divided output channel signals corresponding to the sign of said each inter-channel level differences cone from one of the sound sources corresponding to said sign; and (c-4) if the number of similar signs is smaller than said given number, determining which ones of the respective band-divided output channel signals in each frequency band come from which one of the sound sources.

10. A method according to claim 3, in which said step (b) detects differences both in time for the acoustic signal in each divided frequency band to reach the microphones from each of the sound sources and in level of the acoustic signal arriving at the microphones, wherein the band-dependent inter-channel parameter value differences include band-dependent inter-channel time differences and band-dependent inter-channel level differences, said method further comprising the steps of:

(f) detecting, from the output channel signals from the respective microphones, as inter-channel time differences, differences between the microphones in time for the acoustic signal from each of the sound sources to reach the respective microphones; and (g) dividing the band divided output channel signals into three frequency ranges including a low, a middle and a high range on the basis of the inter-channel time differences; and wherein the step (c) comprises the steps of:

(c-1) determining, on the basis of the band-dependent inter-channel time differences for the frequency bands in the low range, which one of the respective band-divided output channel signals in each frequency band comes from which one of the sound sources;

(c-2) determining, on the basis of the band-dependent inter-channel level differences and the band-dependent inter-channel time differences for the frequency bands in the middle range, which one of the respective band-divided output channel signals in each frequency band comes from which one of the sound sources; and (c-3) determining, on the basis of the band-dependent inter-channel level differences for frequency bands in the high range, which one of the respective band divided output channel signals in each frequency band comes from which one of the sound sources.

11. A method according to one of claims 1, 4, 8, or 10, further comprising the steps of:

(1) detecting band-dependent levels of the output channel signals which are divided into the frequency bands;

(2) comparing, for each frequency band, the band-dependent levels between the channels, and, on the basis of a result of the comparison, detecting at least one of the sound sources which is not uttering a sound; and (3) based on detection of a non-uttering sound source, suppressing sound source signals corresponding to said non-uttering sound source.

12. A method according to claim 11, further comprising the steps of:

(4) detecting a level of full frequency band of each of the output channels signals, thus determining a fullband level for each channel; and (5) determining whether or not each of the fullband levels of the respective channels detected in step (4) is below a reference level, and if it is found that any one of the fullband levels is above said reference level, executing steps (1), (2) and (3).

13. A method according to claim 12 in which in the event it is determined in step (5) that the total number of frequency bands of the highest levels is equal to or less than the reference level, all of the sound source signals produced in the combining step (e) are suppressed.

14. A method according to claim 11 in which step (2) comprises the steps of:

(2-1) comparing band-dependent levels between the channels to determine one of the channels with a highest level for each frequency band and counting a total number of frequency bands with highest levels for each channel;

(2-2) determining, for each channel, whether or not the total number of frequency bands with the highest level exceeds a first reference value;

(2-3) if it is found in step (2-2) that one of the total numbers exceeds the first reference value, estimating, from the location of the microphone for the channel having the total number exceeding the first reference value, at least one of the sound sources uttering a sound; and (2-4) deciding that a sound source or sources other than the estimated sound sources are sources which are not uttering a sound.

15. A method according to claim 14, further comprising the steps of:

(2-5) in the event it is determined in step (2-2) that none of the total numbers exceeds the first reference value, determining, for each channel, if the total number of frequency bands with highest levels is equal to or less than a second reference value which is less than the first reference value; and (2-6) if it is determined in step (2-5) that one of the total numbers of frequency bands for that channel is less than the second reference value, deciding that at least one of the sound sources corresponding to the location of the microphone for the channel having the total number less than the second reference value is not uttering a sound.

16. A method according to claim 15, in which the number of sound sources is equal to four or greater, and in which in the event it is determined in step (2-5) that the total number of frequency bands of the highest levels for that channel is less than the second reference value, the second reference value is incremented in a stepwise manner consistent with a requirement that the first reference value is not exceeded by the second reference value, and repeating steps (2-5) and (2-6) a number of times equal to or less than (M−2) where M represents the number of sound sources.

17. A method according to one of claims 1, 4, 8 or 10, further comprising the steps of:

(f) detecting time-of-arrival differences of the divided output channel signals to their associated microphones for each frequency band, thus providing band-dependent time differences;

(g) comparing the band-dependent time-of-arrival differences between the channels for each frequency band, and based on the comparison result, determining at least one of the sound sources which is not uttering a sound; and (h) in response to a determination of the non-uttering sound source, suppressing the sound source signal corresponding to the non-uttering sound source among those sound source signals which are produced in the combining step (e).

18. A method according to claim 17, further comprising the steps of:

(i) detecting a level of full frequency band of each of the output channel signals, thus providing fullband level for each channel; and (j) determining whether or not the fullband level of each of the channels is equal to or below a reference level, and in the event any one of the fullband levels is above the reference level, executing steps (f), (g) and (h).

19. A method according to claim 18, in which step (g) comprises the steps of:

(g-1) on the basis of the comparison of the band-dependent time-of-arrival differences for each frequency band, determining, for each frequency band, one of the channels in which an acoustic signal reached earliest and counting a total number of frequency bands with the earliest arrivals for each channel;

(g-2) determining whether or not the total number of frequency bands with earliest arrivals in each channel exceeds a first reference value;

(g-3) in the event it is determined in step (g-2) that one of the total numbers exceeds the first reference value, estimating, on the basis of the location of the microphone for the channel having the total number exceeding the first reference value, at least one of the sound sources as uttering a sound; and (g-4) deciding that those sound sources other than the estimated sound source are not uttering a sound.

20. A method according to claim 19, further comprising the steps of:

(g-5) in the event it is determined in step (g-2) that none of the total numbers exceeds the first reference value, determining, for each channel, whether or not the total number of frequency bands with the earliest arrivals is below a second reference value which is less than the first reference value; and (g-6) in the event it is determined in step (g-5) that one of the total numbers of frequency bands is below the second reference value, determining at least one of the sound sources as not uttering a sound, on the basis of the location of the microphone for the channel having the total number of frequency bands below the second reference value.

21. The method according to claim 20, in which the number of sound sources is equal to four or greater and in which in the event it is determined in step (g-5) that the total number is below the second reference value, the second reference value is incremented in a stepwise manner consistent with the requirement that the first reference value is not exceeded by the second reference value, and steps (g-5) and (g-6) are repeated a number of times equal to or less than (M−2) where M represents the number of sound sources.

22. A method according to claim 18, in which in the event it is determined in step (j) that all of the fullband levels are below the reference level, all of the sound source signals which are produced in step (e) are suppressed.

23. A method according to claim 4, further comprising the steps of:

(f) detecting a sound source which is not uttering a sound on the basis of the result of comparison of the band-dependent inter-channel time differences between the channels for each frequency band; and (g) in response to a detection of the non-uttering sound source in step (f), suppressing a sound source signal corresponding to the non-uttering sound source among the sound source signals which are produced in step (e).

24. A method according to claim 23, further comprising the steps of:

(h) detecting a level of full frequency band of each of the output channel signals to provide a fullband level for each channel; and (i) determining, for each channel, whether or not the fullband level detected in step (h) is below a reference level value, and in the event it is determined that any one of the fullband levels is above the reference level, steps (f) and (g) are executed.

25. A method according to claim 24, in which step (f) comprises the steps of:

(f-1) based on the comparison of the band-dependent inter-channel time differences for each band, determining, for each band, one of the channels in which an acoustic signal arrives earliest, and counting a total number of frequency bands with the earliest arrivals for each channel;

(f-2) determining, for each channel, whether or not the total number of frequency bands with the earliest arrivals exceeds a first reference value;

(f-3) if it is determined in step (f-2) that one of the total numbers exceeds the first reference value, estimating, from the location of the microphone for the channel having the total number exceeding the first reference value, at least one of the sound sources uttering a sound; and (f-4) deciding that a sound source or sources other than the estimated sound source is not uttering a sound.

26. A method according to claim 25, further comprising the steps of:

(f-5) in the event it is determined in step (f-2) that none of the total numbers exceeds the first reference value, determining, for each channel, whether or not the total number of frequency bands with the earliest arrivals is below a second reference value which is less than the first reference value; and (f-6) in the event it is determined in step (f-5) that one of the total numbers of frequency bands is below the second reference value, determining at least one of the sound sources as not uttering a sound, on the basis of the location of the microphone for the channel having the total number of frequency bands below the second reference value.

27. A method according to one of claims 4, 8, 10 or 2, wherein said step (d) selects the band-divided output channel signals that come from each of the sound sources, respectively, and said step (e) combines band-divided output channel signals selected for each of the sound sources to produce sound source signals as from the sound sources, respectively, said method further comprising the steps of:

(1) determining a power spectrum for each output channel from the respective microphone;

(2) dividing the power spectrums of all the channels into frequency bands such that each frequency band contains components of at most one of the sound sources, and detecting levels of each channel in each frequency band as a band-dependent level;

(3) comparing the band-dependent levels in each frequency band to determine a channel exhibiting the maximum level for each frequency band;

(4) determining the status of a sound source including counting, for each channel, the number of frequency bands which exhibited the maximum levels, determining, for each channel, whether or not the number of frequency bands exhibiting maximum levels exceeds a first reference value, and determining that a sound source or sound sources other than the sound source in a zone covered by the microphone of the channel for which the number of bands exceeds the first reference value are not uttering acoustic sounds; and (5) suppressing a sound source signal or sound source signals corresponding to the sound source or sound sources which is determined as not uttering acoustic sounds from among the sound source signals which are produced in step (e) signals.

28. A method according to one of claims 4, 8, 10 or 2, in which in the step (b), if a frequency range of the acoustic signal from one of the sound sources is preknown to be broader than frequency ranges of the acoustic signals from the other sound sources, the detection of the band-dependent inter-channel parameter value differences is not executed for frequency bands in those portions of the broader frequency range other than a portion where the broader frequency range overlaps the frequency ranges of the acoustic signals from said other sound sources, and in step (c), a determination is rendered that the band-divided output channel signals in said portions of the broader frequency range come from said preknown sound source.

29. A method according to one of claims 1, 4, 8 or 10 in which at least one of the sound sources is a speaker while at least one of the other sound sources is electroacoustical transducer means which converts a received signal oncoming from a remote end into an acoustic signal, and in which step (d) comprises the steps of: interrupting components of an acoustic signal from the electroacoustical transducer means in the band-divided channel signals, while selecting components of an acoustic signal from the speaker, and transmitting a sound source signal which is produced in step (e) to the remote end.

30. A method according to claim 29, further comprising the steps of:

(1) dividing a received signal from the electroacoustical transducer means into a plurality of frequency bands so that each frequency band contains a component of an acoustic signal from only one of the sound sources;

(2) determining each frequency band of the band divided received signal as a transmittable band if the level of the frequency band is below a given value; and (3) selecting those transmittable bands to be fed to step (e).

31. A method according to claim 30, in which the selection of the transmittable bands is delayed in correspondence to a propagation time of an acoustic signal between the electroacoustical transducer means and the microphone.

32. A method according to claim 29, further comprising the steps of:

(1) dividing a received signal into a plurality of frequency bands so that each frequency band contains a component of an acoustic signal from only one of the sound sources;

(2) eliminating, from the band divided components of the received signal, the frequency band selected in step (d); and (3) combining the remaining band components of the received signal into a signal in the time domain to be fed to the electroacoustical transducer means.

33. A method according to one of claims 1, 4, 8 or 10, further comprising the steps of:

(1) dividing each of the output channel signals from the respective microphones into another plurality of frequency bands chosen small enough to assure that each of the frequency bands contains a component of an acoustic signal from only one of the sound sources;

(2) detecting band-dependent levels of the output channel signals in each of said another plurality of frequency bands, thereby providing band-dependent levels;

(3) comparing the band-dependent levels between the channels for each frequency band, and detecting, on the basis of a result of the comparison, at least one of the sound sources as a non-uttering sound source which is not uttering a sound; and (4) suppressing the sound source signal which corresponds to the non-uttering sound source among the sound source signals which are produced in step (e) in response to a detection of the non-uttering sound source in step (3).

34. A method according to claim 33, further comprising the steps of:

(5) detecting a level of a full frequency band of each of the output channel signals, thereby providing a fullband level for each channel; and (6) determining whether or not each of the fullband levels of the respective channels is equal to or below a reference level, and in the event any one of the fullband levels is above the reference level, executing steps (1), (2) and (3).

35. A method according to claim 34, in which step (3) comprises the steps of:

(3-1) determining, for each frequency band, one of the channels in which the band-dependent level is the highest, and counting the number of frequency bands with the highest levels for each channel;

(3-2) determining, for each frequency band, a total number of frequency bands with the highest level;

(3-3) determining, for each channel, if the total number of frequency bands with the highest levels exceeds a first reference value;

(3-4) estimating at least one of the sound sources as a sound uttering sound source which is at a location covered by one of the microphones for the channel having the total number exceeding the first reference value; and (3-5) deciding a sound source or sources other than the estimated sound source as not uttering a sound.

36. A method according to claim 35, comprising further steps of:

(7) in the event it is determined in step (3-3) that the first reference value is not exceeded by any of the total numbers, determining, for each channel, if the total number of frequency bands with highest levels is equal to or less than a second reference value which is less than the first reference value; and (8) detecting at least one of the sound sources as a non-uttering sound source which is at a location covered by one of the microphones for the channel having the total number determined in step (7) to be below the second reference value.

37. A method according to claim 36, in which the number of sound sources is equal to four or greater, and in which in the event it is determined in step (7) that the total number of frequency bands with the highest levels is below the second reference value, the second reference value is incremented in a stepwise manner consistent with the requirement that the first reference value be not exceeded by the second reference value, and steps (7) and (8) are repeated a number of times equal to or less than (M−2) where M represents the number of sound sources.

38. A method according to claim 34 in which in the event it is determined in step (6) that the total number of frequency bands is equal to or less than the reference level, all of the sound source signals which are produced in step (e) are suppressed.

39. A method according to one of claims 1, 4, 8 or 10, further comprising the steps of:

(1) dividing each of the output channel signals from the microphones into band-divided output channel signals of a second plurality of frequency bands chosen small enough to assure that each second band-divided output channel signal contains essentially and principally a component of an acoustic signal from only one of the sound sources;

(2) detecting time-of-arrival differences of the respective second band-divided output channel signals to their associated microphones for each frequency band, thus providing band-dependent time differences;

(3) comparing the band-dependent time-of-arrival differences between the channels for each frequency band, and, based on the comparison result, detecting at least one of the sound sources as a non-uttering sound source which is not uttering a sound; and (4) in response to a detection of the non-uttering sound source by step (3), suppressing the sound source signal corresponding to the non-uttering sound source among the sound source signals which are produced in step (e).

40. A method according to claim 39, further comprising the steps of:

(5) detecting a level of full frequency band of each of the respective output channel signals, thus providing a fullband level for each channel; and (6) determining whether or not each of the fullband levels of the respective channels is equal to or below the reference level, and transferring to step (3) if any one of the fullband levels is not below the reference level.

41. A method according to claim 40, in which step (3) comprises the steps of:

(3-1) on the basis of the comparison of the band-dependent time-of-arrival differences for each frequency band, determining, for each frequency band, one of the channels in which an acoustic signal is reached earliest;

(3-2) determining, for each channel, if the total number of frequency bands with earliest arrivals in each channel exceeds a first reference value;

(3-3) assuming at least one of the sound sources as an uttering sound source that is at a location covered by one of the microphones for the channel having the total number exceeding the first reference value; and (3-4) determining a sound source or sources other than the assumed sound sources as not uttering a sound.

42. A method according to claim 41, further comprising the steps of:

(3-5) in the event it is determined in step (3-2) that there is no total number that exceeded the first reference value, determining whether or not the total numbers of frequency bands with earliest arrivals are below a second reference value which is smaller than the first reference value; and (3-6) detecting any one of the sound sources as a non-uttering sound source which is at a location covered by one of the microphones for the channel having the total number determined in step (3-5) to be below the second reference value.

43. A method according to claim 42, in which the number of sound sources is equal to four or greater, and in which in the event it is determined in step (3-5) that the total number of frequency bands with earliest arrivals is below the second reference value, the second reference value is incremented in stepwise fashion consistent with the requirement that the first reference value be not exceeded by the second reference value, and steps (3-5) and (3-6) are repeated a number of times equal to or less than (M−2) where M represents the number of sound sources.

44. A method according to claim 40, in which if it is determined in step (6) that all of the fullband levels are equal to or less than the reference level, all of the sound source signals which are produced in step (e) are suppressed.

45. A method according to claim 11, in which at least one of the sound sources is a speaker while at least one of the other sound sources is electroacoustical transducer means which converts a signal oncoming from a remote end into an acoustic signal, and step (d) comprises a step of interrupting components of an acoustic signal from the electroacoustical transducer means in the band-divided channel signals while selecting components of an acoustic signal from the speaker, and transmitting a sound source signal which is produced in step (e) to the remote end.

46. A method according to claim 45, further comprising the steps of:

(4) dividing the received signal from the electroacoustical transducer means into a plurality of frequency bands such that each frequency band contains a component of an acoustic signal from only one of the sound sources;

(5) determining each frequency band of the band-divided received signal as a transmittable band if the level of the frequency band is equal to or less than a given value; and (6) selecting only those transmittable bands to be fed to the sound source combining step (e).

47. A method according to claim 46, further comprising a step of delaying the selection of the transmittable bands in correspondence with a propagation time of an acoustic signal between the electroacoustical transducer means and the microphone.

48. A method according to claim 45, comprising further steps of:

(4) dividing the received signal into a plurality of frequency bands so that each frequency band contains a component of an acoustic signal from only one of the sound sources;

(5) eliminating the bands selected in step (d) from the band divided components of the received signal; and (6) combining the remaining band components in the received signal into a signal in the time domain to be supplied to the electroacoustical transducer means.

49. A method of separating at least one sound source from a plurality of sound sources by using a plurality of microphones located in spaced relation to each other, comprising the steps of:

(a) determining power spectrums for output channel signals from the respective microphones;

(b) dividing the power spectrum of each channel into a plurality of frequency bands so that principally spectrum components from a single one of the sound sources are contained in each band;

(c) detecting, for each band, differences in the divided power spectrums between the channels as band-dependent inter-channel level differences;

(d) on the basis of the band-dependent inter-channel level differences for the respective bands, determining which one of the respective divided power spectrums in each frequency band comes from which one of the sound source signals;

(e) on the basis of a determination rendered in step (d), selecting particular band divided spectrums of at least one of the channels corresponding to at least one of the sound sources; and (f) combining the selected band divided spectrums selected in step (e) into a resulting sound source signal.

50. A method according to claim 49, further comprising the steps of:

(g) detecting level differences between the output channel signals from the respective microphones as fullband inter-channel level differences;

(h) comparing a sign of each of the fullband inter-channel level differences against signs of all of the band-dependent inter-channel level differences to count the number of similar signs;

(i) if the number of similar signs is equal to or greater than a given number, determining that all the band divided output channel signals corresponding to the sign of said each inter-channel level difference come from one of the sound sources corresponding to said sign; and (j) if the number of similar signs is smaller than said given number, determining which ones of the respective band-divided output channel signals in each frequency band come from which one of the sound sources.

51. An apparatus for separating at least one sound source from a plurality of sound sources using a plurality of microphones disposed in spaced relation to one another comprising:

band dividing means for dividing an output channel signal from each of the respective microphones into a plurality of frequency bands to produce band-divided output channel signals such that each of the band-divided output channel signals essentially and principally comprises a component of an acoustic signal from only one of the sound sources;

means for detecting, for each frequency band, as band-dependent inter-channel parameter value differences, differences between the output channel signals in the value of a parameter of an acoustic signal arriving at the microphones from each of the sound sources, said differences being attributable to the locations of the plurality of microphones;

means for determining, on the basis of the band-dependent inter-channel parameter value differences for each frequency band, which one of the respective band-divided output channel signals in each frequency band comes from which one of the sound sources;

selecting means for selecting particular band-divided output channel signals determined by the determining means to have been generated from at least one of the sound sources; and combining means for combining the selected band-divided output channel signals selected by said selecting means into a resulting sound source signal from said at least one of the sound sources.

52. An apparatus according to claim 51, wherein said differences in value of a parameter include differences in at least one of time and level of each acoustic signal reaching the respective microphones.

53. An apparatus according to claim 52, in which said at least one of time and level used for detecting the band-dependent inter-channel parameter value differences is a time required for a component in said each frequency band of the acoustic signal to reach each microphone from each of the sound sources, and the band-dependent inter-channel parameter value differences are band-dependent inter-channel time differences between the microphones required for each acoustic signal in said each frequency band to reach the respective microphones.

54. An apparatus according to claim 52, further comprising means for detecting, from the output channel signals from the respective microphones, as fullband inter-channel time differences between the microphones, the time required for each acoustic signal from each of the sound sources to reach the respective microphones; and said means for determining a sound source signal comprises means for collating the band-dependent inter-channel time differences in each frequency band with the fullband inter-channel time differences to determine which one of the respective band-divided output channel signals in said each frequency band comes from which one of the sound sources.

55. An apparatus according to claim 52, in which said at least one of time and level used by said means for detecting the band-dependent inter-channel parameter value differences is signal level of a component in said each frequency band of the acoustic signal arriving at each of the microphones from each of the sound sources, and the band-dependent inter-channel parameter value differences are band-dependent inter-channel level differences between the band-divided output channel signals in said each frequency band.

56. An apparatus according to claim 55, further comprising:

means for detecting level differences between the output channel signals from the respective microphones as fullband inter-channel level differences;

means for comparing a sign of each of the fullband inter-channel level differences against signs of all of the band-dependent inter-channel level differences to count the number of similar signs; and means for determining, if the number of similar signs is equal to or greater than a given number, that all the band-divided output channel signals corresponding to the sign of said each inter-channel level differences are from one of the sound sources corresponding to said sign, and for determining, if the number of similar signs is smaller than said given number, which ones of the respective band-divided output channel signals in each frequency hand come from which one of the sound sources.

57. An apparatus according to claim 52, in which said means for detecting band-dependent inter-channel parameter value differences detects differences both in time required for the acoustic signal in each frequency band to reach the microphones from each of the sound sources and in level of the acoustic signal arriving at the microphones, and the band-dependent inter-channel parameter value differences including band-dependent inter-channel time differences and band-dependent inter-channel level differences, said apparatus further comprising:

means for detecting, from the output channel signals from the respective microphones as inter-channel time differences, differences in time for the acoustic signal from each of the sound sources to reach the respective microphones; and range dividing means for dividing the band-divided output channel signals into three frequency ranges including a low, a middle, and a high range on the basis of the inter-channel time differences, and wherein said means for determining the sound source signal comprises:

means for determining, on the basis of the band-dependent inter-channel time differences for the frequency bands in the low range, which one of the respective band-divided output channel signals in each frequency band comes from which one of the sound sources;

means for determining, on the basis of the band-dependent inter-channel level differences and band-dependent inter-channel time differences for the frequency bands in the middle range, which one of the respective hand-divided output channel signals in each frequency band comes from which one of the sound sources; and means for determining, on the basis of the band-dependent inter-channel level differences for frequency bands in the high range, which one of the respective band-divided output channel signals in each frequency band comes from which one of the sound sources.

58. An apparatus according to one of claims 51, 53, 55 or 57, further comprising:

means for detecting the band-dependent levels of the output channel signals which are divided into frequency bands;

means for determining the status of a sound source by comparing, for each frequency band, the band-dependent levels between the channels, and detecting, on the basis of comparison result, at least one of the sound sources as a non-uttering sound source which is not uttering a sound; and means for suppressing, in response to the detection of the non-uttering sound source, one of the sound source signals corresponding to said at least one of the sound sources.

59. An apparatus according to claim 58, further comprising:

a fullband level detecting means for detecting a level of full frequency band of each output channel signal as a fullband level for each channel;

decision means for determining whether or not each of the fullband levels of the respective channels detected by the fullband level detecting means is below a reference level, and if any one of the fullband levels is determined to be above the reference level, effecting the operations of said means for detecting the band-dependent levels, said means for determining the status of the sound source, and said means for suppressing.

60. An apparatus according to claim 58, in which said means for determining the status of a sound source comprises:

means for comparing the band-dependent level difference between the channels to determine one of the channels with the highest level for each frequency band, and counting the number of frequency bands with highest levels for each channel;

means for determining a total number of frequency bands with the highest levels;

decision means for determining, for each channel, whether or not the total number of frequency bands with the highest levels exceeds a first reference value;

means for estimating, from the location of the microphone for the channel corresponding to the total number of frequency bands exceeding the first reference value, at least one of the sound sources as uttering a sound; and means for detecting a sound source or sources other than the estimated sound source as ones not uttering a sound.

61. An apparatus according to claim 60, comprising:

further decision means for determining, in the event none of the total numbers is determined to exceed the first reference value, if any one of the total numbers of frequency bands with the highest levels is below a second reference value which is less than the first reference value; and means for detecting, in the event one of the total number is determined to be below the second reference value, at least one of the sound sources corresponding to the location of the microphone for the channel having the total number below the second reference value as not uttering a sound.

62. An apparatus according to one of the claims 51, 53, 55 or 57, further comprising:

band-dependent time difference detecting means for detecting time-of-arrival differences of the respective band-divided output channel signals to the microphones for each frequency band;

sound source status determining means for comparing the band-dependent time-of-arrival differences between the channels for each frequency band, and for determining, based on the comparison result, at least one of the sound sources as a non uttering sound source which is not uttering a sound; and means for suppressing, in response to a detection of the non-uttering sound source, the sound source signal corresponding to the non-uttering sound source among the sound source signals which are produced by the combining means.

63. An apparatus according to claim 62, further comprising:

fullband level detecting means for detecting the level of full frequency band of each of the output channel signals; and first decision means for determining, for each channel, whether or not the fullband level is below a reference level, and if any one of the fullband levels is determined to be not below the reference level, effecting the operations of said sound source status determining means, said band-dependent time difference detecting means, and said means for suppressing.

64. An apparatus according to claim 63 in which said sound source status determining means comprises:

means for determining, based on the comparison of the band-dependent time-of-arrival differences for each band, one of the channels in which an acoustic signal arrived earliest;

second decision means for determining if the total number of frequency bands with the earliest arrivals in each channel exceeds a first reference value;

means for estimating at least one of the sound sources as a sound uttering sound source which is at a location covered by one of the microphones for the channel having the total number exceeding the first reference value; and means for detecting a sound source or sources other than the estimated sound source as not uttering a sound.

65. An apparatus according to claim 64, further comprising:

third decision means for determining, in the event it is determined by the second decision means that none of the total numbers exceeded the first reference value, if any one of the total numbers of the frequency bands with the earliest arrivals is below a second reference value which is less than the first reference value; and means for determining, in the event it is determined by the third decision means that one of the total numbers of frequency bands is below the second reference value, at least one of the sound sources as not uttering a sound, on the basis of the location of the microphone for the channel having the total number of frequency bands below the second reference value.

66. An apparatus according to one of the claims 51, 53, 55, or 57, in which at least one of the sound sources is a speaker while at least one of the other sound sources is an electroacoustical transducer means which converts a received signal oncoming from a remote end into an acoustic signal, and in which said means for selecting the sound source signal comprises means for interrupting components in the band divided channel signals of an acoustic signal from the electroacoustical transducer means, while selecting components of an acoustic signal from the speaker; and means for transmitting a sound source signal which is produced by the combining means to the remote end.

67. An apparatus according to claim 66, further comprising a second band-dividing means for dividing a received signal from the electroacoustical transducer means into a plurality of frequency bands according to the same band division scheme as the first mentioned band-dividing means such that each frequency band contains a component of an acoustic signal from only one of the sound sources;

means for determining each frequency band of the band divided received signal as a transmittable band if the level of the frequency band is below a given value; and selecting means for selecting only those transmittable bands to be fed to the combining means.

68. An apparatus according to claim 67, in which the selection by said selecting means is delayed in correspondence to a propagation time of an acoustic signal between the electroacoustical transducer means and the microphone.

69. An apparatus according to claim 66, further comprising:

second band-dividing means for dividing the received signal into a plurality of frequency bands according to the same band division scheme as in the first mentioned band-dividing means;

frequency component eliminating means for eliminating, from the band divided components of the received signal, the frequency bands which are selected by the sound source signal selecting means; and re-combining mens for combining remaining band components in the received signal into a signal in the time domain and feeding it to the electroacoustical transducer means.

70. An apparatus according to claim 66, further comprising threshold presetting means which selects a criterion to be used in said means for determining the sound source signal.

71. An apparatus according to claim 66, further comprising means for setting a reference value which is used for excluding the band-dependent inter-channel parameter value differences which are above the reference value from the determination.

72. An apparatus according to claim 66 in which said means for selecting the sound source signal comprises reference value presetting means which presets a criterion for muting band components of levels below a given value.

73. An apparatus according to claim 66, further comprising subtracting means for subtracting a delayed runaround signal from the sound source signal supplied from the combining means.

74. A record medium having recorded therein a program for implementing a method for separating at least one sound source from a plurality of sound sources using a plurality of microphones disposed in spaced relation to one another, the recorded program comprising the steps of:

(a) dividing an output channel signal from each microphone into a plurality of frequency bands chosen small enough to assure that each of the band-divided output channel signals essentially and principally comprises a component of an acoustic signal from only one of the sound sources;

(b) detecting, for each frequency band, as band-dependent inter-channel parameter value differences, differences between the output channel signals in the value of a parameter of an acoustic signal arriving at the microphones from each of the sound sources, said differences being attributable to the locations of the plurality of microphones;

(c) on the basis of the band-dependent inter-channel parameter value differences for each frequency band, determining which one of the respective band-divided output channel signals for in each frequency band comes from which one of the sound sources;

(d) selecting particular band-divided output channel signals determined in step (c) to have been generated from at least one of the sound sources; and (e) combining the selected band-divided output channel signals selected for said at least one of the sound sources in step (d) into a resulting sound source signal from said at least one of the sound sources.

75. An apparatus according to claim 74, wherein said differences in value of a parameter include differences in at least one of time and level of each acoustic signal reaching the respective microphones.

76. A record medium according to claim 75, in which said at least one of time and level used in step (b) is time required for a component in said each frequency band of the acoustic signal to reach said microphones from each of the sound sources, and in which the band-dependent inter-channel parameter value differences are band-dependent inter-channel time differences which represent differences between the time required for each acoustic signal in said each frequency band to reach the respective microphones.

77. A record medium according to claim 76 wherein said method further including a step (f) of detecting, from the output channel signals from the respective microphones, as fullband inter-channel time differences, differences between the time required for said each acoustic signal from each of the sound sources to reach the respective microphones; and wherein said step (c) determines, by collating the band-dependent inter-channel time differences in each frequency band with the fullband inter-channel time differences, which one of the respective band-divided output channel signals in said each frequency band comes from which one of the sound sources.

78. A record medium according to claim 77, in which step (f) comprises the steps of determining cross-correlations between the output channel signals from the respective microphones, and determining the fullband inter-channel time differences as time differences between those output channel signals which exhibit peaks in the cross-correlations.

79. A record medium according to claim 78, in which one of the fullband inter-channel time differences which is closest to a time corresponding to a phase difference between components in each frequency band of the band divided output channels is defined as the band-dependent inter-channel time difference in said each frequency band.

80. A record medium according to claim 75, in which said at least one of time and level used in step (b) is signal level of a component in said each frequency band of the acoustic signal arriving at each of the microphones from each of the sound sources, and in which the band-dependent inter-channel parameter value differences represent level differences between the band divided output channel signals in said each frequency band.

81. A record medium according to claim 80 wherein said step (c) further comprises the steps of:

(c-1) detecting level differences between the output channel signals from the respective microphones as fullband inter-channel level differences;

(c-2) comparing a sign of each of the fullband inter-channel level differences against signs of all of the band-dependent inter-channel level differences to count the number of similar signs;

(c-3) if the number of similar signs is equal to or greater than a given number, determining that all the band-divided output channel signals corresponding to the sign of said each inter-channel level difference come from one of the sound sources corresponding to said sign; and (c-4) if the number of similar signs is smaller than said given number, determining which ones of the respective band-divided output channel signals come from which one of the sound sources.

82. A record medium according to claim 75, in which step (b) detects differences both in time for the acoustic signal in each divided frequency band to reach the microphones from each of the sound sources and in level of the acoustic signal arriving at the microphones, wherein the band-dependent inter-channel parameter value differences include band-dependent inter-channel time differences and band-dependent inter-channel level differences, said recorded program further comprising the steps of (f) detecting, from the output channel signals from the respective microphones, as inter-channel time differences, differences between the time for the acoustic signal from each of the sound sources to reach the respective microphones; and (g) dividing the band divided output channel signals into three frequency ranges including a low, a middle and a high range on the basis of the inter-channel time differences; and step (c) comprises the steps of:

(c-1) determining, on the basis of the band-dependent inter-channel time differences for the frequency bands in the low range, which one of the respective band-divided output channel signals in each frequency band comes from which one of the sound sources;

(c-2) determining, on the basis of the band-dependent inter-channel level differences and the band-dependent inter-channel time differences for the frequency bands in the middle range, which one of the respective band-divided output channel signals in each frequency hand comes from which one of the sound sources; and (c-3) determining, on the basis of the band-dependent inter-channel level differences for frequency bands in the high range, which one of the respective band divided output channel signals in each frequency band comes from which one of the sound sources.

83. A record medium according to one of claims 76, 80 or 82, in which the method comprises further steps of:

(1) detecting band-dependent levels of the output channel signals which are divided into the frequency bands;

(2) comparing, for each frequency band, the band-dependent levels between the channels, and, on the basis of a result of comparison, detecting at least one of the sound sources as a non-uttering sound source which is not uttering a sound; and (3) suppressing, based on the detection of the non-uttering sound source, one of the sound source signals corresponding to said non-uttering sound source.

84. A record medium according to claim 83, in which the method further comprises:

(4) detecting a level of full frequency band of each of the output channel signals, thus determining a fullband level for each channel; and (5) determining, for each channel, whether or not the fullband level detected in step (4) is below a reference level, and if it is found that any one of the fullband levels is above the reference level, the steps (1), (2), and (3) are executed.

85. A record medium according to claim 83, in which step (2) of determining the status of a sound source comprises the steps of:

(2-1) comparing band-dependent levels between the channels to determine one of the channels with a highest level for each frequency band and counting the number of frequency bands with highest levels for each channel;

(2-2) determining, for each channel, a total number of frequency bands with the highest levels;

(2-3) determining, for each channel, whether or not the total number of frequency bands with the highest level exceeds a first reference value;

(2-4) if it is found in step (2-3) that the total number exceeds the first reference value, estimating, from the location of the microphone for the channel having the total number exceeding the first reference value, at least one of the sound sources as uttering a sound; and (2-5) deciding a sound source or sources other than said at least one of the sound sources, are not uttering a sound.

86. A record medium according to claim 85, in which the method further comprises:

(2-6) in the event it is determined in step (2-3) that the total number for that channel does not exceed the first reference value, determining if the total number of frequency bands with highest levels for that channel is equal to or less than a second reference value which is less than the first reference value; and (2-7) if it is determined in step (2-6) that the total number of frequency bands for that channel is less than the second reference value, detecting at least one of the sound sources corresponding to the location of the microphone for at least one of the channels having the total number less than the second reference value as not uttering a sound.

87. A record medium according to claim 86, in which the number of sound sources is equal to four or greater, and in which in the event it is determined in step (2-6) that the total number of frequency bands of the highest levels for that channel is less than the second reference value, the second reference value is incremented in stepwise manner consistent with a requirement that the first reference value be not exceeded by the second reference value, and steps (2-6) and (2-7) are repeated a number of times equal to or less than (M−2) where M represents the number of sound sources.

88. A record medium according to one of claims 76, 80 or 82 in which the method further comprises:

(f) detecting time-of-arrival differences of the divided output channel signals to their associated microphones for each frequency band, thus providing band-dependent time differences;

(g) comparing the band-dependent time-of-arrival differences between the channels for each frequency band, and based on the comparison result, determining at least one of the sound sources as a non-uttering sound source which is not uttering a sound; and (h) in response to a determination of the non-uttering sound source, suppressing the sound source signal corresponding to the non-uttering sound source among those sound source signals which are produced in step (e).

89. A record medium according to claim 88, in which the method further comprises the steps of:

(i) detecting a level of full frequency band of each of the output channel signals, thus providing fullband level for each channel; and (j) determining whether or not the fullband level of each of the channels is equal to or below a reference level, and in the event any one of the fullband levels is above the reference level, the steps (f), (g), and (h) are executed.

90. A record medium according to claim 89, in which step (g) comprises the steps of:

(g-1) on the basis of the comparison of the band-dependent time-of-arrival differences for each frequency band, determining, for each frequency band, one of the channels in which an acoustic signal reached earliest and counting a total number of frequency bands with the earliest arrivals for each channel;

(g-2) determining whether or not the total number of frequency bands with earliest arrivals in each channel exceeds a first reference value;

(g-3) in the event it is determined in step (g-2) that one of the total numbers exceeds the first reference value, estimating, on the basis of the location of the microphone for the channel corresponding to the total number exceeding the first reference value, at least one of the sound sources as uttering a sound; and (g-4) deciding that those sound sources other than the estimated sound source are not uttering a sound.

91. A record medium according to claim 90, in which the method further comprises the steps of:

(g-5) in the event it is determined in step (g-2) that none of the total numbers of frequency bands for the respective channels exceeds the first reference value, determining whether or not the total number of frequency bands with the earliest arrivals for each channel is below a second reference value which is less than the first reference value; and (g-6) in the event it is determined in step (g-5) that the total number of frequency bands is below the second reference value, determining one of the sound sources as not uttering a sound, on the basis of the location of the microphone for the channel having the total number of frequency bands below the second reference value.

92. A record medium according to claim 91, in which the number of sound sources is equal to four or greater and in which in the event it is determined in step (g-5) that the total number is below the second reference value, the second reference value is incremented in a stepwise manner consistent with the requirement that the first reference value be not exceeded by the second reference value, and steps (g-5) and (g-6) are repeated a number of times equal to or less than (M−2) where M represents the number of sound sources.

93. A record medium according to claim 91, in which the method further comprises the steps of:

(f) detecting a sound source as a non-uttering sound source which is not uttering a sound on the basis of the result of comparison of the band-dependent inter-channel time differences between the channels for each frequency band; and (g) in response to a detection of the non-uttering sound source in step (f), suppressing the sound source signal corresponding to the non-uttering sound source among the sound source signals which are produced in step (e).

94. A record medium according to claim 93, in which the method further comprises the steps of:

(h) detecting a level of full frequency band of each of the output channel signals to provide a fullband level for each channel; and (i) determining whether or not each of the fullband levels of the respective channels which are detected in step (h) is below a reference level, and in the event it is determined that any one of the fullband levels exceeds the reference level, steps (f) and (g) are executed.

95. A record medium according to claim 94, in which step (f) comprises the steps of:

(f-1) based on the comparison of the band-dependent inter-channel time differences for each band, determining, for each band, one of the channels in which an acoustic signal arrives earliest, and counting a total number of frequency bands with the earliest arrivals for each channel;

(f-2) determining whether or not the total number of frequency bands with the earliest arrivals in each channel exceeds a first reference value;

(f-3) in the event it is determined in step (f-2) that at least one of the total numbers exceeds the first reference value, estimating, from the location of the microphone for the channel corresponding to the total number exceeding the first reference value, at least one of the sound sources as uttering sounds; and (f-4) deciding that a sound source or sources other than the estimated sound source is not uttering a sound.

96. A record medium according to claim 95, in which the method further comprises the steps of:

(f-5) in the event it is determined in step (f-2) that none of the total numbers exceeds the first reference value, determining whether or not the total number of frequency bands with the earliest arrivals for each channel is below a second reference value which is less than the first reference value; and (f-6) in the event that it is determined in step (f-5) that one of the total numbers of frequency bands is below the second reference value, determining at least one of the sound sources as not uttering a sound, on the basis of the location of the microphone for the channel having the total number of frequency bands below the second reference value.

97. A record medium according to one of claims 76, 80, or 82, in which at least one of the sound sources is a speaker while at least one of the other sound sources is electroacoustical transducer means which transduces a received signal oncoming from a remote end into an acoustic signal, and in which step (d) comprises the steps of:

interrupting components of an acoustic signal from the electroacoustical transducer means in the band divided channel signals, while selecting components of an acoustic signal from the speaker; and transmitting the sound source signal produced in step (e) to the remote end.

98. A record medium according to claim 97, in which the method further comprises the steps of:

(1) dividing the received signal from the electroacoustical transducer means into a plurality of frequency bands so that each frequency band contains a component of an acoustic signal from only one of the sound sources;

(2) determining a frequency band of the band divided received signal as a transmittable band if the level of the frequency band is below a given value; and (3) selecting those transmittable bands to be fed to step (e).

99. A record medium according to claim 98, in which the selection of the transmittable bands is delayed in correspondence to the propagation time of an acoustic signal between the electroacoustical transducer means and the microphone.

100. A record medium according to claim 97, in which the method further comprises the steps of:

(1) dividing the received signal into a plurality of frequency bands so that each frequency band contains a component of an acoustic signal from only one of the sound sources;

(2) eliminating, from the band divided components of the received signal the frequency band selected in step (d); and (3) combining the remaining band components of the received signal into a signal in the time domain to be fed to the electroacoustical transducer means.

* * * * *